US009866765B2

(12) United States Patent
Brav et al.

(10) Patent No.: US 9,866,765 B2
(45) Date of Patent: Jan. 9, 2018

(54) DEVICES, METHODS, AND SYSTEMS FOR VISUAL IMAGING ARRAYS

(71) Applicant: Elwha LLC, Bellevue, WA (US)

(72) Inventors: Ehren Brav, Bainbridge Island, WA (US); Russell Hannigan, Sammamish, WA (US); Roderick A. Hyde, Redmond, WA (US); Muriel Y. Ishikawa, Livermore, CA (US); 3ric Johanson, Seattle, WA (US); Jordin T. Kare, San Jose, CA (US); Tony S Pan, Bellevue, WA (US); Phillip Rutschman, Seattle, WA (US); Clarence T. Tegreene, Mercer Island, WA (US); Charles Whitmer, North Bend, WA (US); Lowell L. Wood, Jr., Bellevue, WA (US); Victoria Y. H. Wood, Livermore, CA (US)

(73) Assignee: ELWHA, LLC, Bellevue, WA (US)

( * ) Notice: Subject to any disclaimer, the term of this patent is extended or adjusted under 35 U.S.C. 154(b) by 0 days.

(21) Appl. No.: 14/791,160

(22) Filed: Jul. 2, 2015

(65) Prior Publication Data

US 2016/0165146 A1 Jun. 9, 2016

Related U.S. Application Data

(63) Continuation of application No. 14/791,127, filed on Jul. 2, 2015, and a continuation-in-part of application No. 14/714,239, filed on May 15, 2015.
(Continued)

(51) Int. Cl.
*H04N 5/247* (2006.01)
*H04N 5/232* (2006.01)

(52) U.S. Cl.
CPC ......... *H04N 5/247* (2013.01); *H04N 5/23206* (2013.01); *H04N 5/23229* (2013.01); *H04N 5/23238* (2013.01)

(58) Field of Classification Search
CPC ............... H04N 5/247; H04N 5/23238; H04N 5/23229; H04N 5/23206; G06T 7/0081; G06T 2007/10004; G06T 2007/30196
See application file for complete search history.

(56) References Cited

U.S. PATENT DOCUMENTS 5,262,856 A 11/1993 Lippman et al.
7,675,549 B1 * 3/2010 Brower ............. H04N 1/00244
348/157
(Continued)

FOREIGN PATENT DOCUMENTS

KR 1020110072846 6/2011

OTHER PUBLICATIONS

PCT International Search Report; International App. No. PCT/US2015/061389; dated Feb. 23, 2016; pp. 1-3.
(Continued)

*Primary Examiner* — Albert Cutler

(57) ABSTRACT

Computationally implemented methods and systems include capturing a scene that includes one or more images, through use of an array of more than one image sensor, selecting a particular portion of the scene that includes at least one image, wherein the selected particular portion is smaller than the scene, transmitting only the selected particular portion from the scene to a remote location, and de-emphasizing pixels from the scene that are not part of the selected particular portion of the scene. In addition to the foregoing, other aspects are described in the claims, drawings, and text.

34 Claims, 80 Drawing Sheets

Related U.S. Application Data

(60) Provisional application No. 62/081,559, filed on Nov. 18, 2014, provisional application No. 62/081,560, filed on Nov. 18, 2014, provisional application No. 62/082,001, filed on Nov. 19, 2014, provisional application No. 62/082,002, filed on Nov. 19, 2014, provisional application No. 62/156,162, filed on May 1, 2015, provisional application No. 62/180,040, filed on Jun. 15, 2015.

(56) References Cited

U.S. PATENT DOCUMENTS

| | | | |
|---|---|---|---|
| 7,720,282 | B2 | 5/2010 | Blake et al. |
| 7,733,371 | B1 * | 6/2010 | Monroe ........... G08B 13/19628 348/143 |
| 2003/0025803 | A1 | 2/2003 | Nakamura et al. |
| 2004/0010803 | A1 * | 1/2004 | Berstis ............... H04N 5/23206 725/105 |
| 2005/0157173 | A1 | 7/2005 | Kurebayashi et al. |
| 2006/0125921 | A1 | 6/2006 | Foote |
| 2007/0030353 | A1 | 2/2007 | Novak |
| 2007/0126863 | A1 | 6/2007 | Prechtl et al. |
| 2007/0171301 | A1 | 7/2007 | Tatsumi |
| 2007/0182819 | A1 | 8/2007 | Monroe |
| 2007/0279494 | A1 | 12/2007 | Aman et al. |
| 2008/0036864 | A1 * | 2/2008 | McCubbrey ............. H04N 7/18 348/159 |
| 2008/0036875 | A1 * | 2/2008 | Jones ................. H04N 5/23238 348/222.1 |
| 2008/0143842 | A1 | 6/2008 | Gillard et al. |
| 2008/0309970 | A1 * | 12/2008 | Kobayashi ......... H04N 1/00843 358/1.15 |
| 2009/0251530 | A1 * | 10/2009 | Cilia ..................... B60R 11/04 348/39 |
| 2010/0053443 | A1 * | 3/2010 | Tsukagoshi ........... G06T 3/4038 348/581 |
| 2011/0164108 | A1 | 7/2011 | Bates et al. |
| 2012/0169842 | A1 | 7/2012 | Chuang et al. |
| 2013/0070047 | A1 * | 3/2013 | DiGiovanni ........... H04N 5/222 348/36 |
| 2013/0141523 | A1 * | 6/2013 | Banta ................. H04N 5/23238 348/36 |
| 2013/0321635 | A1 | 12/2013 | Finn et al. |
| 2015/0211870 | A1 | 7/2015 | Nickolaou |

OTHER PUBLICATIONS

PCT International Search Report; International App. No. PCT/US2015/061384; dated Feb. 23, 2016; pp. 1-4.

PCT International Search Report; International App. No. PCT/US 15/61439; dated Mar. 7, 2016; pp. 1-2.

Samaneigo et al.; "A Portable, Scalable Retinal Imaging System"; TI Engibous Competition Report; Rice University; Spring 2012; pp. 1-96; mobileVision.

* cited by examiner

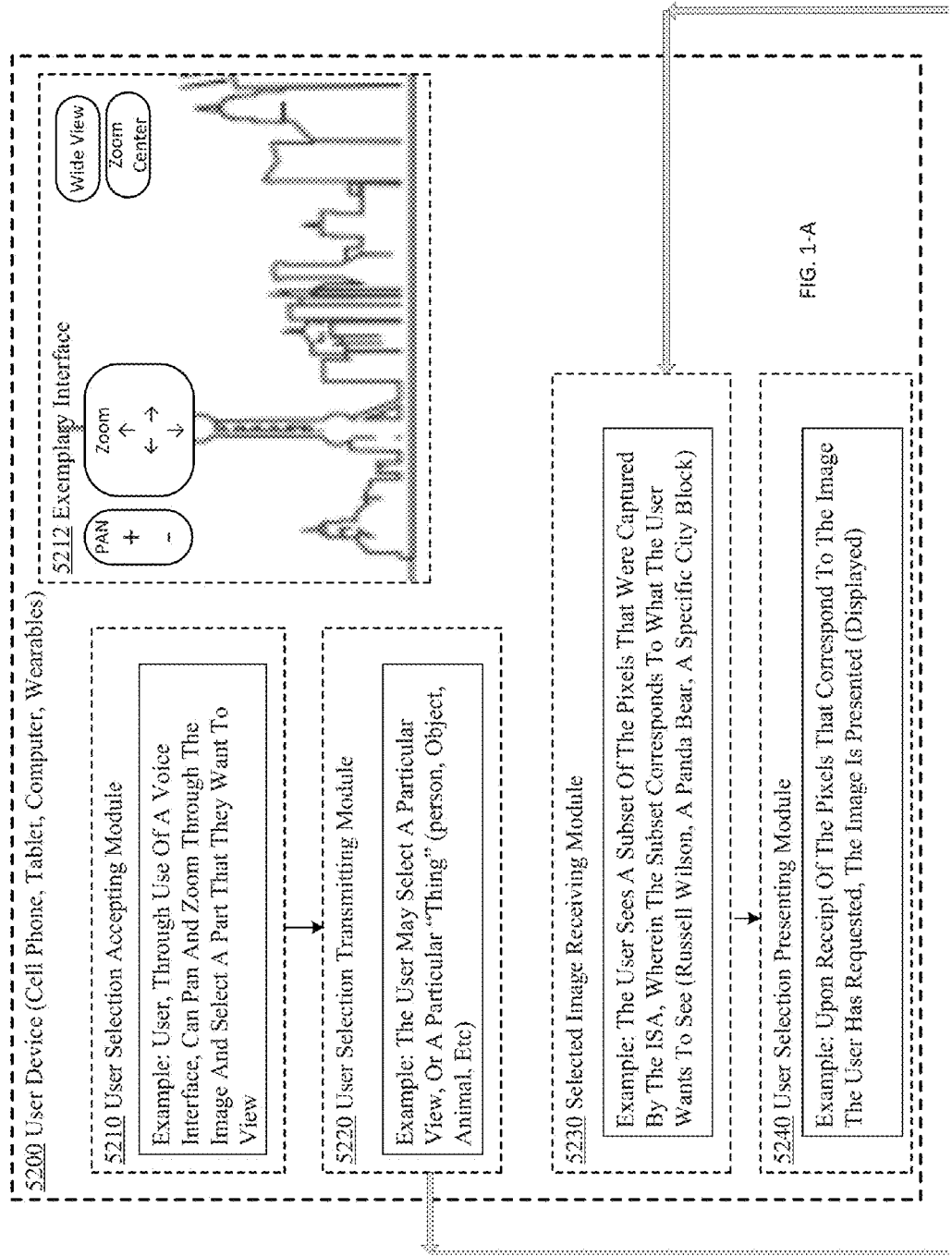

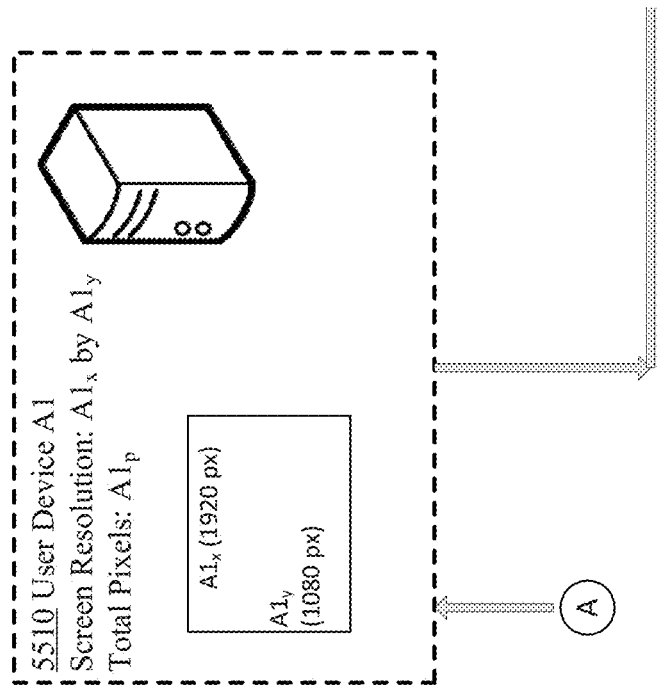
FIG. 1-B

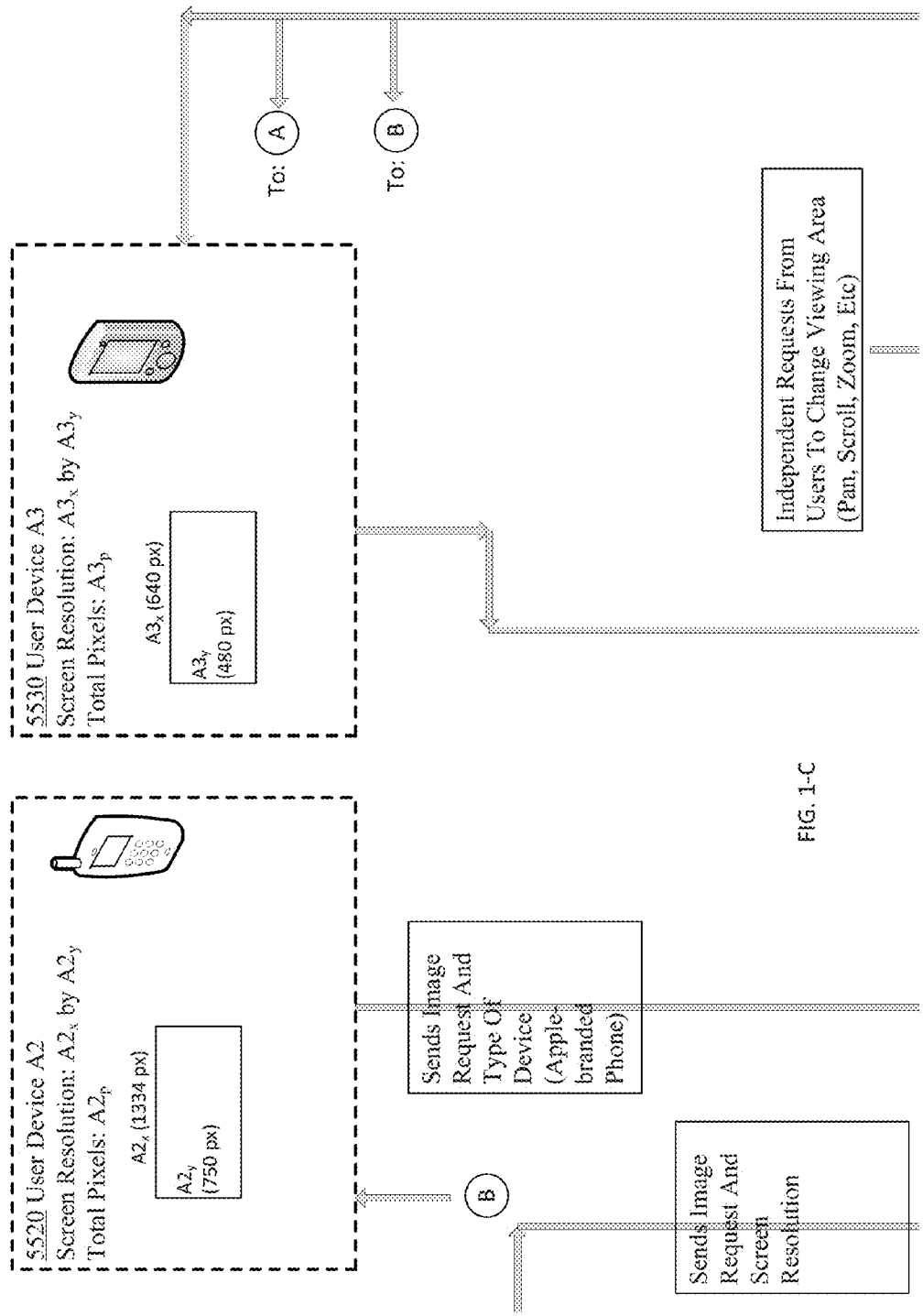

| FIG. 1-A | FIG. 1-B | FIG. 1-C | FIG. 1-D | FIG. 1-E | FIG. 1-F | FIG. 1-G | FIG. 1-H | FIG. 1-I | FIG. 1-J |
|---|---|---|---|---|---|---|---|---|---|
| FIG. 1-K | FIG. 1-L | FIG. 1-M | FIG. 1-N | FIG. 1-O | FIG. 1-P | FIG. 1-Q | FIG. 1-R | FIG. 1-S | FIG. 1-T |
| FIG. 1-U | FIG. 1-V | FIG. 1-W | FIG. 1-X | FIG. 1-Y | FIG. 1-Z | FIG. 1-AA | FIG. 1-AB | FIG. 1-AC | FIG. 1-AD |
| FIG. 1-AE | FIG. 1-AF | FIG. 1-AG | FIG. 1-AH | FIG. 1-AI | FIG. 1-AJ | FIG. 1-AK | FIG. 1-AL | FIG. 1-AM | FIG. 1-AN |

There Are No Modules On This Page, But It Is Required To Show The Complete View Of The Entire System. This Page Fits Into Position (1,4) Of The Grid

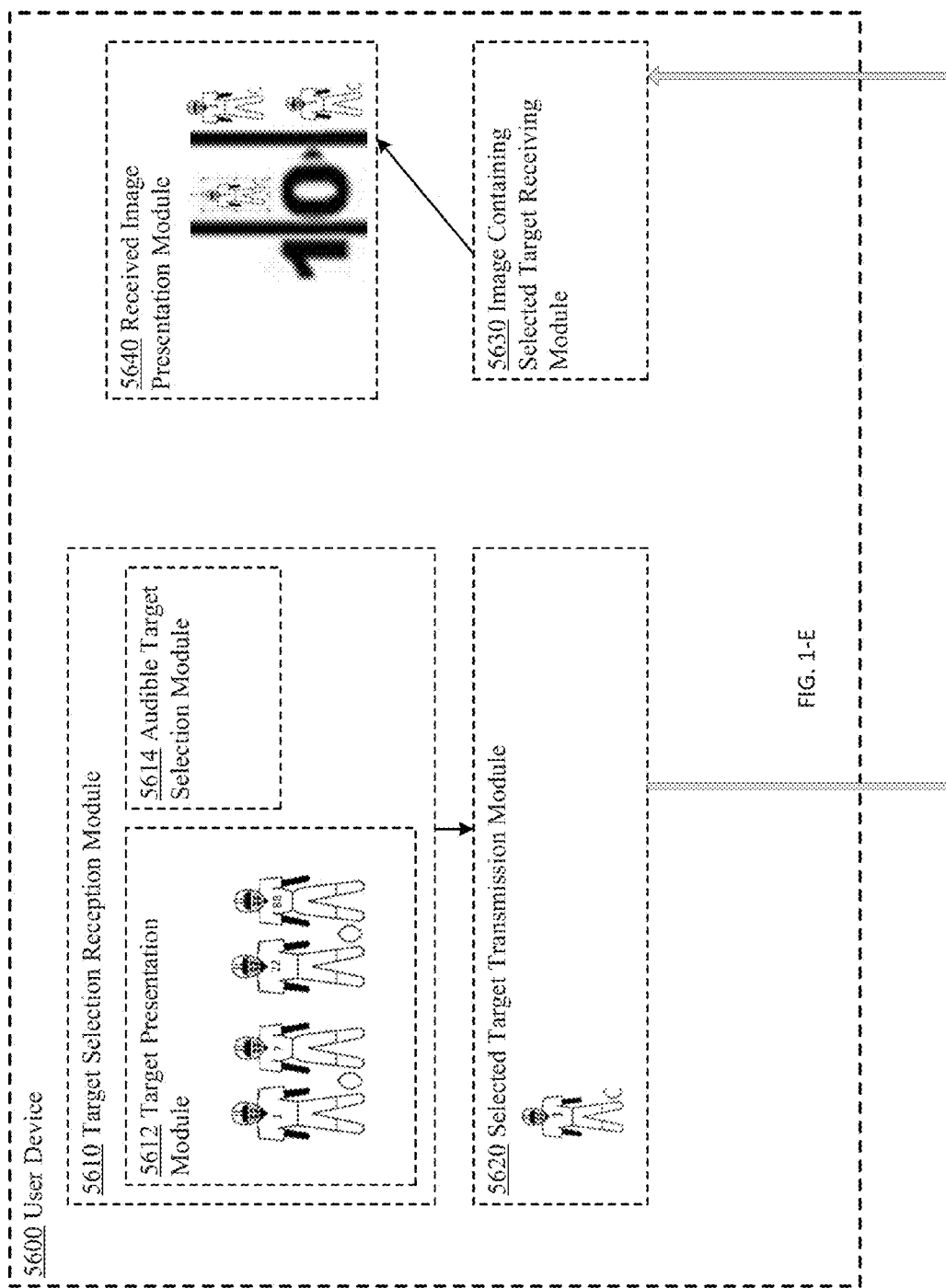
FIG. 1-E

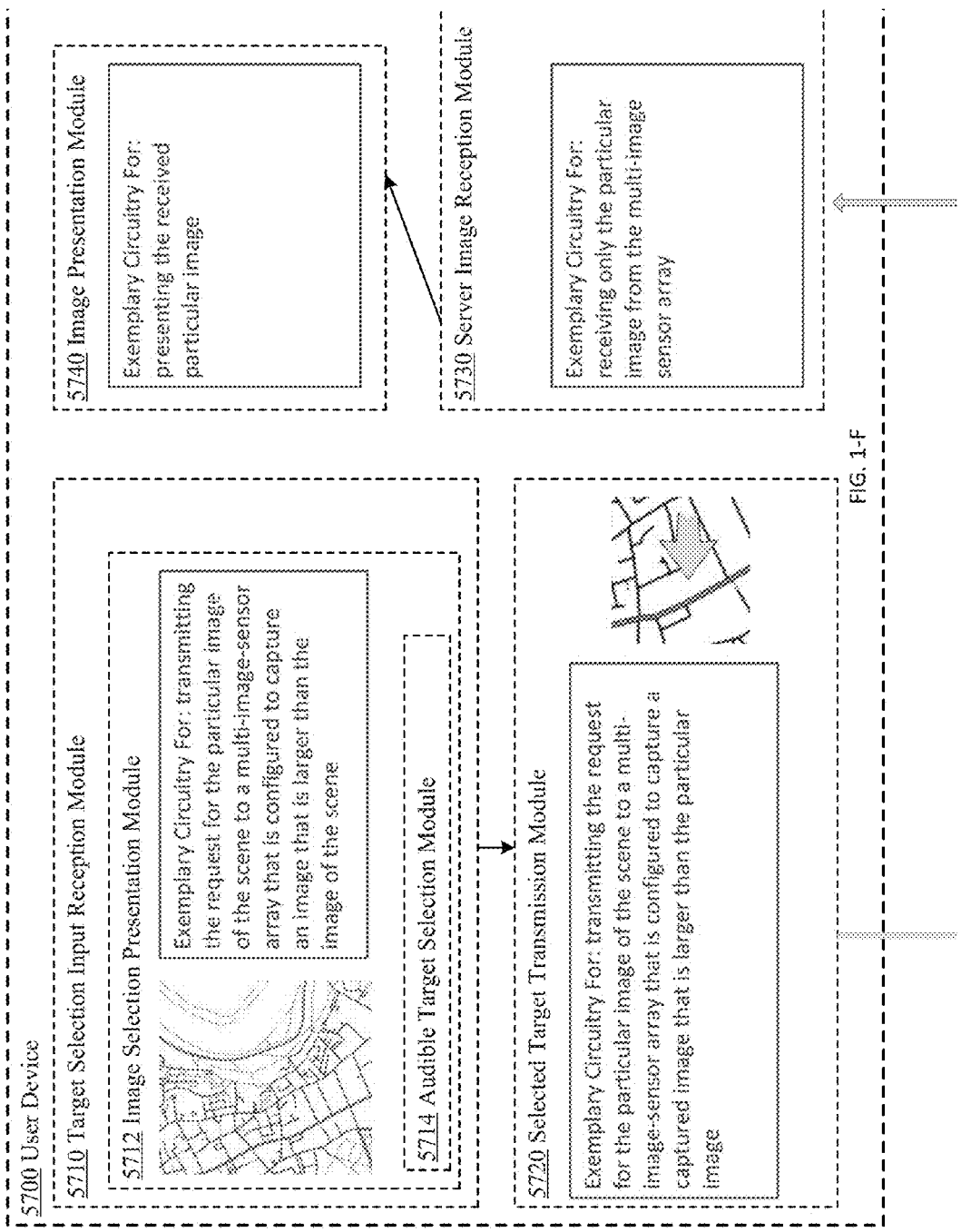
FIG. 1-F

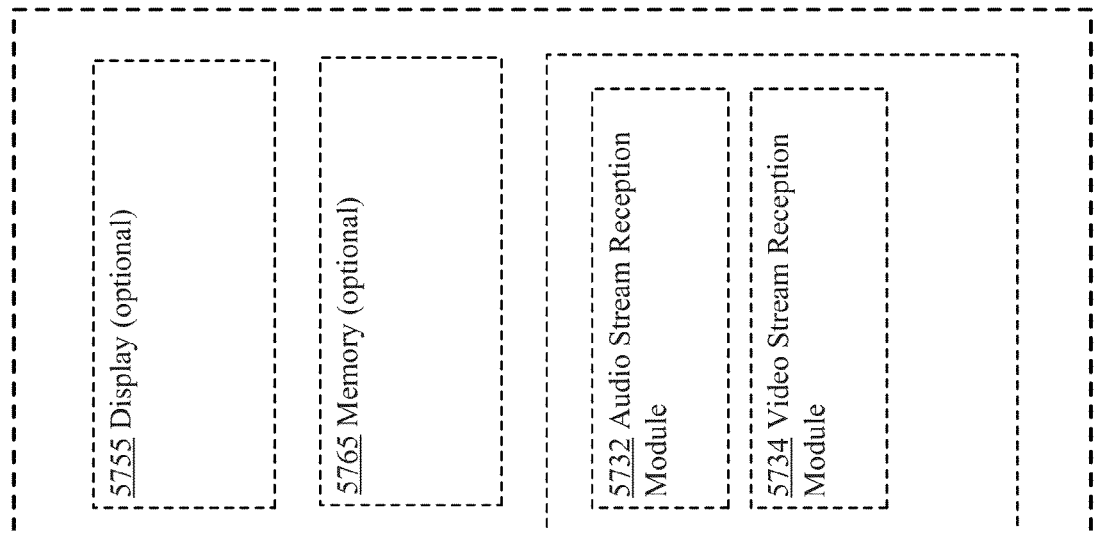
FIG. 1-G

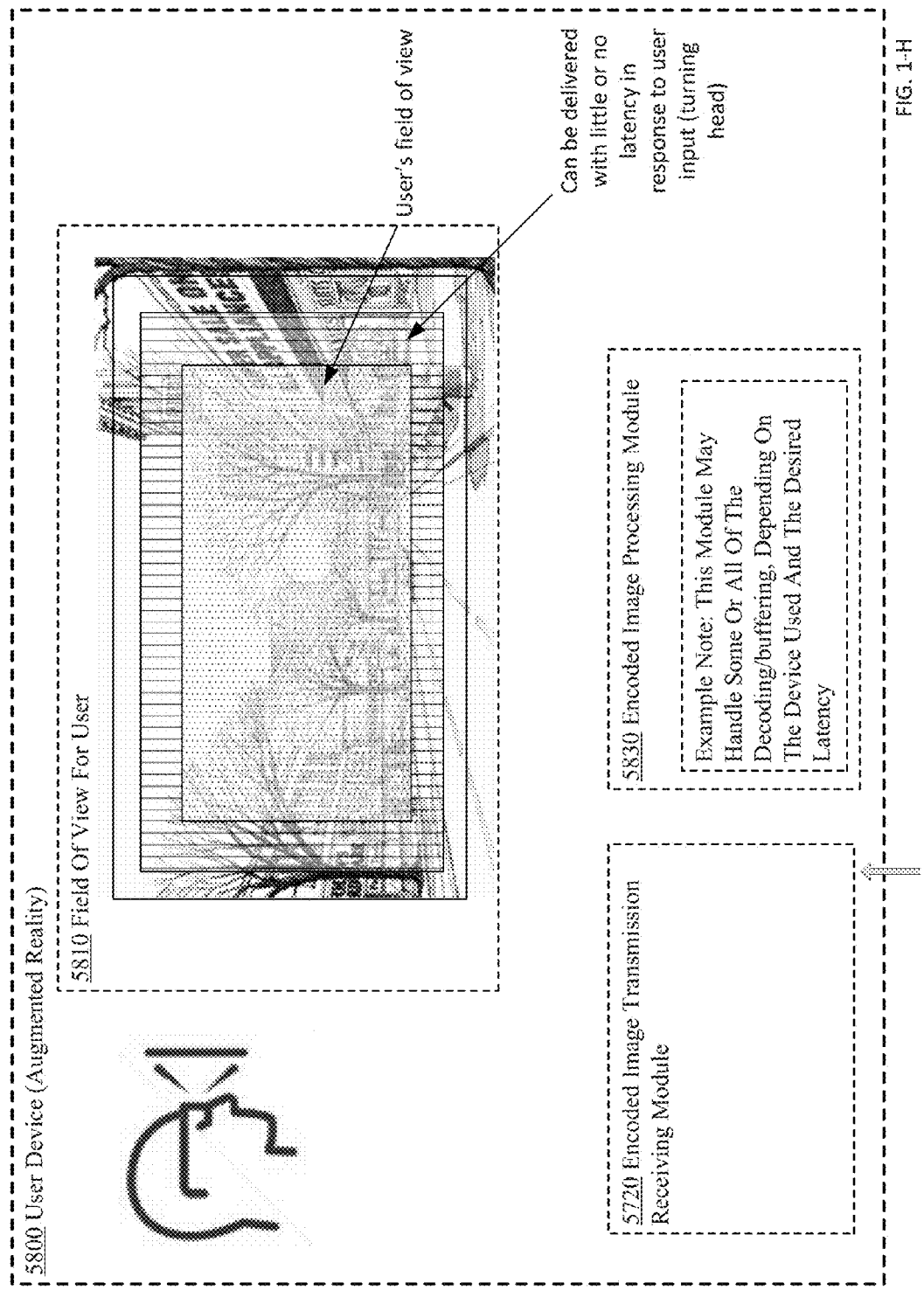
FIG. 1-H

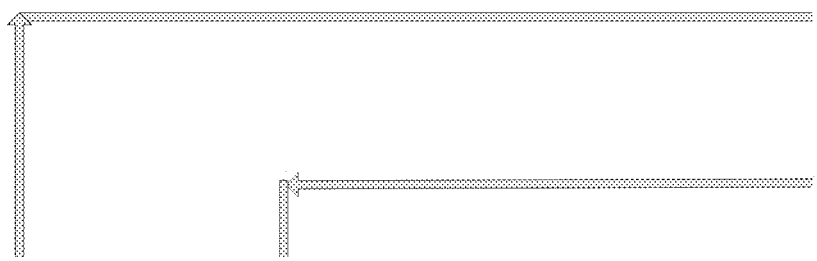
FIG. 1-J

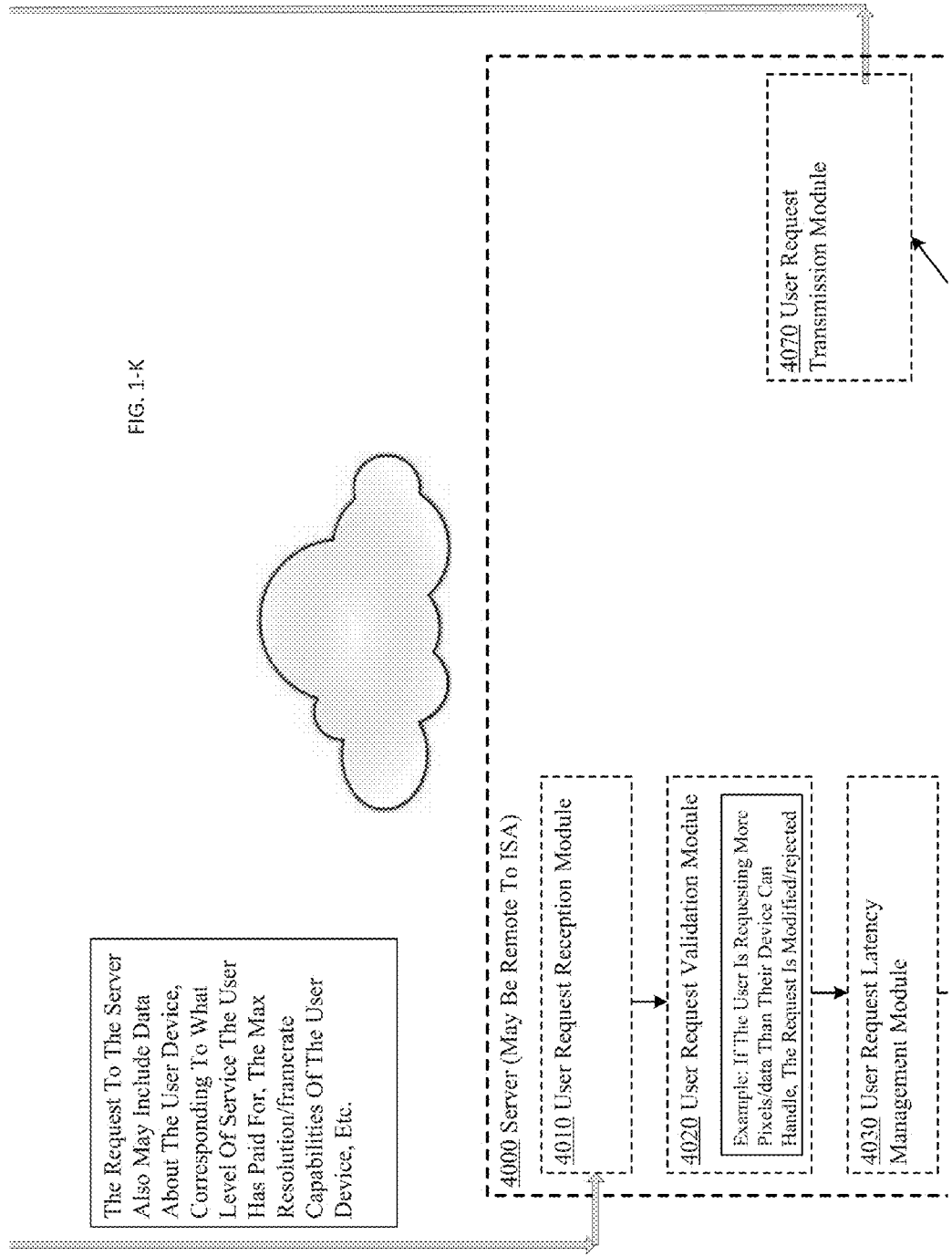
FIG. 1-K

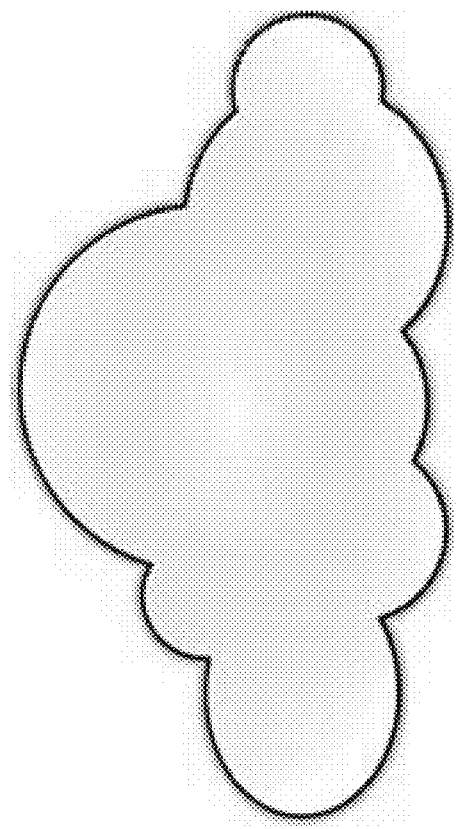
FIG. 1-L

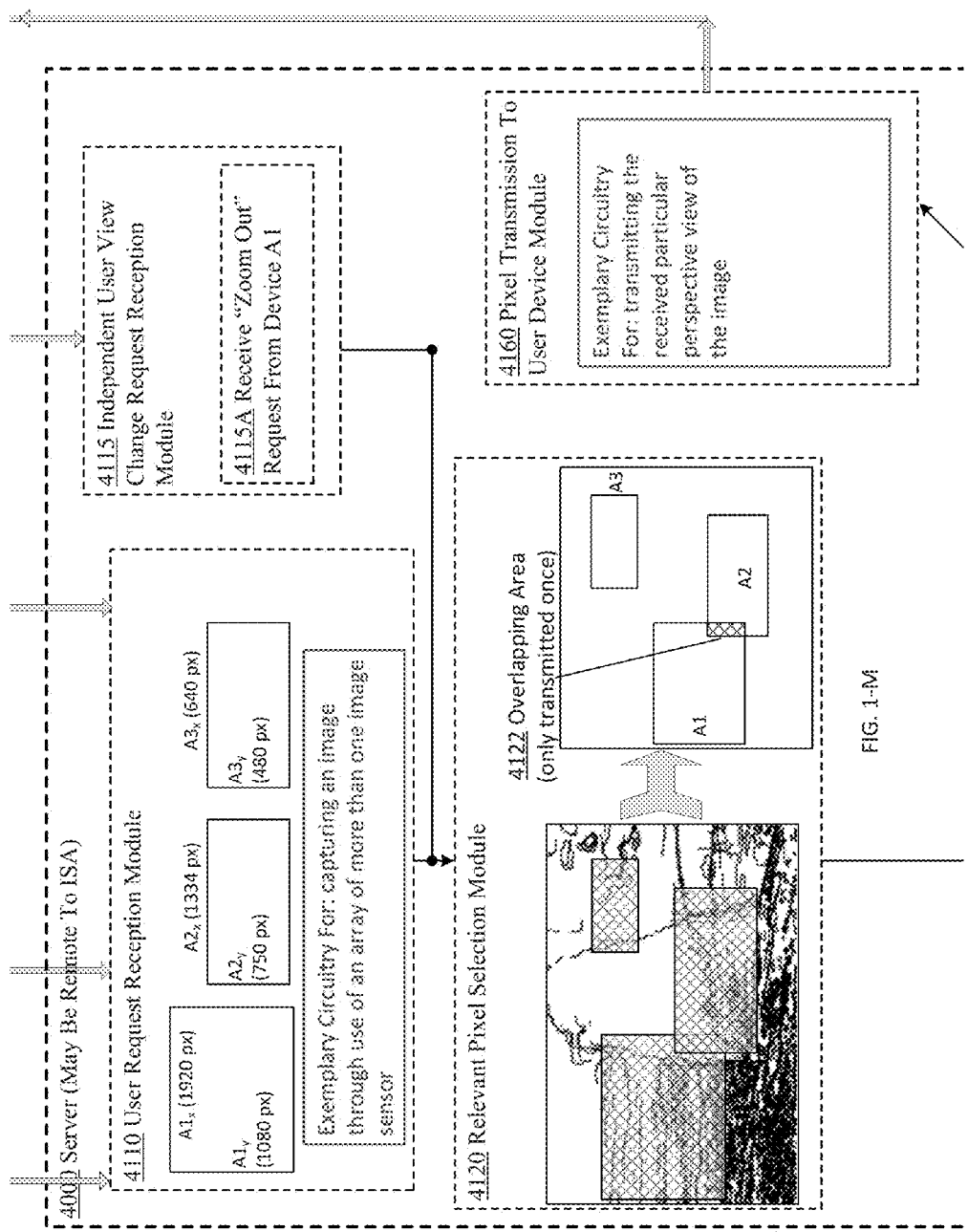
FIG. 1-M

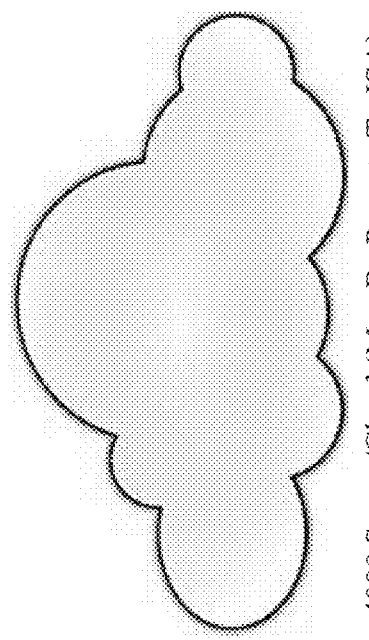
FIG. 1-N

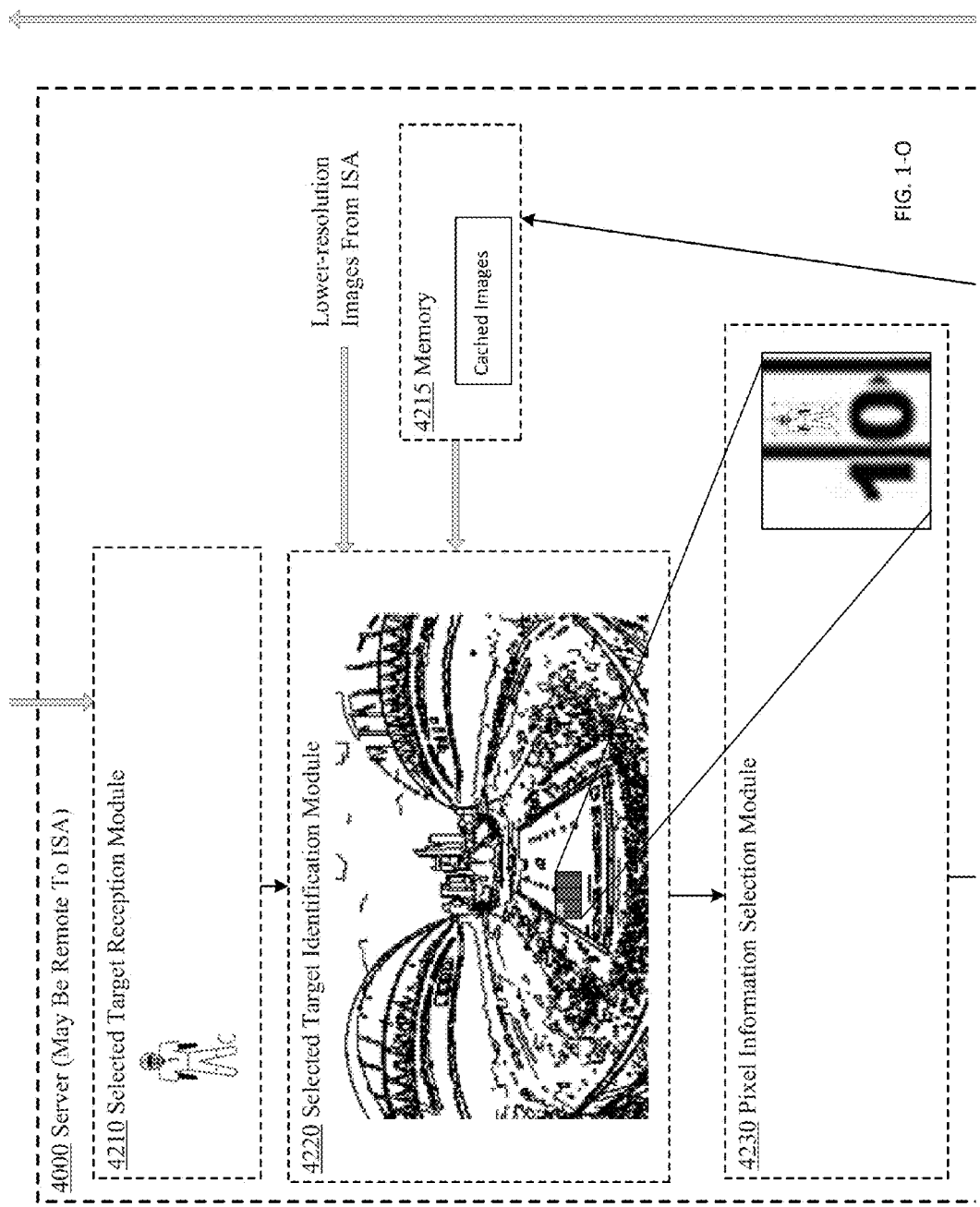
FIG. 1-O

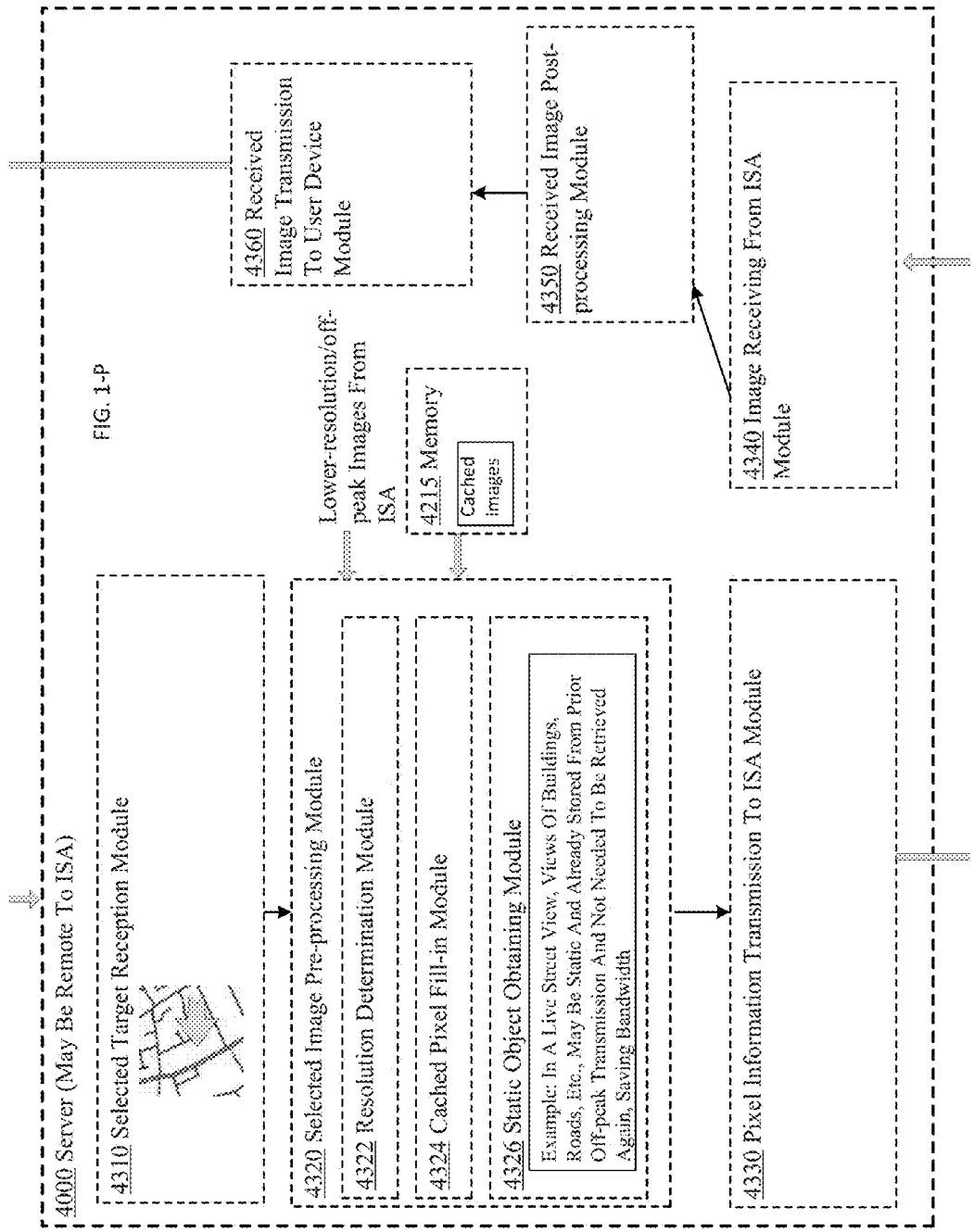

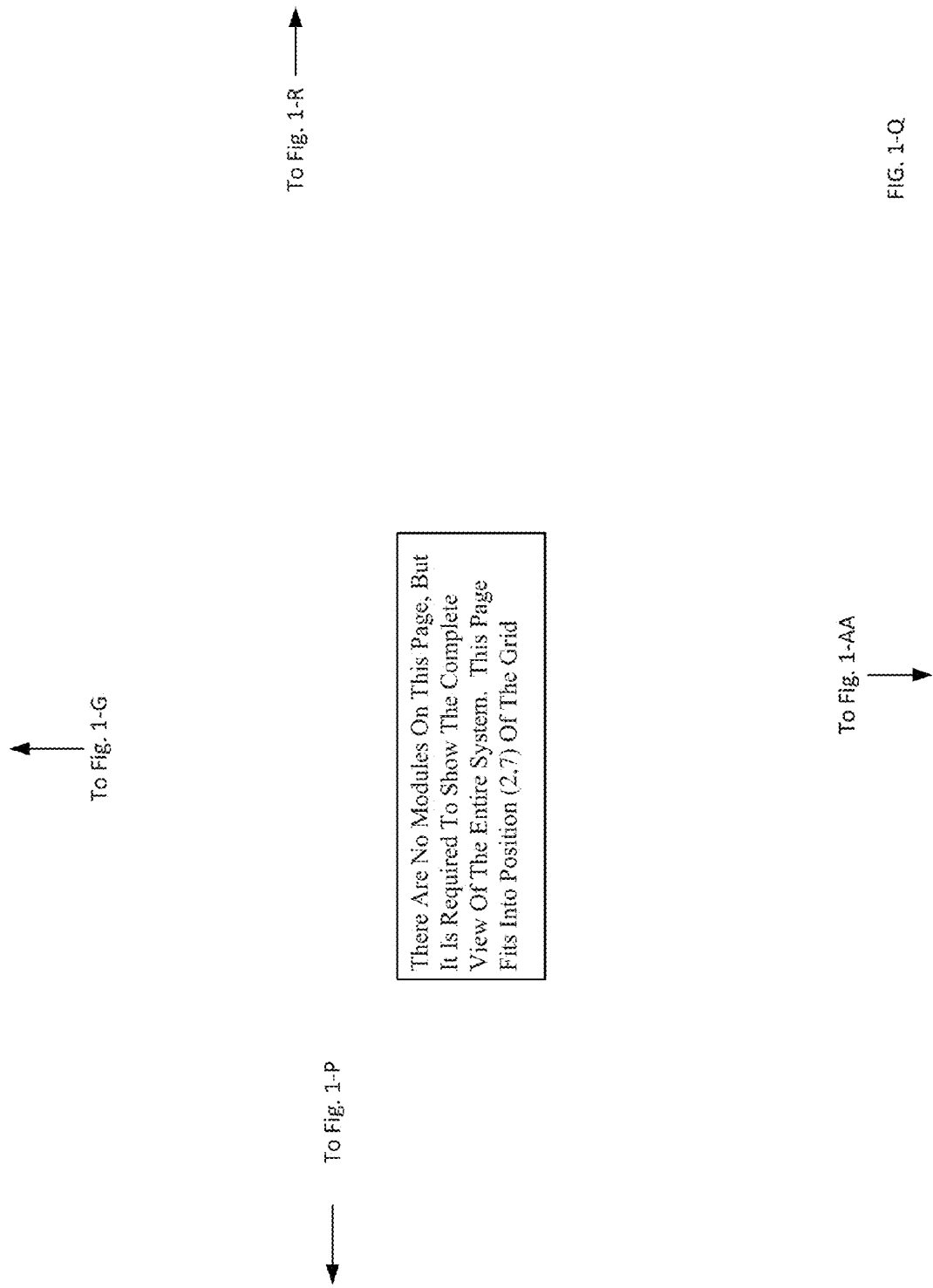
FIG. 1-Q

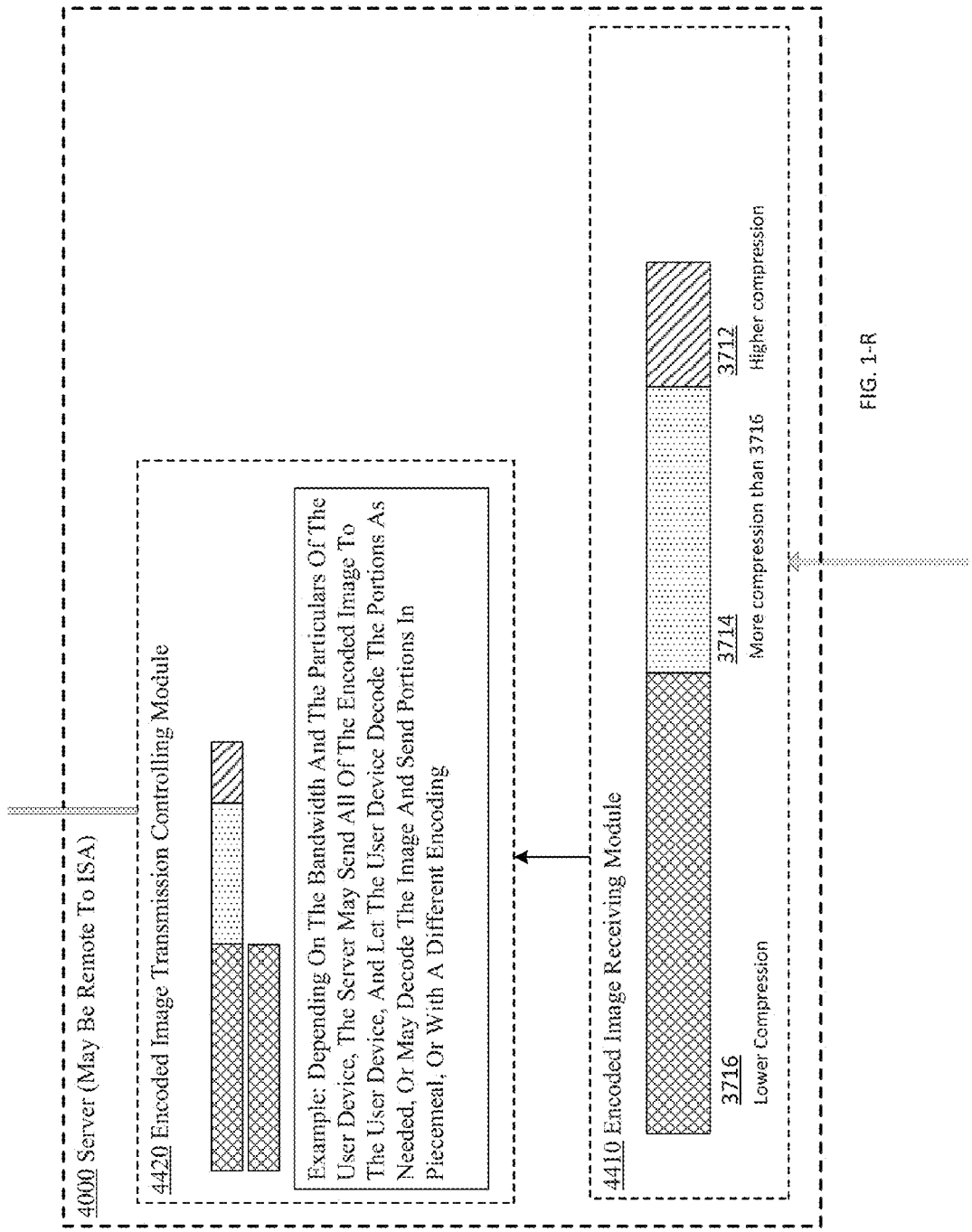

User Data Collection Module 7705 May Actively Or Passively Collect Data From User Device 5900 To Assist In Providing Targeted Ads
FIG. 1-S

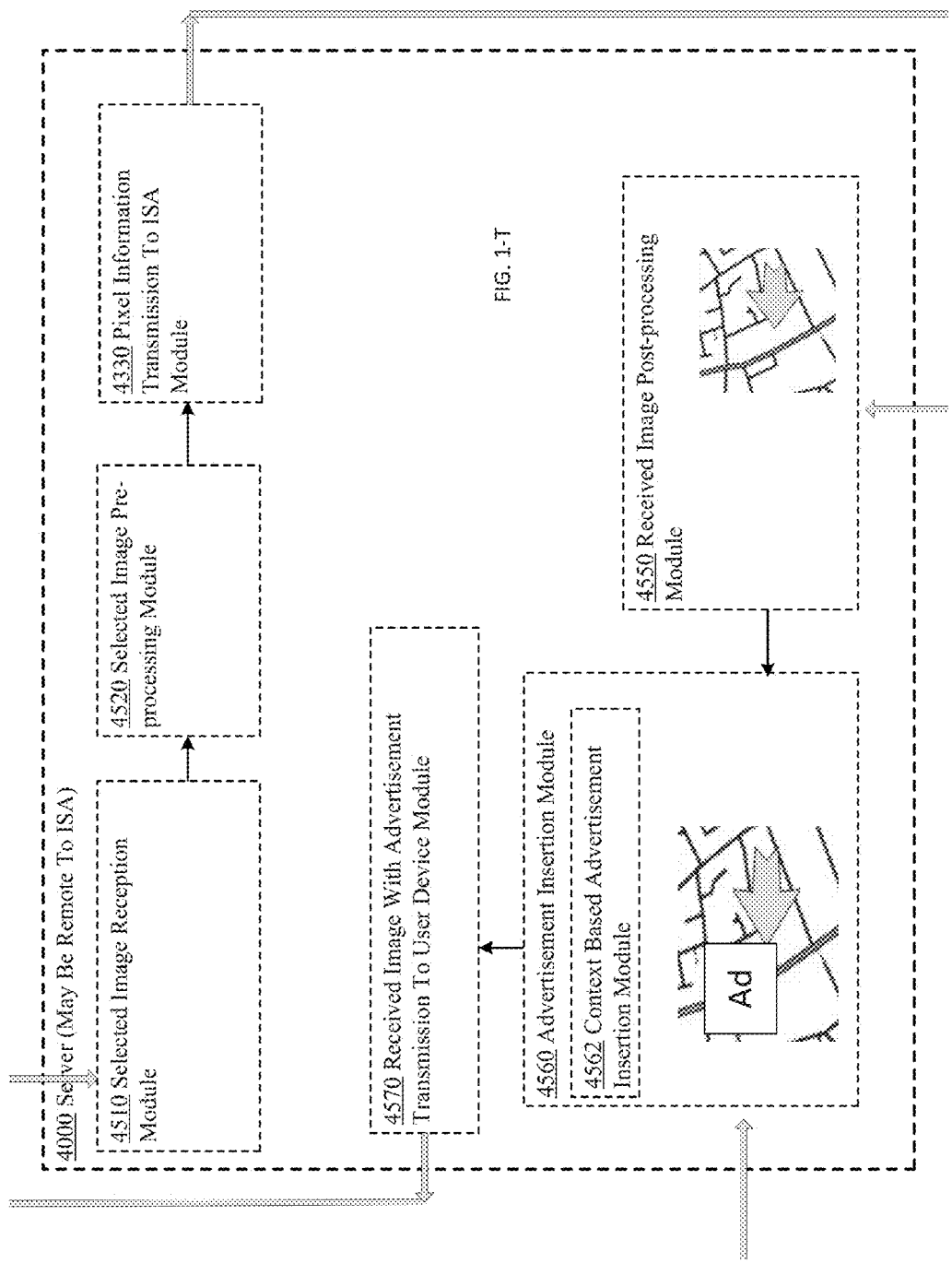
FIG. 1-T

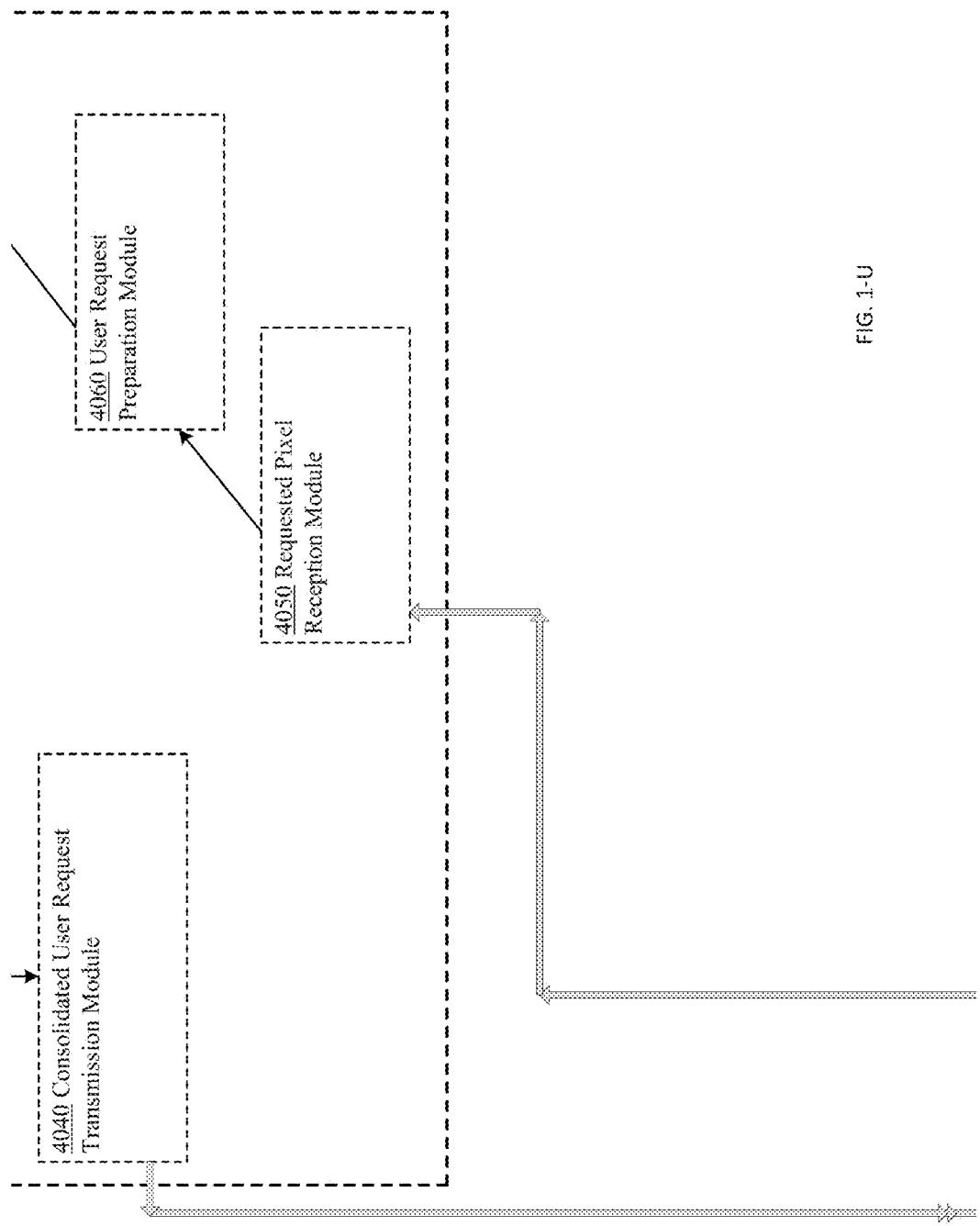
FIG. 1-U

There Are No Modules On This Page. But It Is Required To Show The Complete View Of The Entire System. This Page Fits Into Position (3,2) Of The Grid

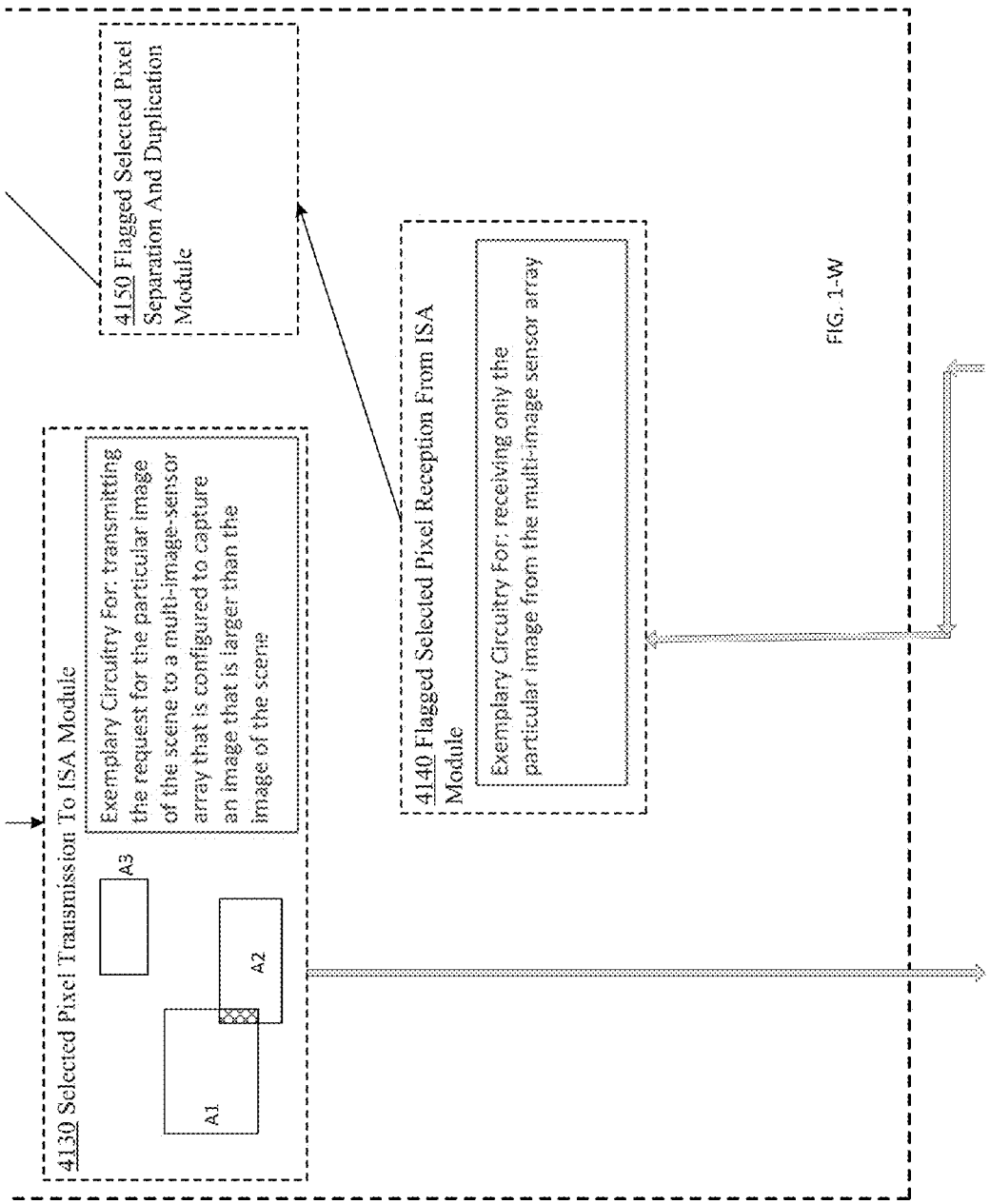

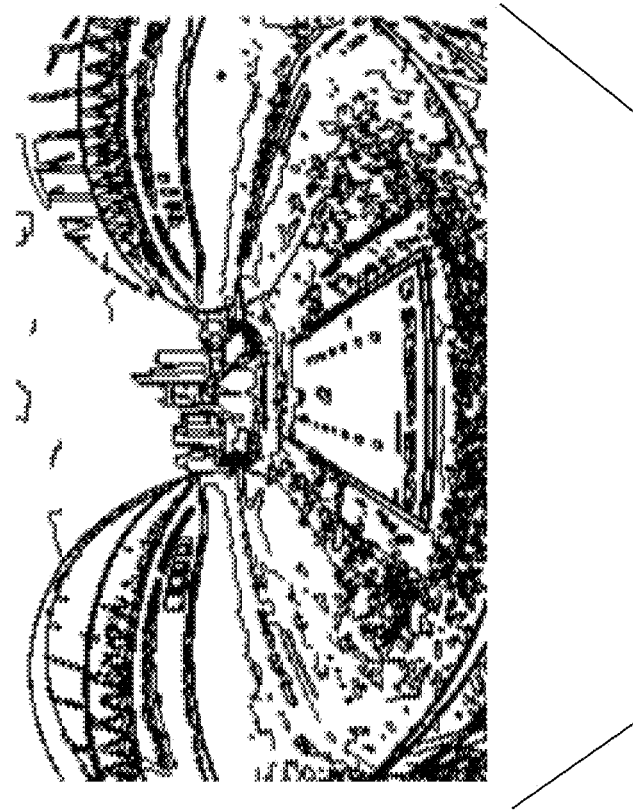
FIG. 1-X

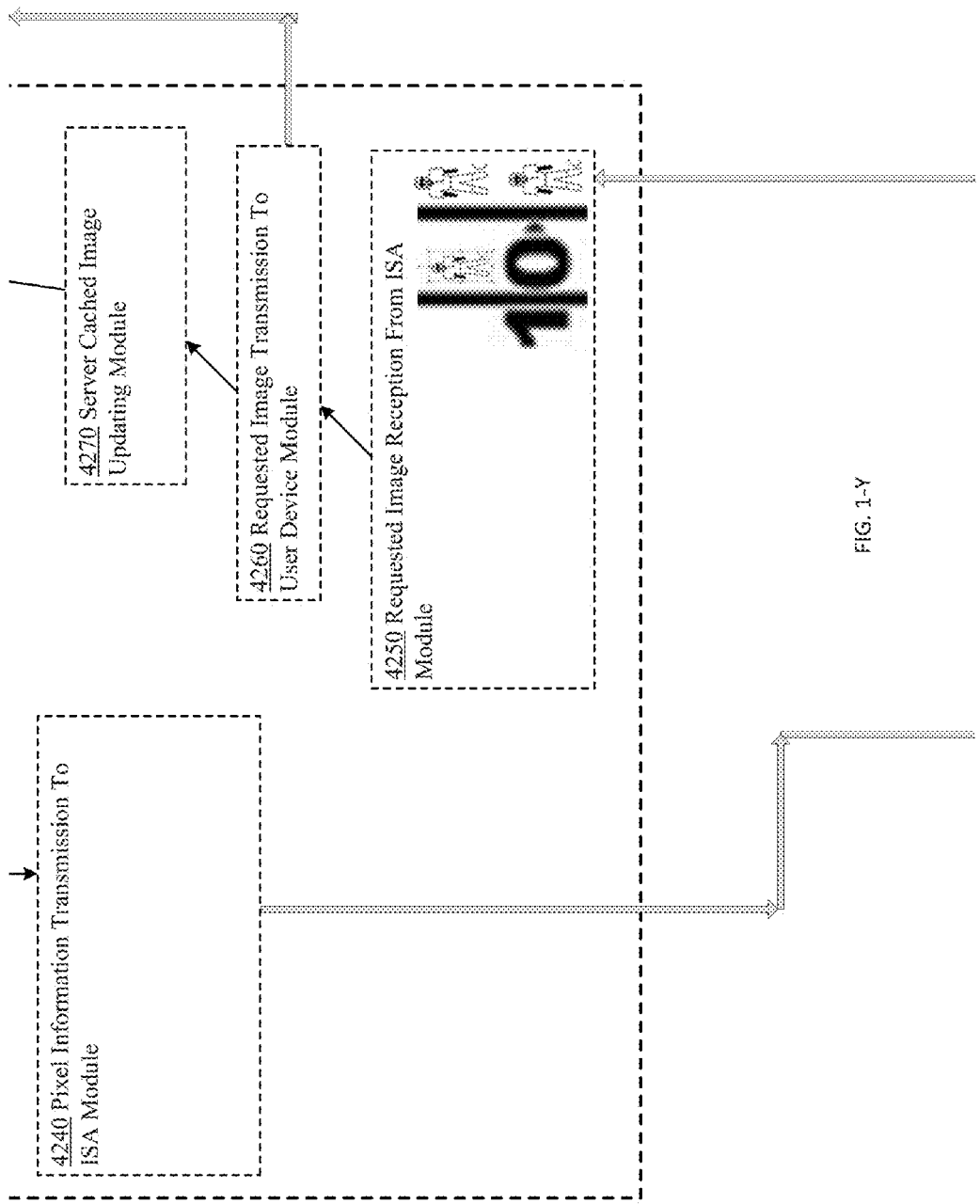
FIG. 1-Y

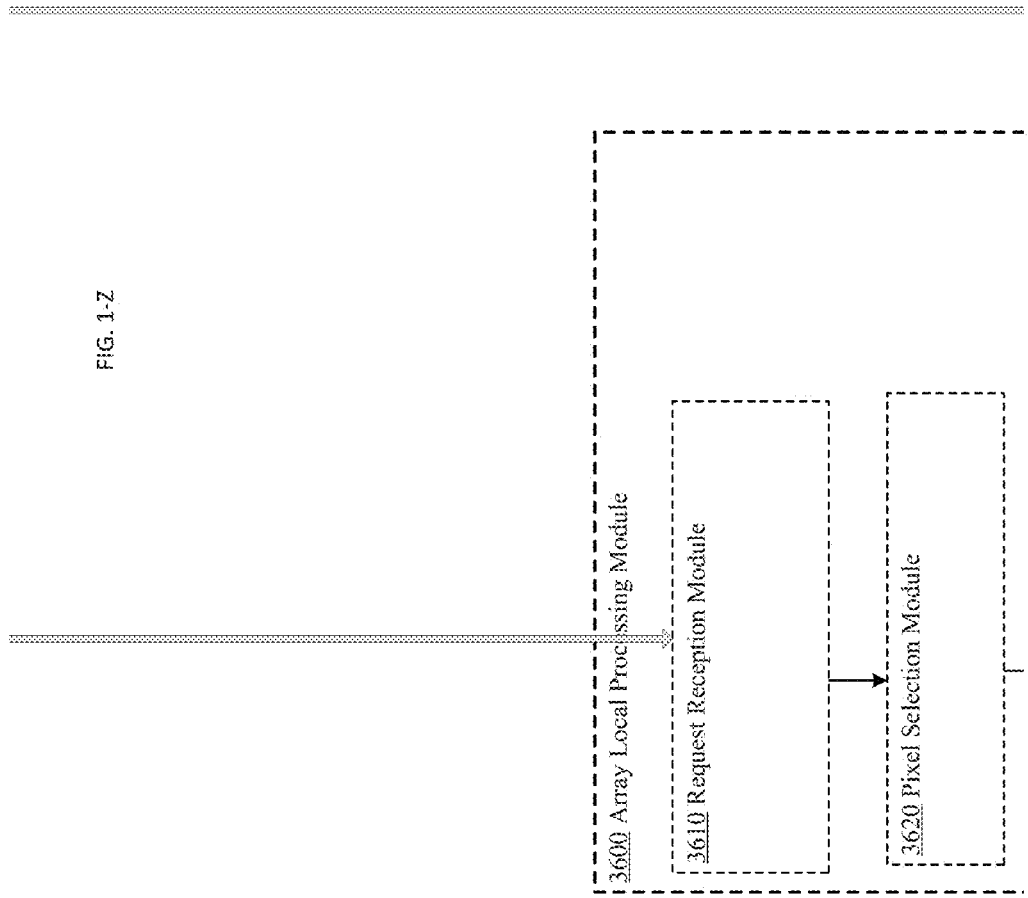
FIG. 1-Z

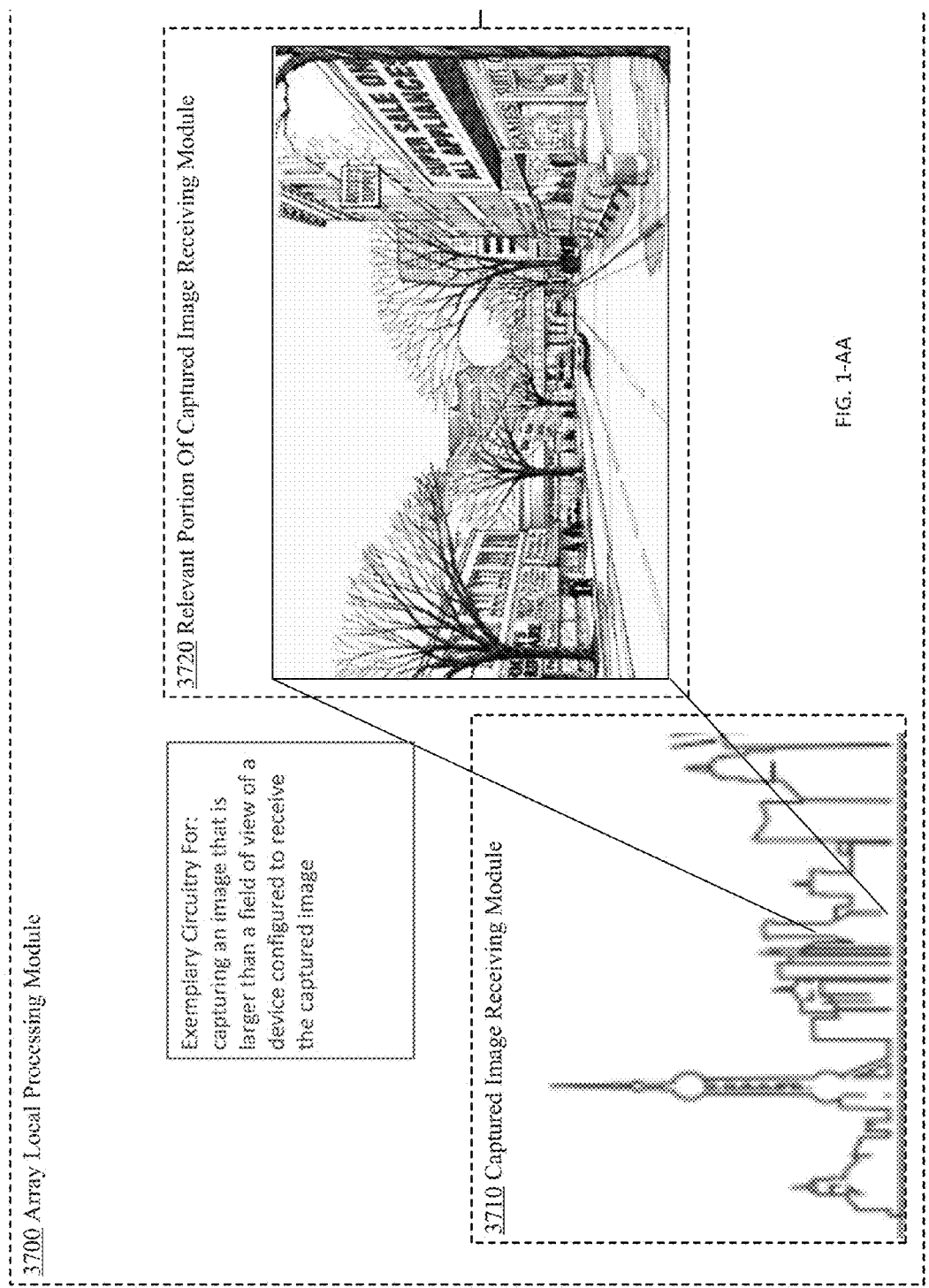
FIG. 1-AA

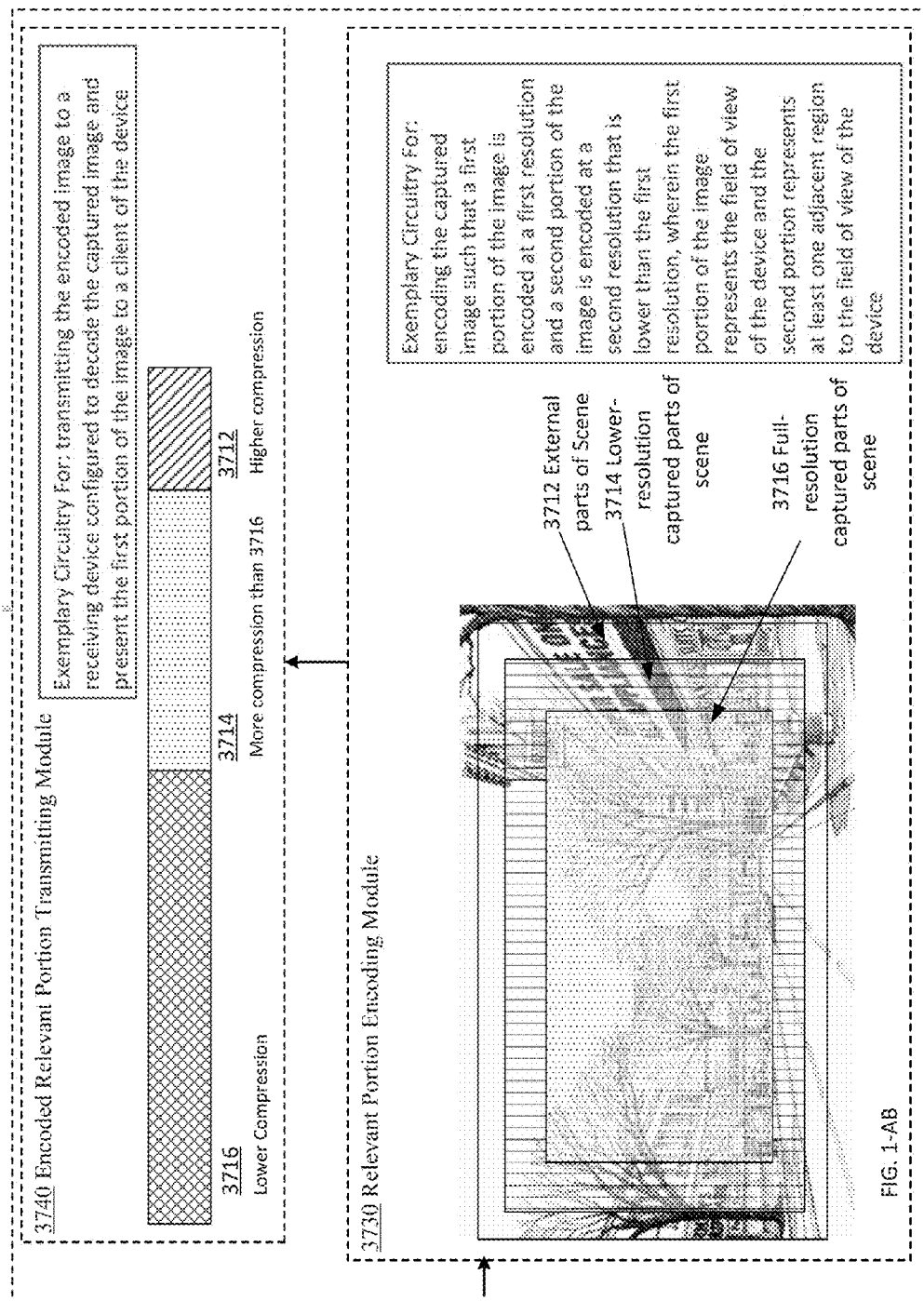

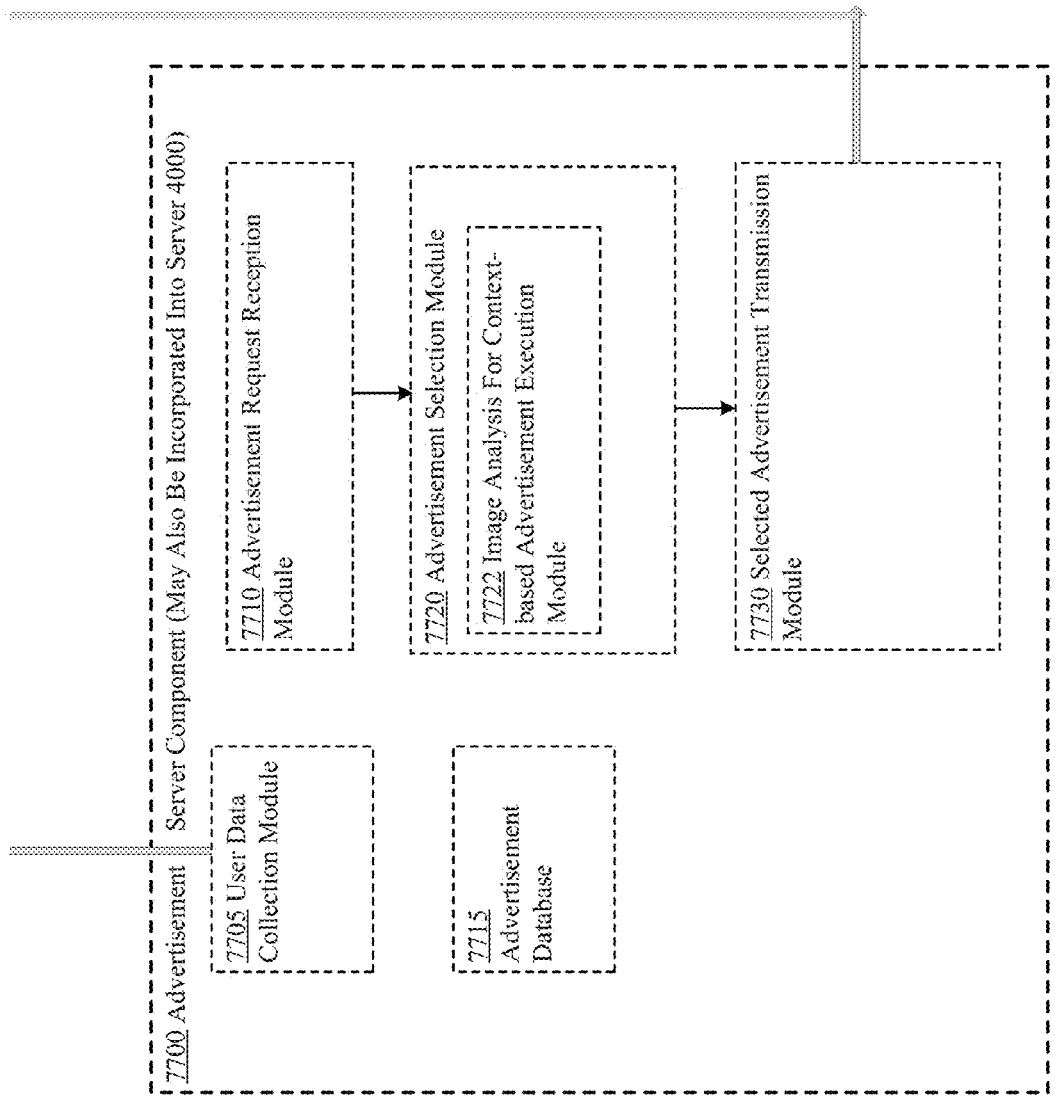
FIG. 1-AC

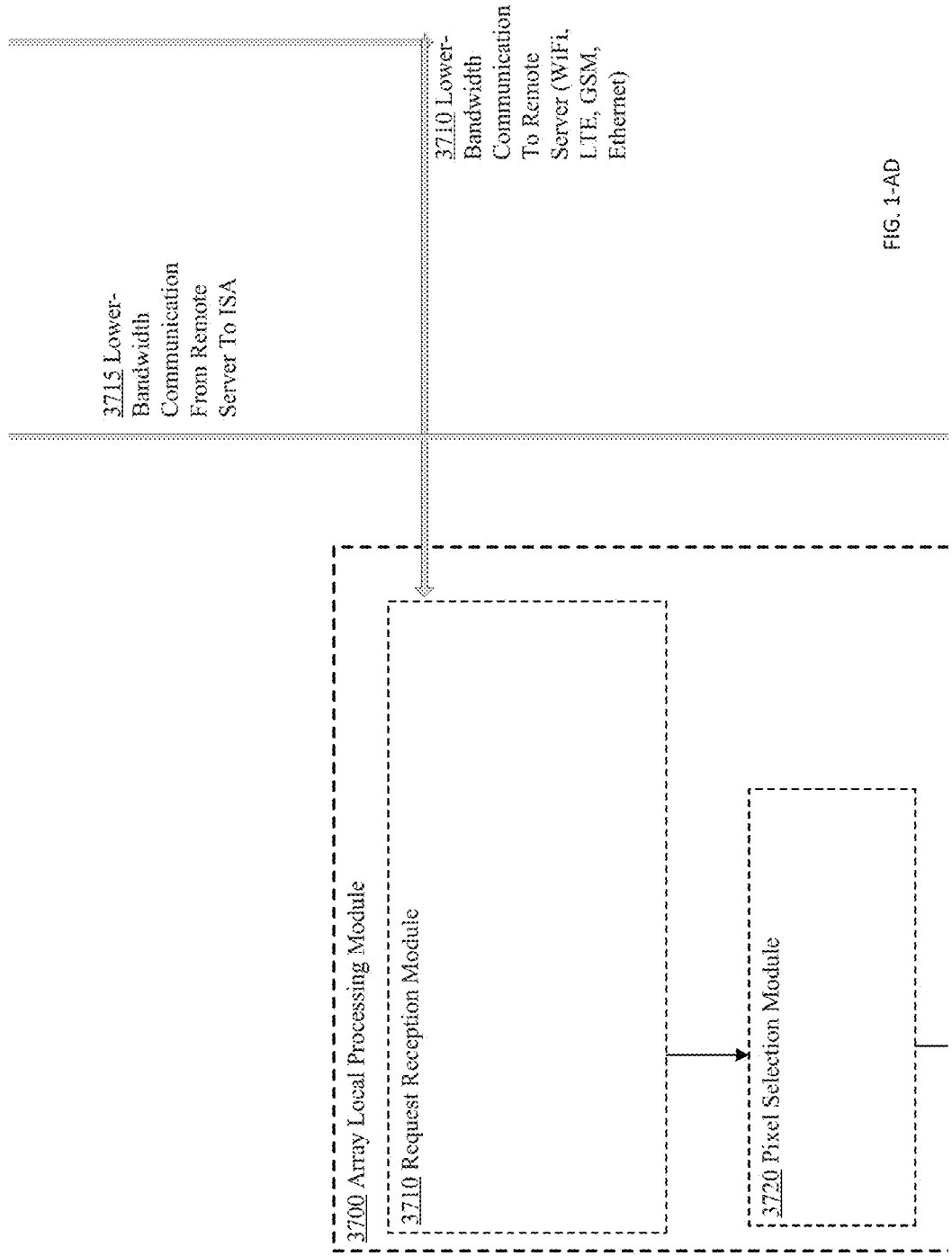
FIG. 1-AD

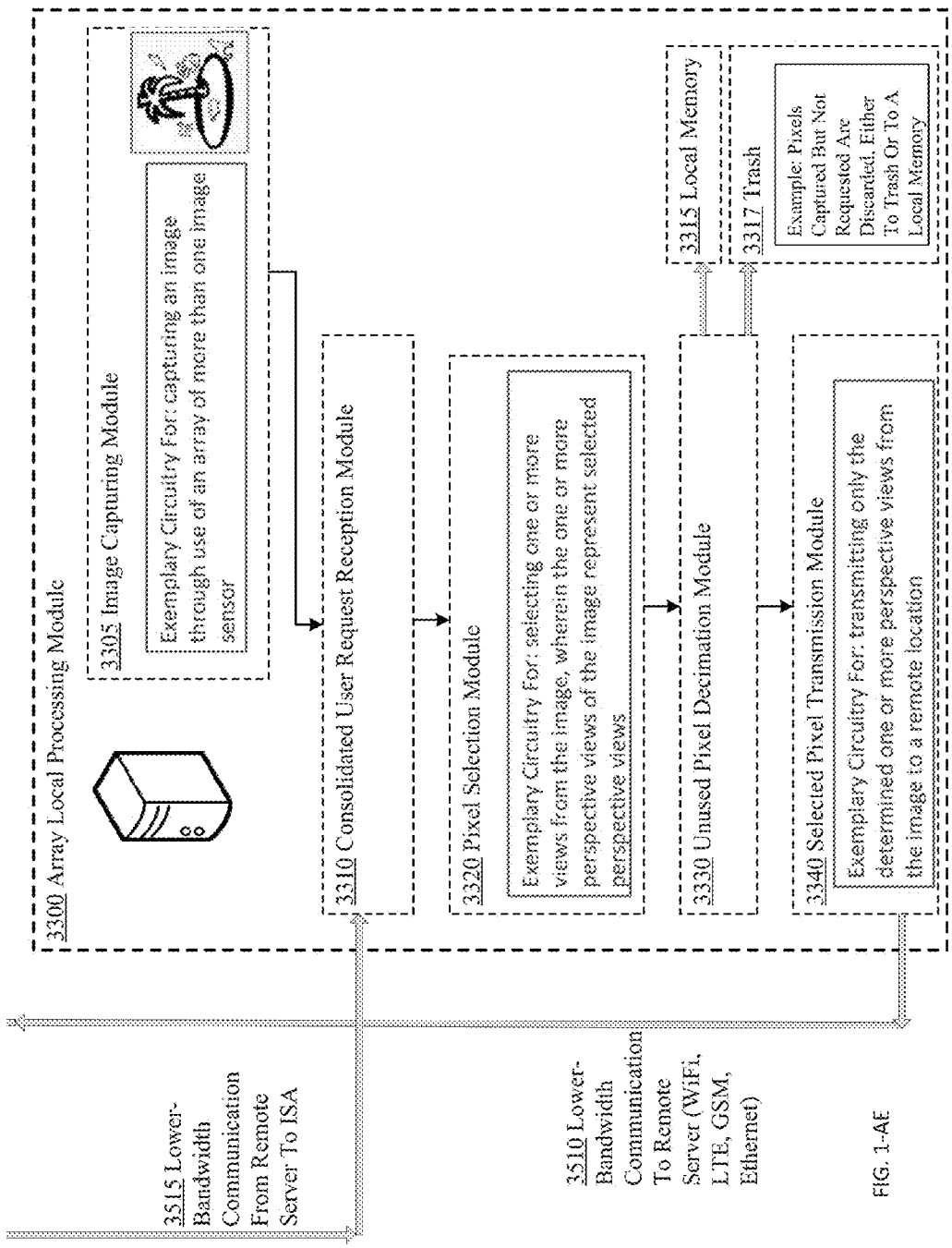
FIG. 1-AE

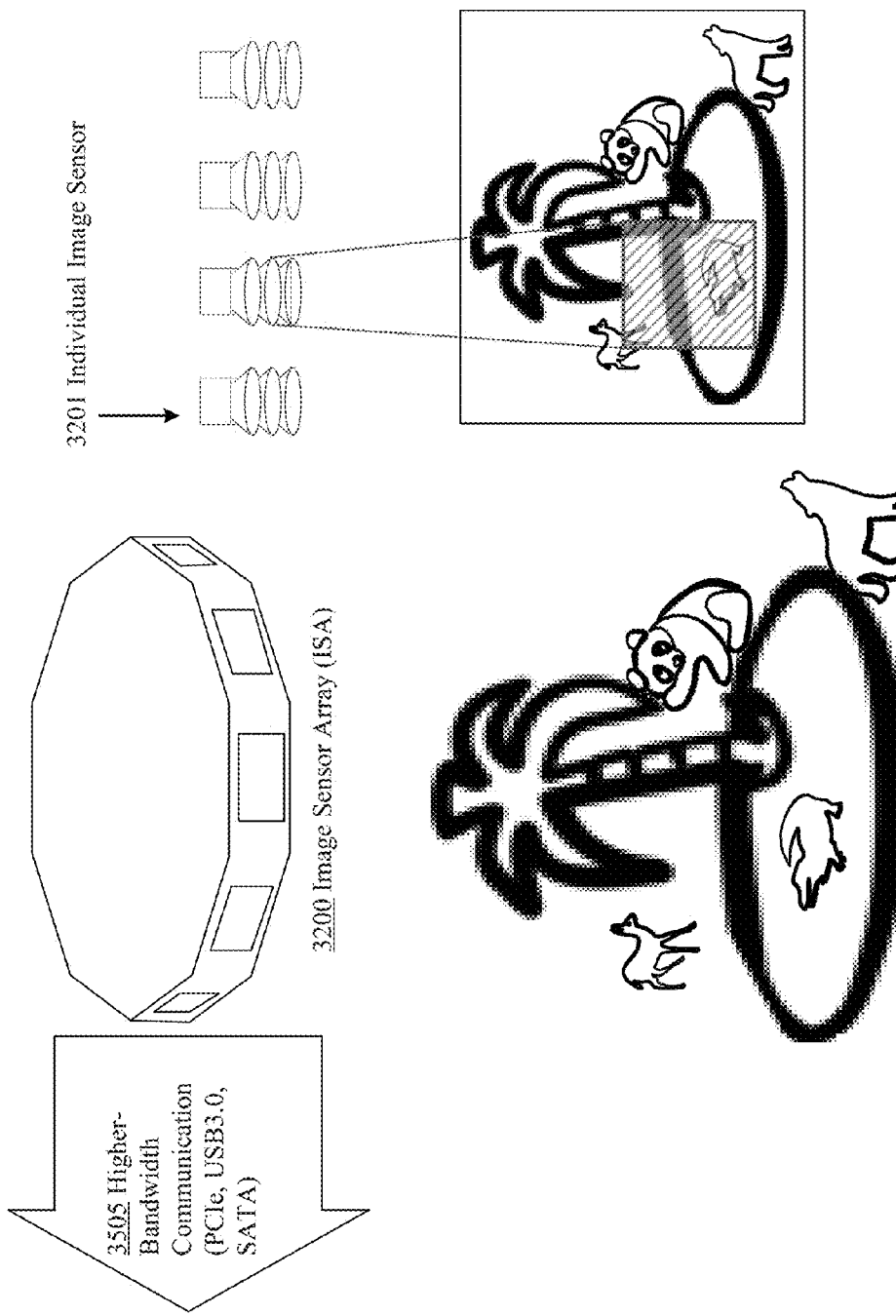

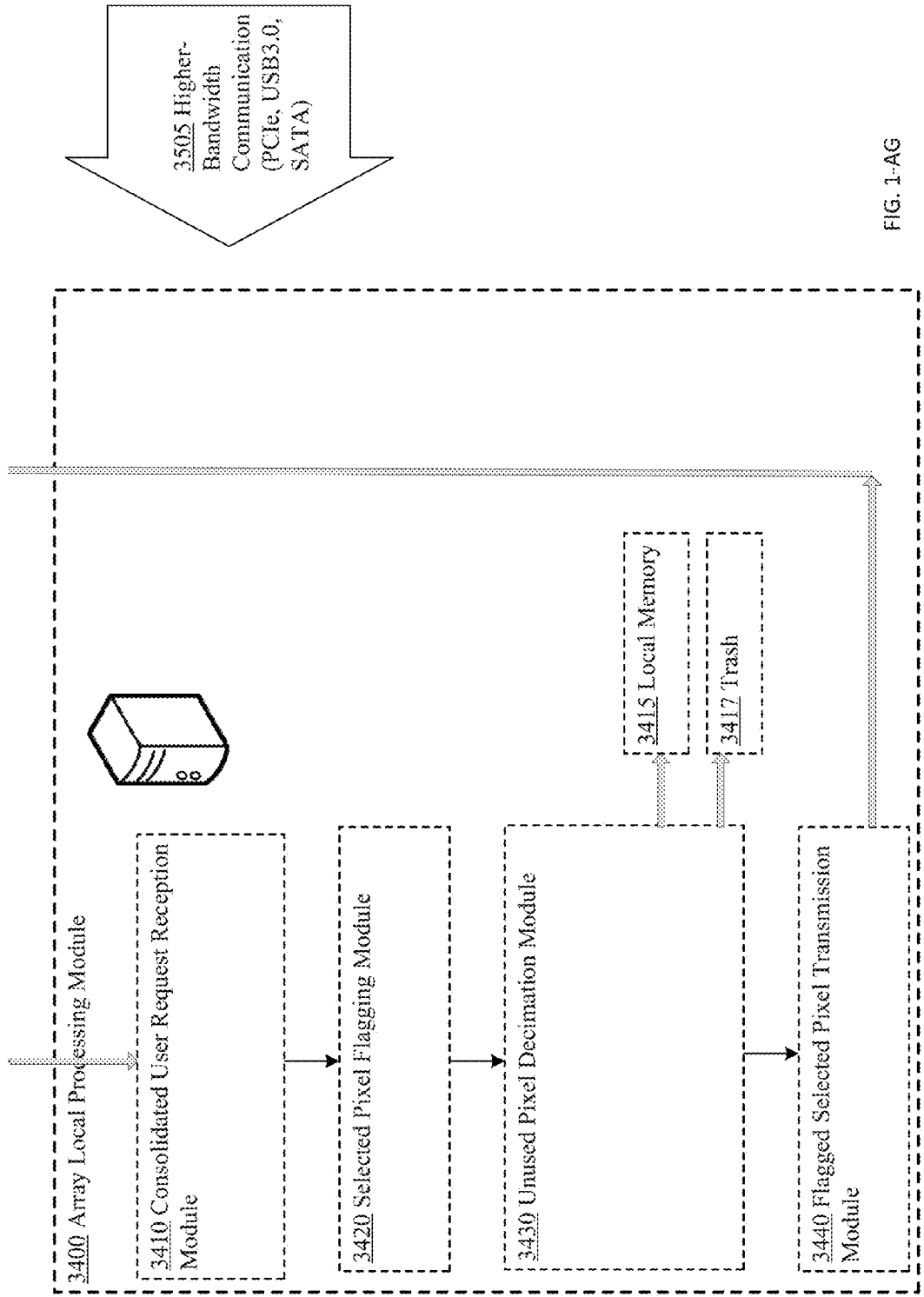
FIG. 1-AG

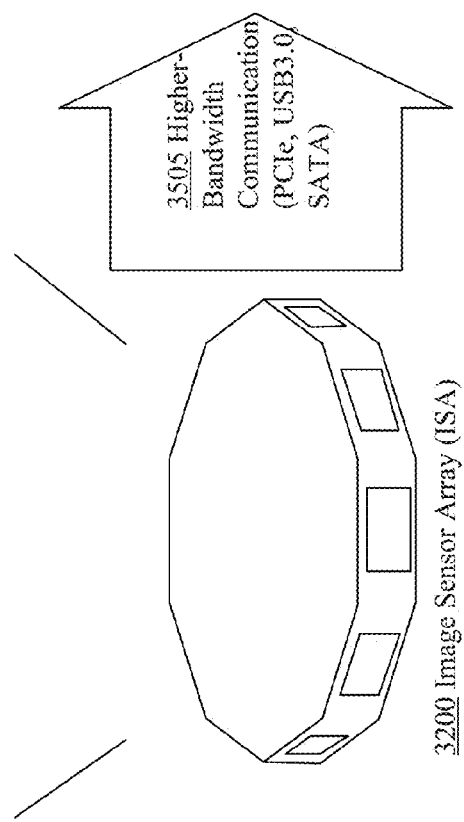
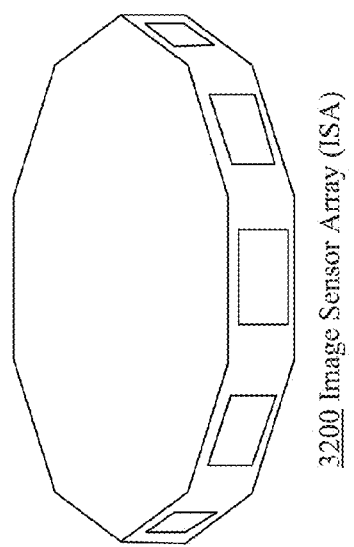
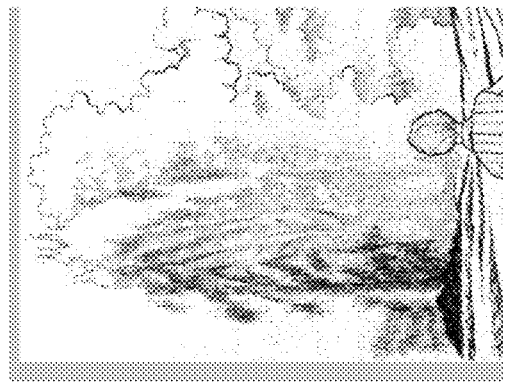
FIG. 1-AH

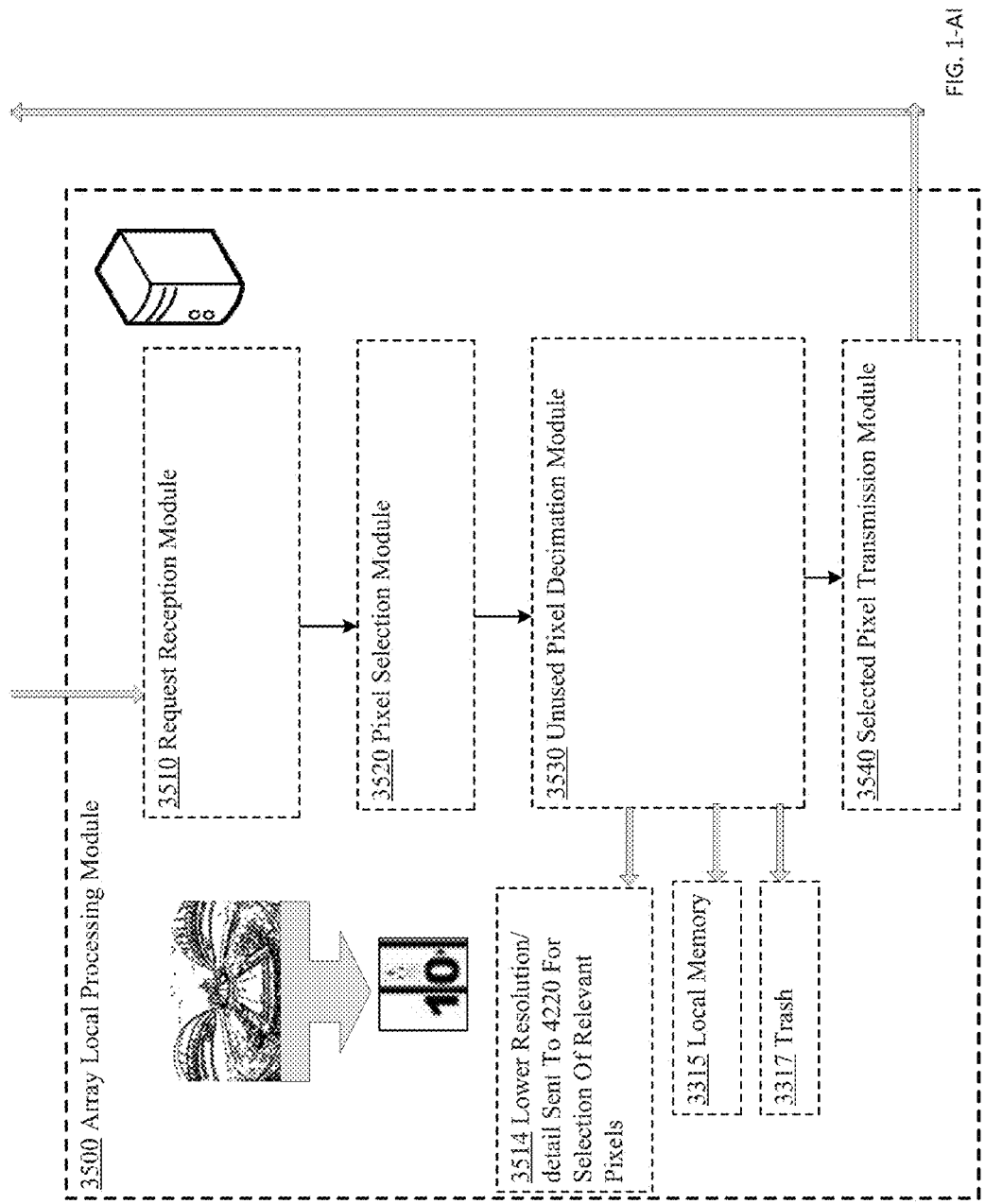

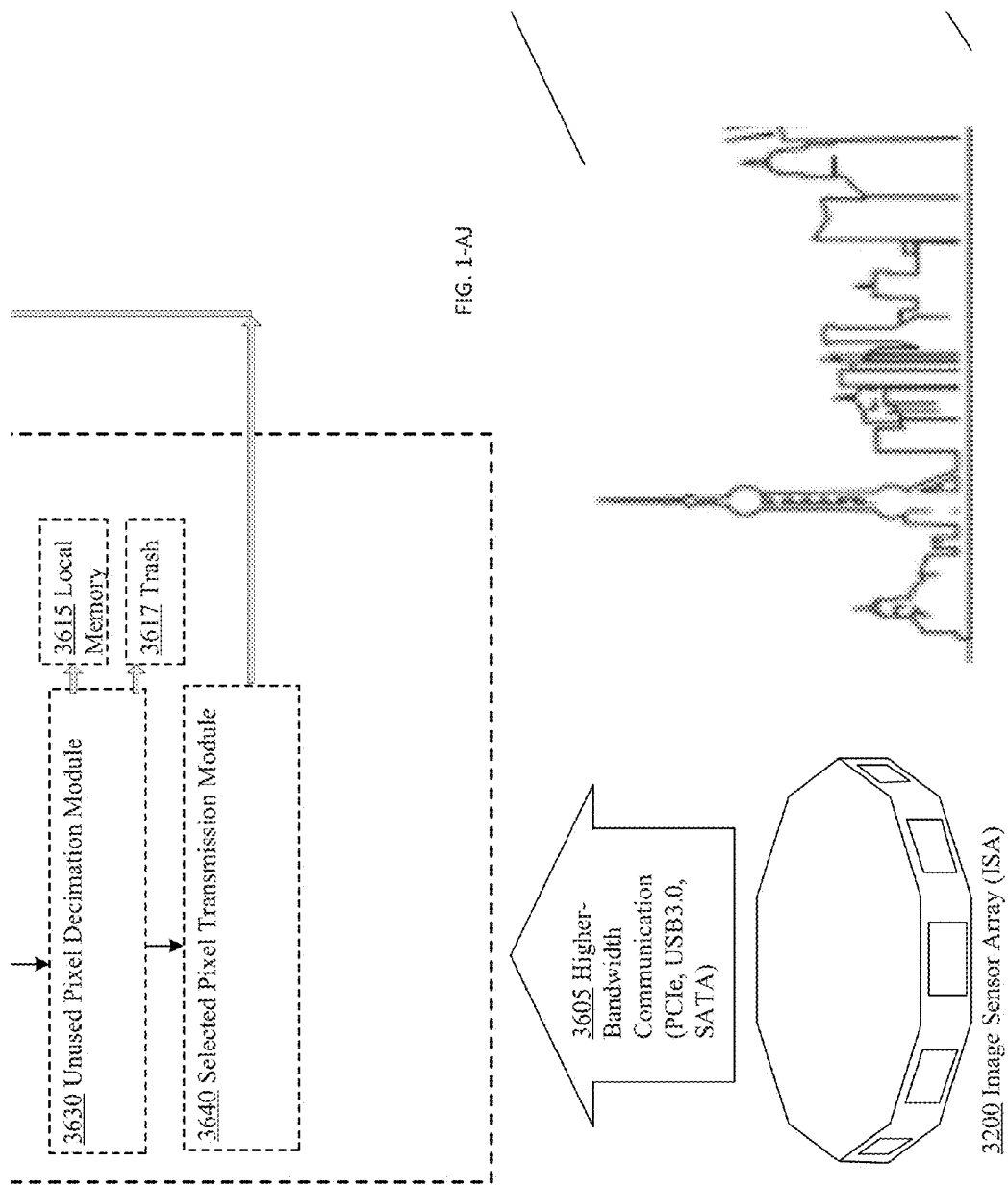
FIG. 1-AJ

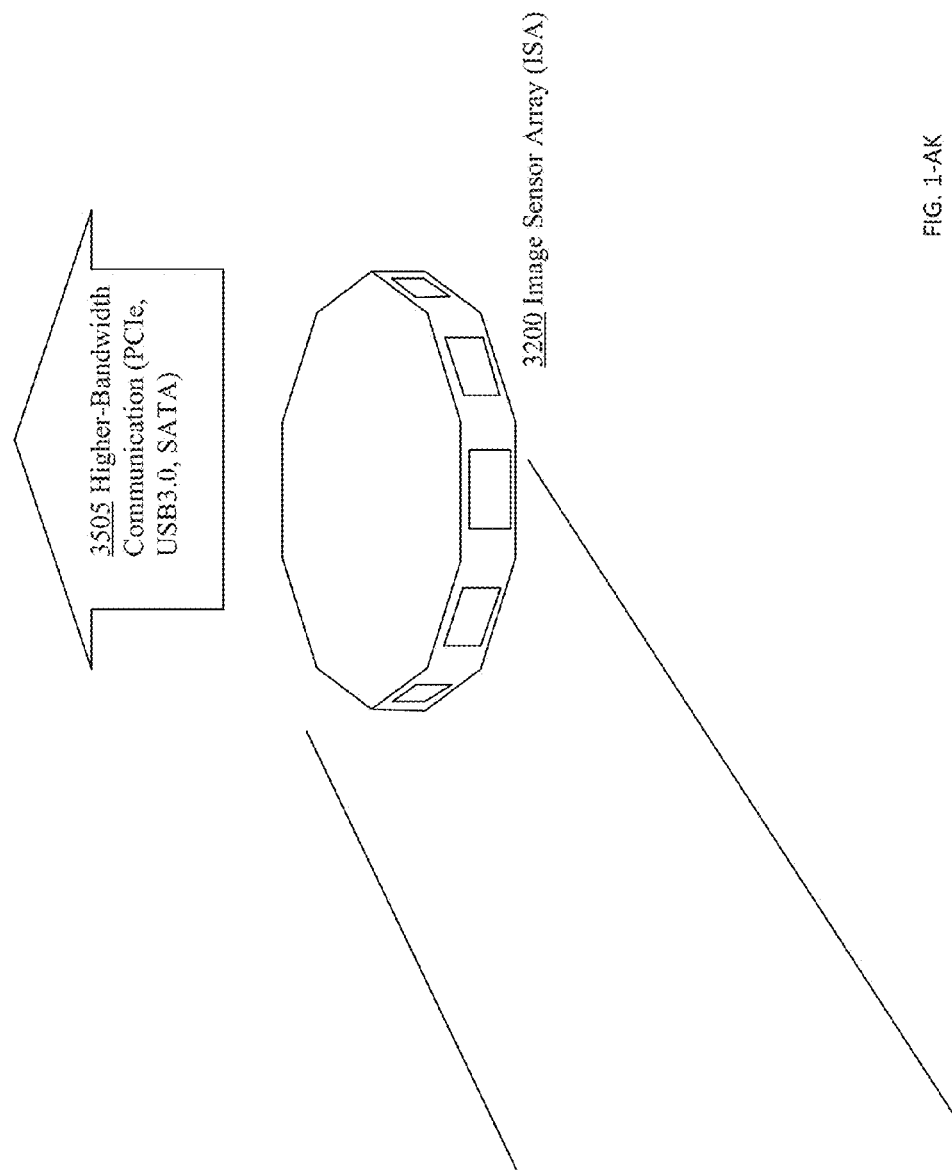

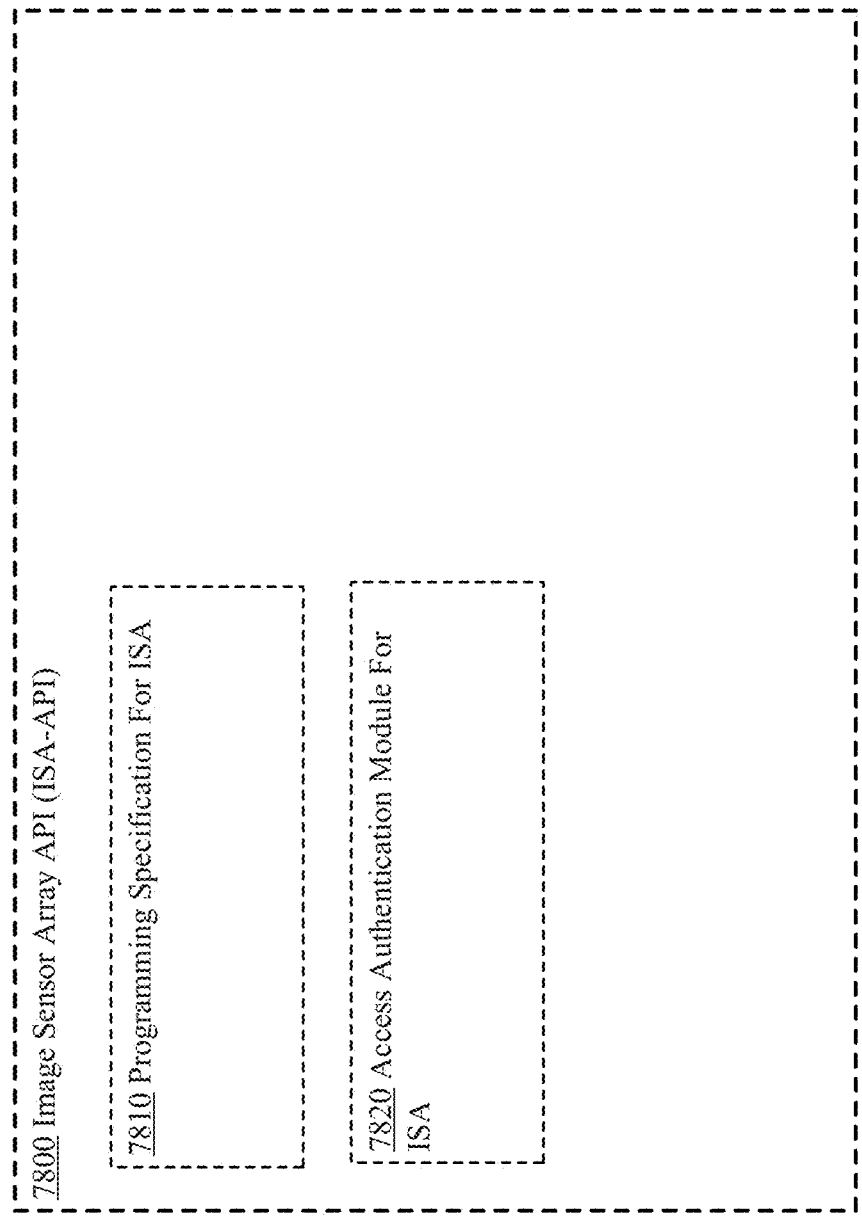
FIG. 1-AL

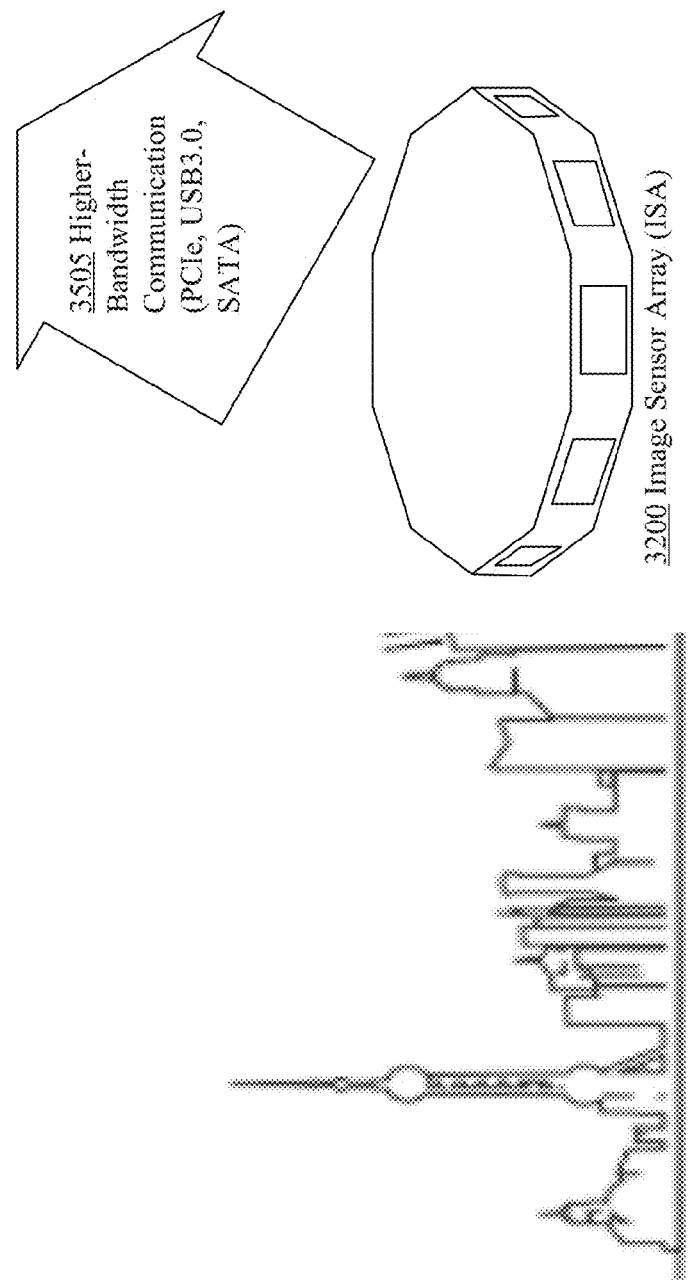
FIG. 1-AM

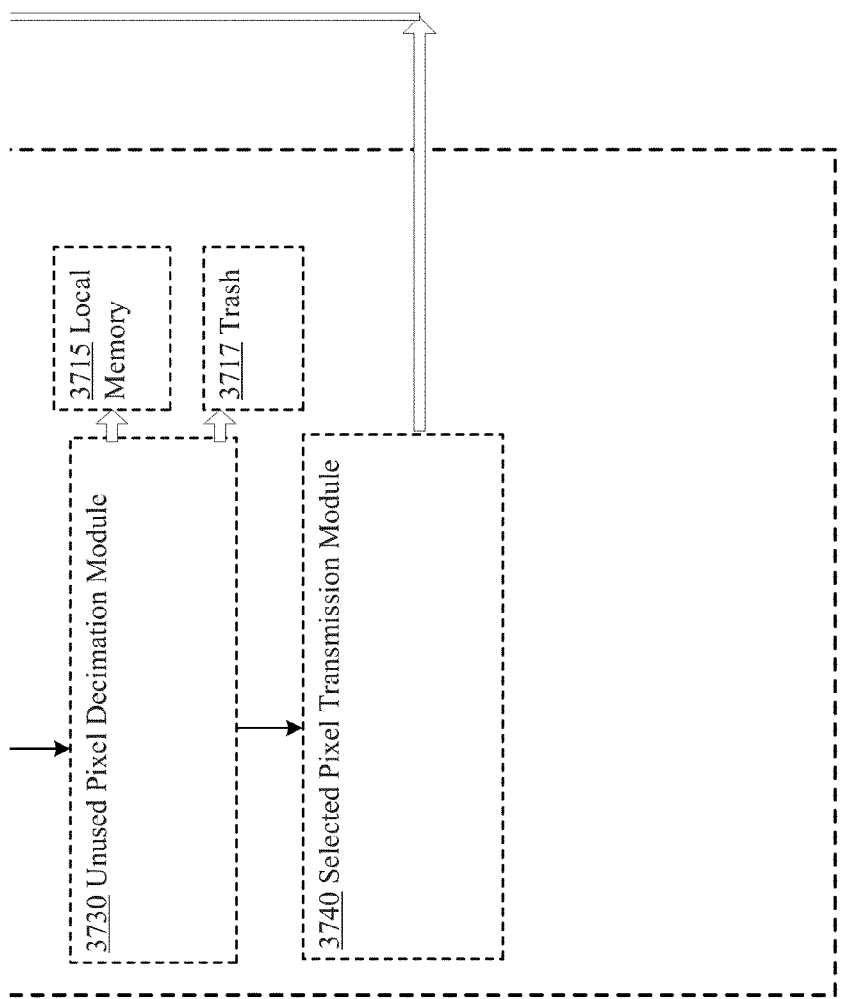
FIG. 1-AN

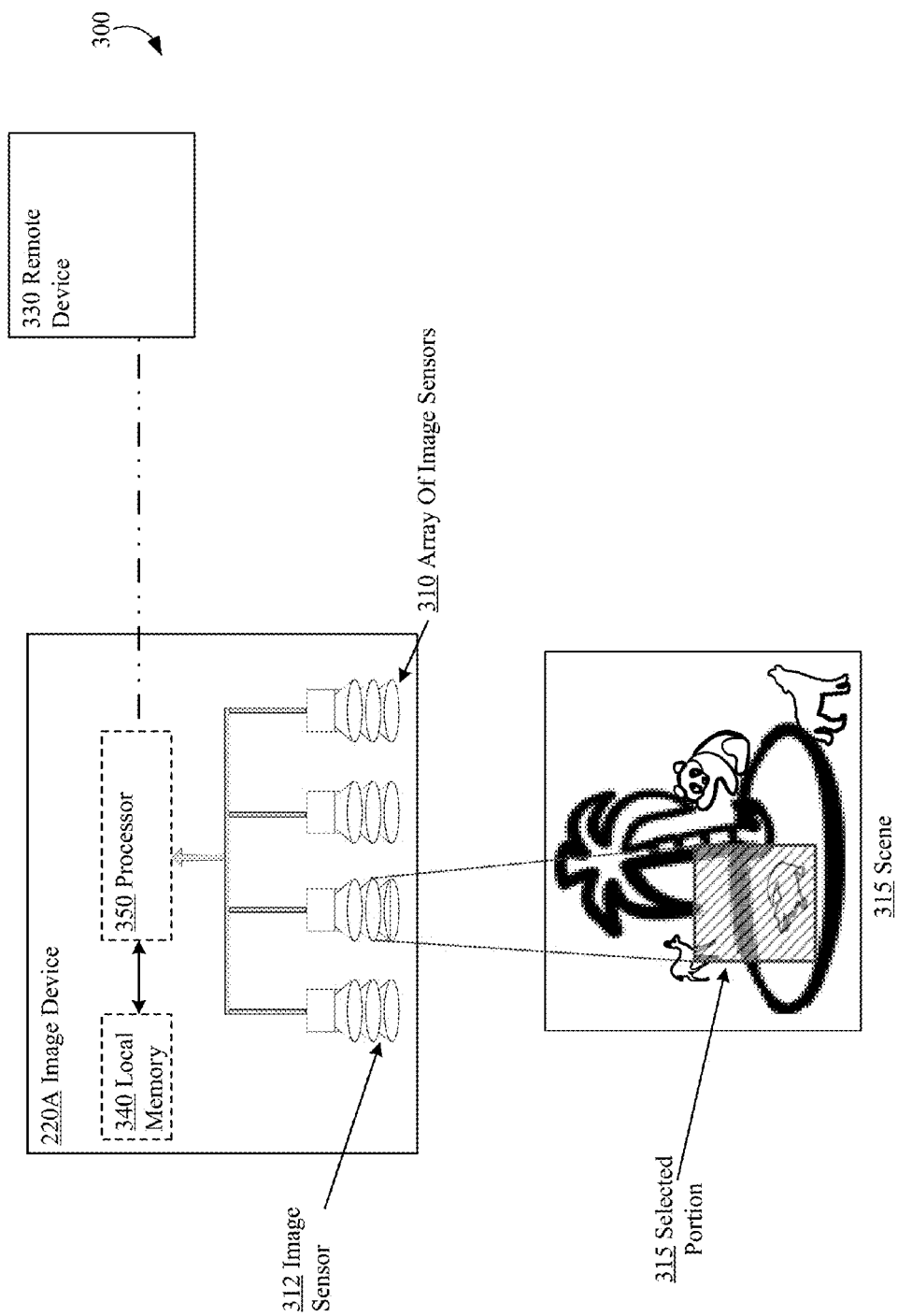

252 Multiple Image Sensor Based Scene Capturing Module Configured To Capture A Scene That Includes One Or More Images, Through Use Of More Than One Image Sensor 602 Multiple Image Sensor Based Scene That Includes The One Or More Images Capturing Through Use Of An Array Of Image Sensors Module 604 Multiple Image Sensor Based Scene That Includes The One Or More Images Capturing Through Use Of Two Image Sensors Arranged Side By Side And Angled Toward Each Other Module 606 Multiple Image Sensor Based Scene That Includes The One Or More Images Capturing Through Use Of Image Sensors Aligned In A Grid Pattern Module 608 Multiple Image Sensor Based Scene That Includes The One Or More Images Capturing Through Use Of Image Sensors Aligned In A Line Pattern Module 610 Multiple Image Sensor Based Scene That Includes The One Or More Images Capturing Through Use Of Image Sensors Aligned In A Line Such That A Field Of View Is Greater Than 120 Degrees Module 612 Multiple Image Sensor Based Scene That Includes The One Or More Images Capturing Through Use Of Image Sensors Aligned In A Line Such That A Field Of View Is 180 Degrees Module

| Fig. 6A | Fig. 6B | Fig. 6C | Fig. 6D | Fig. 6E | Fig. 6F |

252 Multiple Image Sensor Based Scene Capturing Module Configured To Capture A Scene That Includes One Or More Images, Through Use Of More Than One Image Sensor

640 Multiple Image Sensor Based Scene Capturing Module Configured To Capture A Scene That Is Larger Than A Bandwidth For Remote Transmission Of The Scene Capturing Through Use Of More Than One Image Sensor Module

642 Multiple Image Sensor Based Scene That Contains More Image Data Than A Bandwidth For Remote Transmission Of The Scene Capturing Through Use Of More Than One Image Sensor Module

644 Multiple Image Sensor Based Scene That Contains More Image Data Than A Bandwidth For Remote Transmission Of The Scene By A Factor Of Ten Capturing Through Use Of More Than One Image Sensor Module

646 Multiple Image Sensor Based Scene Of A Tourist Destination Capturing Through Use Of More Than One Image Sensor Module

648 Multiple Image Sensor Based Scene Of A Highway Bridge Capturing Through Use Of More Than One Image Sensor Module

650 Multiple Image Sensor Based Scene Of A Home Interior Capturing Through Use Of More Than One Image Sensor Module

FIG. 6D

252 Multiple Image Sensor Based Scene Capturing Module Configured To Capture A Scene That Includes One Or More Images, Through Use Of More Than One Image Sensor

| 652 Multiple Image Sensor Based Scene That Includes The One Or More Images Capturing Through Use Of A Grouping Of Image Sensors Module | 654 Multiple Image Sensor Based Scene That Includes The One Or More Images Capturing Through Use Of A Grouping Of Image Sensors That Direct Image Data To A Common Collector Module | 656 Multiple Image Sensor Based Scene That Includes The One Or More Images Capturing Through Use Of A Grouping Of Image Sensors That Include Charge-coupled Devices And Complementary Metal-oxide-semiconductor Devices Module |

Fig. 6

| Fig. 6A | Fig. 6B | Fig. 6C | Fig. 6D | Fig. 6E | Fig. 6F |

FIG. 6E

254 Scene Particular Portion Selecting Module Configured To Select A Particular Portion Of The Scene That Includes At Least One Image, Wherein The Selected Particular Portion Is Smaller Than The Scene 724 Scene Particular Portion That Is Smaller Than The Scene And That Contains A Particular Image Object Selecting Module 726 Scene Particular Portion That Is Smaller Than The Scene And That Contains A Particular Image Object That Is A Person Selecting Module 728 Scene Particular Portion That Is Smaller Than The Scene And That Contains A Particular Image Object That Is A Vehicle Selecting Module 730 Scene Particular Portion That Is Smaller Than The Scene And Is Size-defined By A Characteristic Of A Requesting Device Selecting Module 732 Scene Particular Portion That Is Smaller Than The Scene And Is Size-defined By A Screen Resolution Of A Requesting Device Selecting Module 734 Scene Particular Portion That Is Smaller Than The Scene And Is Size-defined By A Combined Screen Size Of At Least One Requesting Device Selecting Module

FIG. 7C

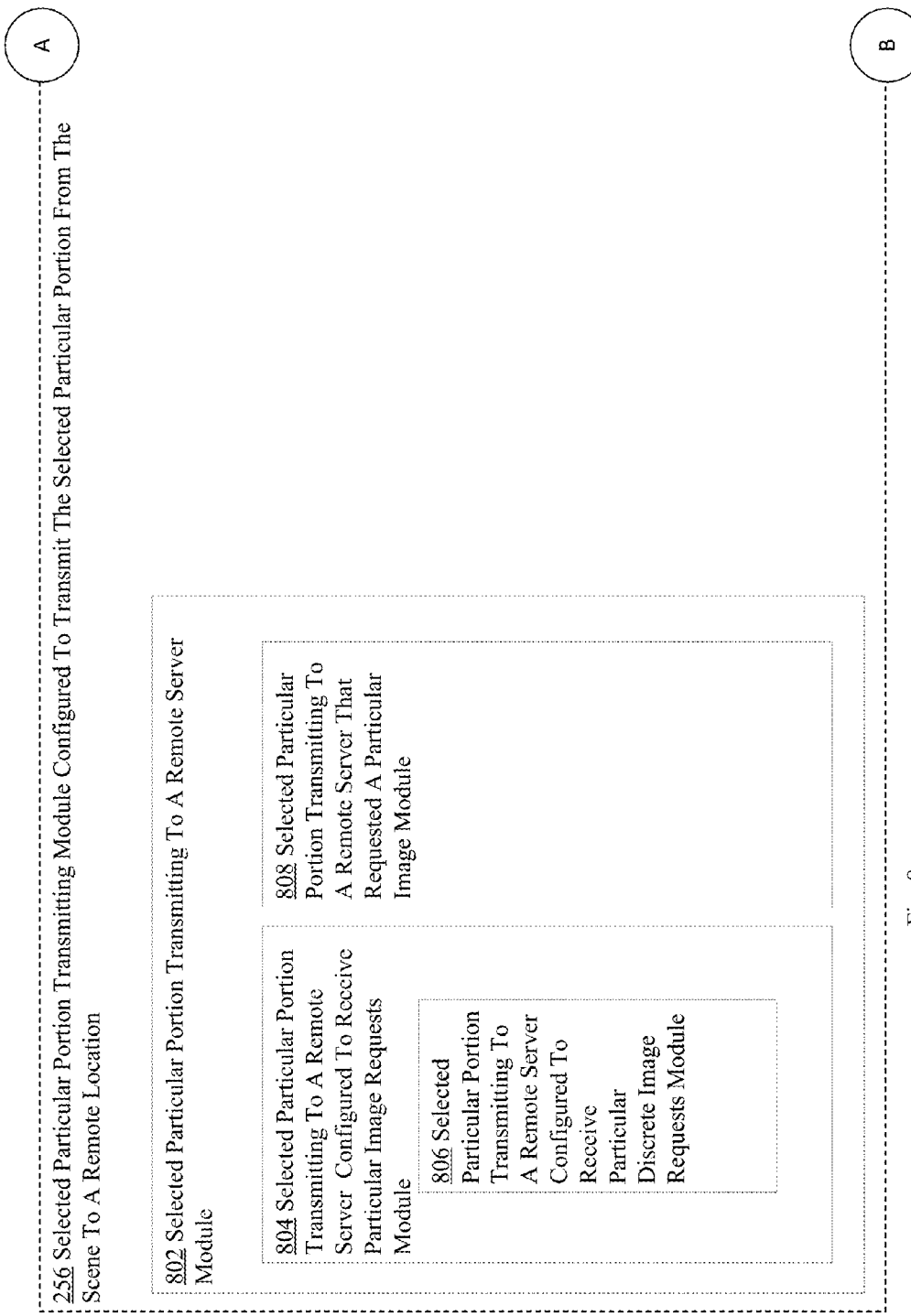

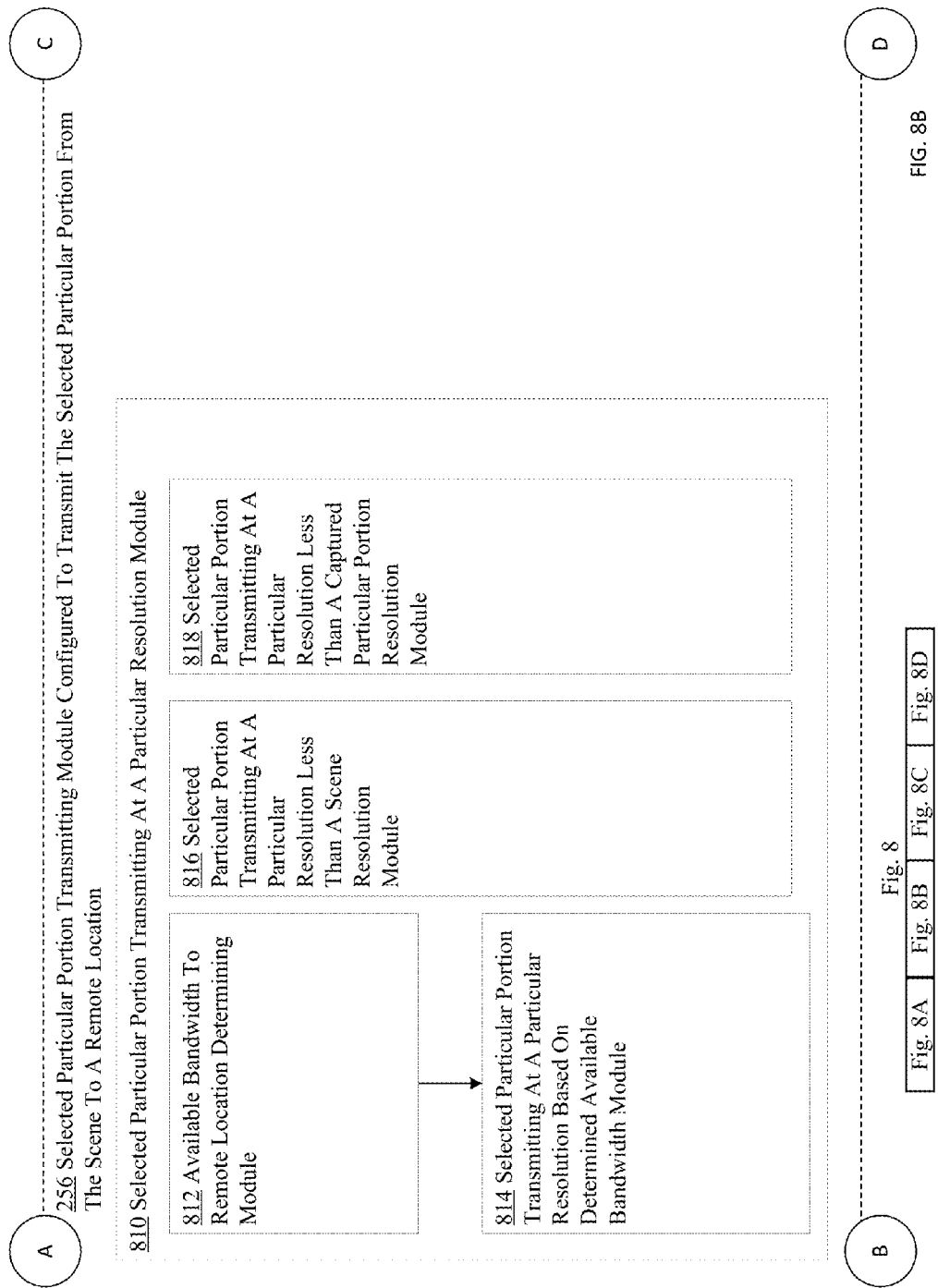

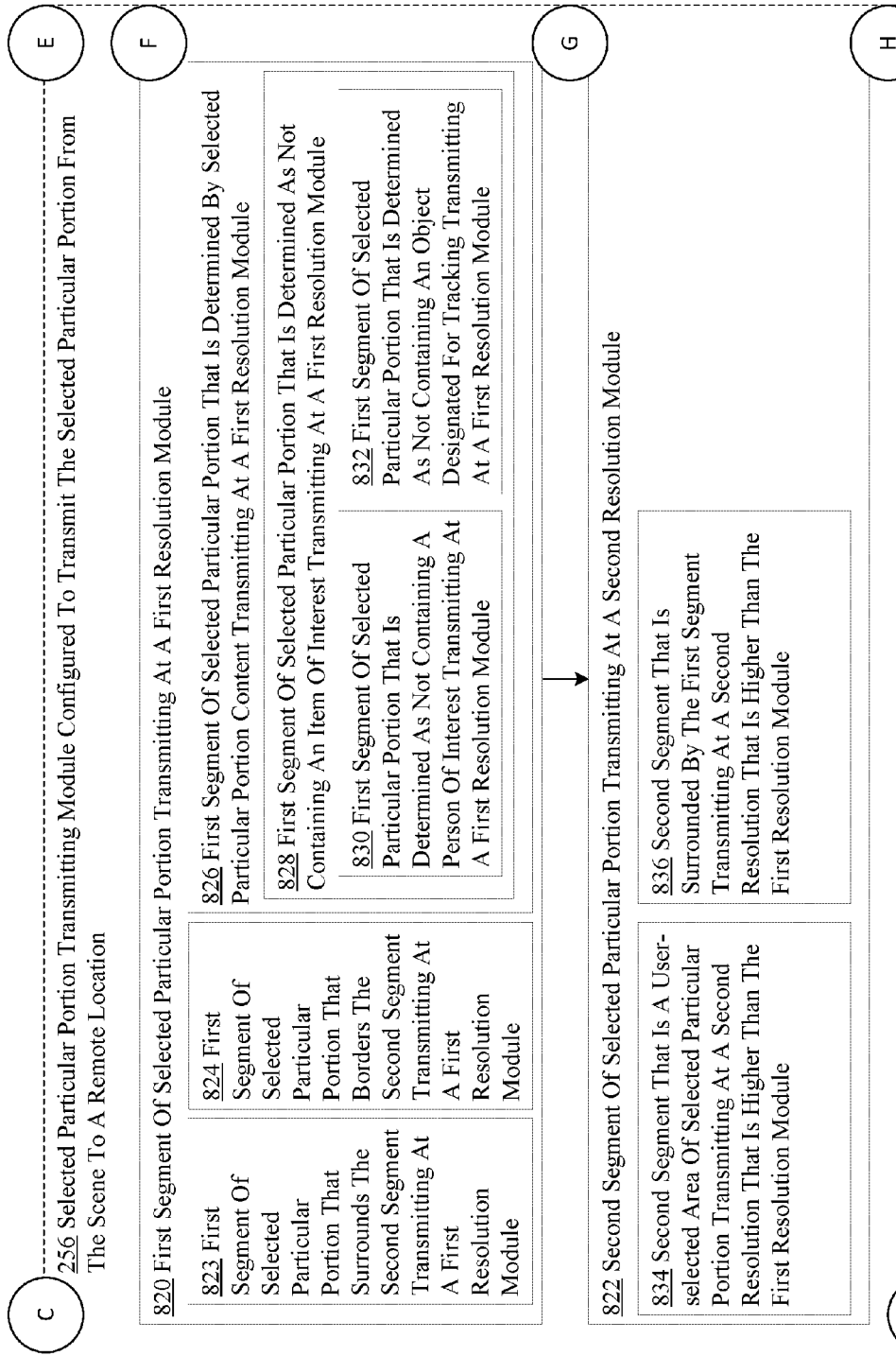

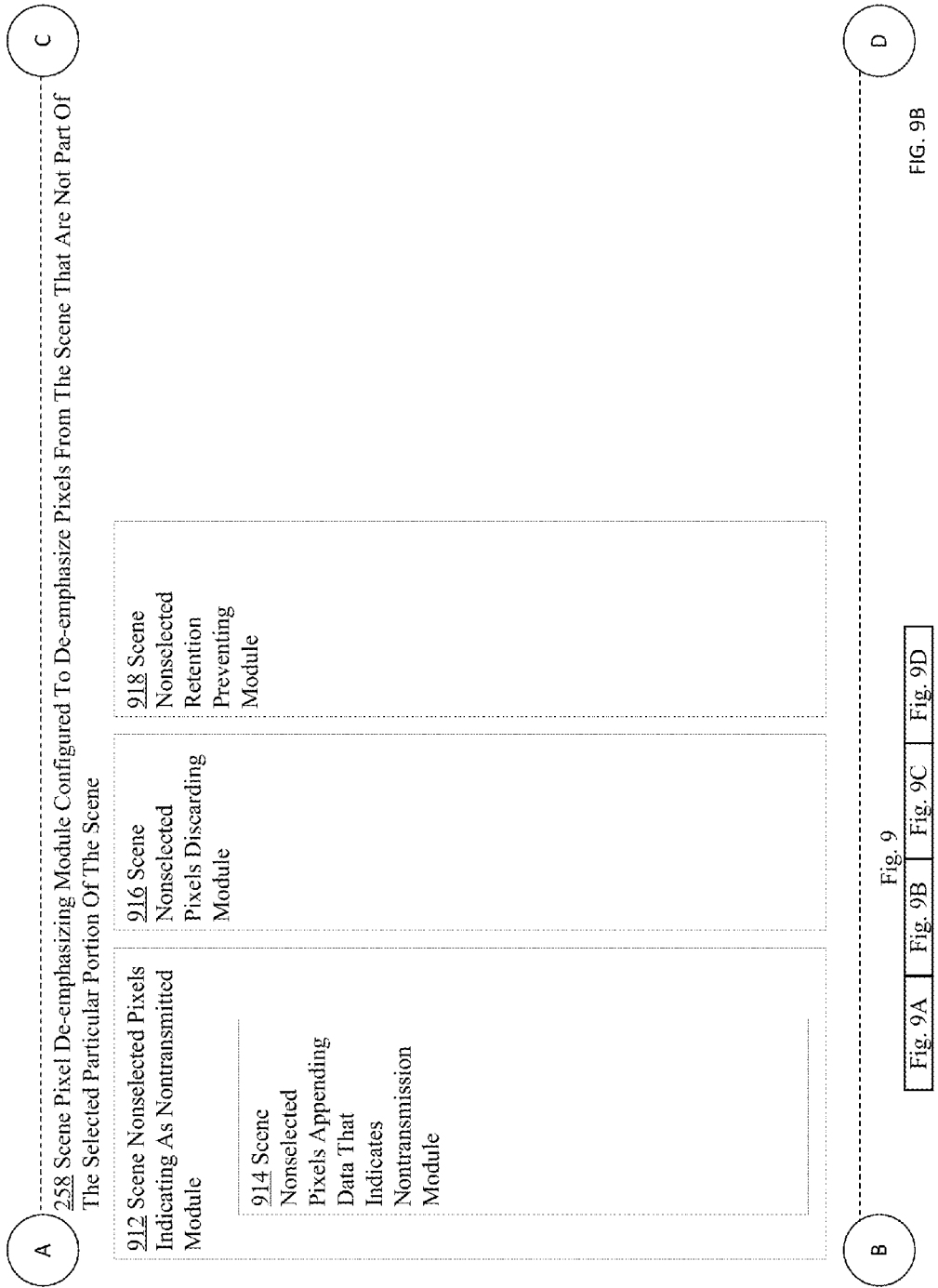

1002 Capturing A Scene That Includes One Or More Images, Through Use Of An Array Of More Than One Image Sensor

1140 Capturing The Scene That Includes One Or More Images, Through Use Of The Array Of More Than One Image Sensor, Wherein A Size Of The Scene Is Greater Than A Capacity To Transmit The Scene

1142 Capturing The Scene That Includes One Or More Images, Through Use Of The Array Of More Than One Image Sensor, Wherein An Amount Of Image Data Captured Exceeds A Bandwidth For Transmitting The Image Data To A Remote Location

1144 Capturing The Scene That Includes One Or More Images, Through Use Of The Array Of More Than One Image Sensor, Wherein The Amount Of Image Data Captured Exceeds The Bandwidth For Transmitting The Image Data To The Remote Location By A Factor Of Ten

1146 Capturing A Scene Of A Tourist Destination That Includes One Or More Images, Through Use Of An Array Of More Than One Image Sensor

1148 Capturing A Scene Of A Highway Across A Bridge That Includes One Or More Images, Through Use Of An Array Of More Than One Image Sensor, Wherein The One Or More Images Include One Or More Images Of Cars Crossing The Highway Across The Bridge

1150 Capturing A Scene Of A Home That Includes One Or More Images, Through Use Of An Array Of More Than One Image Sensor, Wherein The One Or More Images Include An Image Of An Appliance In The Home

FIG. 11D

DEVICES, METHODS, AND SYSTEMS FOR VISUAL IMAGING ARRAYS

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application claims benefit of priority of U.S. Provisional Patent Application No. 62/081,559 titled DEVICES, METHODS, AND SYSTEMS FOR INTEGRATING MULTIPLE USER VIDEO IMAGING ARRAY, filed 18 Nov. 2014, which was filed within the twelve months preceding the filing date of the present application or is an application of which a currently application is entitled to the benefit of the filing date.

For purposes of the USPTO extra-statutory requirements, the present application claims benefit of priority of U.S. Provisional Patent Application No. 62/081,560 titled DEVICES, METHODS, AND SYSTEMS FOR IMPLEMENTATION OF MULTIPLE USER VIDEO IMAGING ARRAY (MUVIA), filed 18 Nov. 2014, which was filed within the twelve months preceding the filing date of the present application or is an application of which a currently application is entitled to the benefit of the filing date.

For purposes of the USPTO extra-statutory requirements, the present application claims benefit of priority of U.S. Provisional Patent Application No. 62/082,001 titled DEVICES, METHODS, AND SYSTEMS FOR INTEGRATING MULTIPLE USER ACCESS CAMERA ARRAY, filed 19 Nov. 2014 which was filed within the twelve months preceding the filing date of the present application or is an application of which a currently application is entitled to the benefit of the filing date.

For purposes of the USPTO extra-statutory requirements, the present application claims benefit of priority of U.S. Provisional Patent Application No. 62/082,002 titled DEVICES, METHODS, AND SYSTEMS FOR INTEGRATING MULTIPLE USER VIDEO IMAGING ARRAY, filed 19 Nov. 2014, which was filed within the twelve months preceding the filing date of the present application or is an application of which a currently application is entitled to the benefit of the filing date.

For purposes of the USPTO extra-statutory requirements, the present application claims benefit of priority of U.S. Provisional Patent Application No. 62/156,162 titled DEVICES, METHODS, AND SYSTEMS FOR INTEGRATING MULTIPLE USER VIDEO IMAGING ARRAY, filed 1 May 2015 which was filed within the twelve months preceding the filing date of the present application or is an application of which a currently application is entitled to the benefit of the filing date.

For purposes of the USPTO extra-statutory requirements, the present application constitutes a continuation-in-part of U.S. patent application Ser. No. 14/714,239, entitled DEVICES, METHODS AND SYSTEMS FOR VISUAL IMAGING ARRAYS, filed 15 May 2015, which is currently co-pending or is an application of which a currently co-pending application is entitled to the benefit of the filing date.

For purposes of the USPTO extra-statutory requirements, the present application claims benefit of priority of U.S. Provisional Patent Application No. 62/180,040 titled DEVICES, METHODS, AND SYSTEMS FOR INTEGRATING MULTIPLE USER ACCESS CAMERA ARRAY, filed 15 Jun. 2015 which was filed within the twelve months preceding the filing date of the present application or is an application of which a currently application is entitled to the benefit of the filing date.

RELATED APPLICATIONS

None.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to video imaging arrays that may be capable of handling multiple users and which may transmit less data than they collect.

SUMMARY

In one or more various aspects, a method includes but is not limited to that which is illustrated in the drawings. In addition to the foregoing, other method aspects are described in the claims, drawings, and text forming a part of the disclosure set forth herein.

In one or more various aspects, a method includes, but is not limited to, capturing a scene that includes one or more images, through use of an array of more than one image sensor, selecting a particular portion of the scene that includes at least one image, wherein the selected particular portion is smaller than the scene, and transmitting only the selected particular portion from the scene to a remote location. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for carrying out the herein-referenced method aspects. The circuitry and/or programming may be virtually any combination of hardware, software, and/or firmware configured to effect the herein—referenced method aspects depending upon the design choices of the system designer, and limited to patentable subject matter under 35 USC 101.

In one or more various aspects, a system includes, but is not limited to, means for capturing a scene that includes one or more images, through use of an array of more than one image sensor, means for selecting a particular portion of the scene that includes at least one image, wherein the selected particular portion is smaller than the scene, and means for transmitting only the selected particular portion from the scene to a remote location. In addition to the foregoing, other system aspects are described in the claims, drawings, and text forming a part of the disclosure set forth herein.

In one or more various aspects, a system includes, but is not limited to, circuitry for capturing a scene that includes one or more images, through use of an array of more than one image sensor, circuitry for selecting a particular portion of the scene that includes at least one image, wherein the selected particular portion is smaller than the scene, and circuitry for transmitting only the selected particular portion from the scene to a remote location. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for capturing a scene that includes one or more images, through use of an array of more than one image sensor, one or more instructions for selecting a particular portion of the scene that includes at least one image, wherein the selected particular portion is smaller than the scene, and one or more instructions for transmitting only the selected particular portion from the scene to a remote location. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for capturing a scene that includes one or more images, through use of an array of more than one image sensor, one or more interchained physical machines ordered for selecting a particular portion of the scene that includes at least one image, wherein the selected particular portion is smaller than the scene, and one or more interchained physical machines ordered for transmitting only the selected particular portion from the scene to a remote location.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 forms a partially schematic diagram of an environment(s) and/or an implementation(s) of technologies described herein when FIGS. 1-A through 1-AN are stitched together in the manner shown in FIG. 1-D, which is reproduced below in table format.

In accordance with 37 C.F.R. §1.84(h)(2), FIG. 1 shows "a view of a large machine or device in its entirety . . . broken into partial views . . . extended over several sheets" labeled FIG. 1-A through FIG. 1-AN (Sheets 1-40). The "views on two or more sheets form, in effect, a single complete view, [and] the views on the several sheets . . . [are] so arranged that the complete figure can be assembled" from "partial views drawn on separate sheets . . . linked edge to edge. Thus, in FIG. 1, the partial view FIGS. 1-A through 1-AN are ordered alphabetically, by increasing in columns from left to right, and increasing in rows top to bottom, as shown in the following table:

TABLE 1

Table showing alignment of enclosed drawings to form partial schematic of one or more environments.

Figure 1:
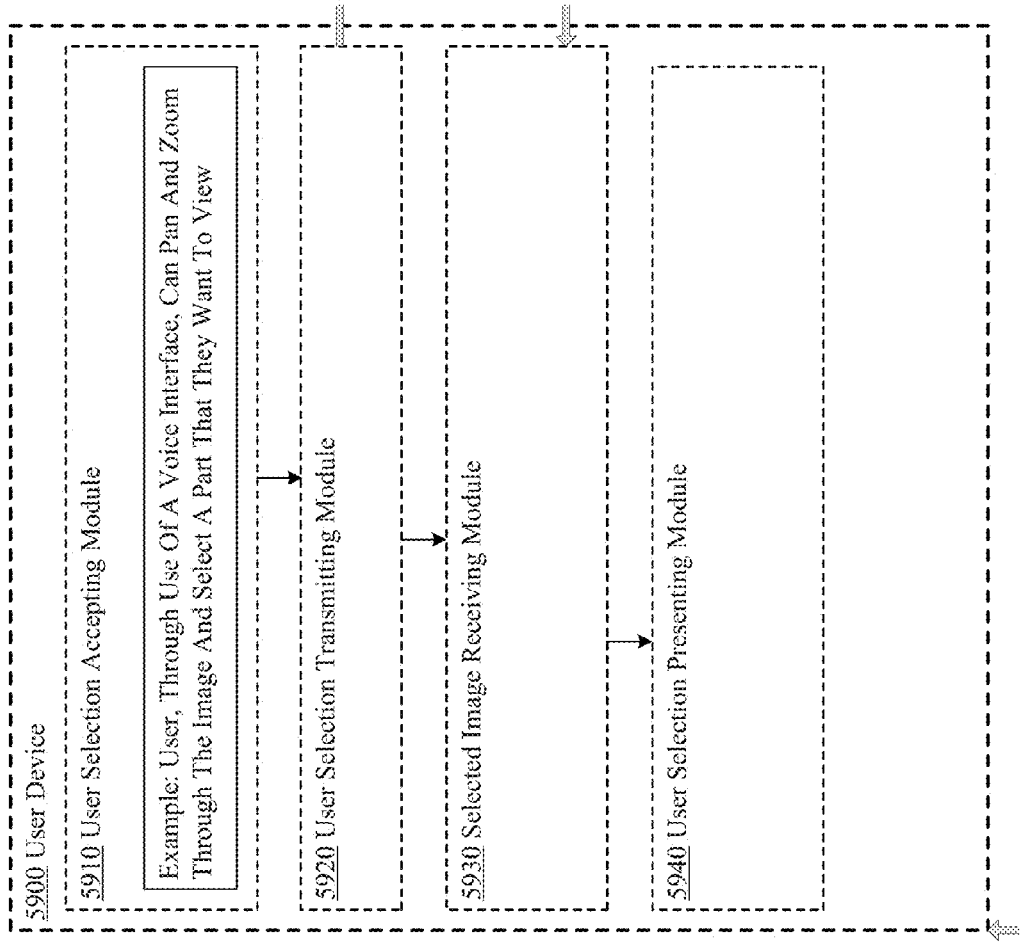
FIG. 1, including FIGS. 1-A through 1-AN, shows a high-level system diagram of one or more exemplary environments in which transactions and potential transactions may be carried out, according to one or more embodiments.

| Pos. (0, 0) | X-Pos 1 | X-Pos 2 | X-Pos 3 | X-Pos 4 | X-Pos 5 | X-Pos 6 | X-Pos 7 | X-Pos 8 | X-Pos 9 | X-Pos 10 |
|---|---|---|---|---|---|---|---|---|---|---|
| Y-Pos. 1 | (1, 1): FIG. 1-A | (1, 2): FIG. 1-B | (1, 3): FIG. 1-C | (1, 4): FIG. 1-D | (1, 5): FIG. 1-E | (1, 6): FIG. 1-F | (1, 7): FIG. 1-G | (1, 8): FIG. 1-H | (1, 9): FIG. 1-I | (1, 10): FIG. 1-J |
| Y-Pos. 2 | (2, 1): FIG. 1-K | (2, 2): FIG. 1-L | (2, 3): FIG. 1-M | (2, 4): FIG. 1-N | (2, 5): FIG. 1-O | (2, 6): FIG. 1-P | (2, 7): FIG. 1-Q | (2, 8): FIG. 1-R | (2, 9): FIG. 1-S | (2, 10): FIG. 1-T |
| Y-Pos. 3 | (3, 1): FIG. 1-U | (3, 2): FIG. 1-V | (3, 3): FIG. 1-W | (3, 4): FIG. 1-X | (3, 5): FIG. 1-Y | (3, 6): FIG. 1-Z | (3, 7): FIG. 1-AA | (3, 8): FIG. 1-AB | (3, 9): FIG. 1-AC | (3, 10): FIG. 1-AD |
| Y-Pos. 4 | (4, 1): FIG. 1-AE | (4, 2): FIG. 1-AF | (4, 3): FIG. 1-AG | (4, 3): FIG. 1-AH | (4, 5): FIG. 1-AI | (4, 6): FIG. 1-AJ | (4, 7): FIG. 1-AK | (4, 8): FIG. 1-AL | (4, 8): FIG. 1-AM | (4, 10): FIG. 1-AN |

In accordance with 37 C.F.R. §1.84(h)(2), FIG. 1 is " . . . a view of a large machine or device in its entirety . . . broken into partial views . . . extended over several sheets . . . [with] no loss in facility of understanding the view." The partial views drawn on the several sheets indicated in the above table are capable of being linked edge to edge, so that no partial view contains parts of another partial view. As here, "where views on two or more sheets form, in effect, a single complete view, the views on the several sheets are so arranged that the complete figure can be assembled without concealing any part of any of the views appearing on the various sheets." 37 C.F.R. §1.84(h)(2).

It is noted that one or more of the partial views of the drawings may be blank, or may be absent of substantive elements (e.g., may show only lines, connectors, arrows, and/or the like). These drawings are included in order to assist readers of the application in assembling the single complete view from the partial sheet format required for submission by the USPTO, and, while their inclusion is not required and may be omitted in this or other applications without subtracting from the disclosed matter as a whole, their inclusion is proper, and should be considered and treated as intentional.

FIG. 1-A, when placed at position (1,1), forms at least a portion of a partially schematic diagram of an environment(s) and/or an implementation(s) of technologies described herein.

FIG. 1-B, when placed at position (1,2), forms at least a portion of a partially schematic diagram of an environment(s) and/or an implementation(s) of technologies described herein.

FIG. 1-C, when placed at position (1,3), forms at least a portion of a partially schematic diagram of an environment(s) and/or an implementation(s) of technologies described herein.

FIG. 1-D, when placed at position (1,4), forms at least a portion of a partially schematic diagram of an environment(s) and/or an implementation(s) of technologies described herein.

FIG. 1-E, when placed at position (1,5), forms at least a portion of a partially schematic diagram of an environment(s) and/or an implementation(s) of technologies described herein.

FIG. 1-F, when placed at position (1,6), forms at least a portion of a partially schematic diagram of an environment(s) and/or an implementation(s) of technologies described herein.

FIG. 1-G, when placed at position (1,7), forms at least a portion of a partially schematic diagram of an environment(s) and/or an implementation(s) of technologies described herein.

FIG. 1-H, when placed at position (1,8), forms at least a portion of a partially schematic diagram of an environment(s) and/or an implementation(s) of technologies described herein.

FIG. 1-I, when placed at position (1,9), forms at least a portion of a partially schematic diagram of an environment(s) and/or an implementation(s) of technologies described herein.

FIG. 1-J, when placed at position (1,10), forms at least a portion of a partially schematic diagram of an environment(s) and/or an implementation(s) of technologies described herein.

FIG. 1-K, when placed at position (2,1), forms at least a portion of a partially schematic diagram of an environment(s) and/or an implementation(s) of technologies described herein.

FIG. 1-L, when placed at position (2,2), forms at least a portion of a partially schematic diagram of an environment(s) and/or an implementation(s) of technologies described herein.

FIG. 1-M, when placed at position (2,3), forms at least a portion of a partially schematic diagram of an environment(s) and/or an implementation(s) of technologies described herein.

FIG. 1-N, when placed at position (2,4), forms at least a portion of a partially schematic diagram of an environment(s) and/or an implementation(s) of technologies described herein.

FIG. 1-O (which format is changed to avoid confusion as FIG. "10" or "ten"), when placed at position (2,5), forms at least a portion of a partially schematic diagram of an environment(s) and/or an implementation(s) of technologies described herein.

FIG. 1-P, when placed at position (2,6), forms at least a portion of a partially schematic diagram of an environment(s) and/or an implementation(s) of technologies described herein.

FIG. 1-Q, when placed at position (2,7), forms at least a portion of a partially schematic diagram of an environment(s) and/or an implementation(s) of technologies described herein.

FIG. 1-R, when placed at position (2,8), forms at least a portion of a partially schematic diagram of an environment(s) and/or an implementation(s) of technologies described herein.

FIG. 1-S, when placed at position (2,9), forms at least a portion of a partially schematic diagram of an environment(s) and/or an implementation(s) of technologies described herein.

FIG. 1-T, when placed at position (2,10), forms at least a portion of a partially schematic diagram of an environment(s) and/or an implementation(s) of technologies described herein.

FIG. 1-U, when placed at position (3,1), forms at least a portion of a partially schematic diagram of an environment(s) and/or an implementation(s) of technologies described herein.

FIG. 1-V, when placed at position (3,2), forms at least a portion of a partially schematic diagram of an environment(s) and/or an implementation(s) of technologies described herein.

FIG. 1-W, when placed at position (3,3), forms at least a portion of a partially schematic diagram of an environment(s) and/or an implementation(s) of technologies described herein.

FIG. 1-X, when placed at position (3,4), forms at least a portion of a partially schematic diagram of an environment(s) and/or an implementation(s) of technologies described herein.

FIG. 1-Y, when placed at position (3,5), forms at least a portion of a partially schematic diagram of an environment(s) and/or an implementation(s) of technologies described herein.

FIG. 1-Z, when placed at position (3,6), forms at least a portion of a partially schematic diagram of an environment(s) and/or an implementation(s) of technologies described herein.

FIG. 1-AA, when placed at position (3,7), forms at least a portion of a partially schematic diagram of an environment(s) and/or an implementation(s) of technologies described herein.

FIG. 1-AB, when placed at position (3,8), forms at least a portion of a partially schematic diagram of an environment(s) and/or an implementation(s) of technologies described herein.

FIG. 1-AC, when placed at position (3,9), forms at least a portion of a partially schematic diagram of an environment(s) and/or an implementation(s) of technologies described herein.

FIG. 1-AD, when placed at position (3,10), forms at least a portion of a partially schematic diagram of an environment(s) and/or an implementation(s) of technologies described herein.

FIG. 1-AE, when placed at position (4,1), forms at least a portion of a partially schematic diagram of an environment(s) and/or an implementation(s) of technologies described herein.

FIG. 1-AF, when placed at position (4,2), forms at least a portion of a partially schematic diagram of an environment(s) and/or an implementation(s) of technologies described herein.

FIG. 1-AG, when placed at position (4,3), forms at least a portion of a partially schematic diagram of an environment(s) and/or an implementation(s) of technologies described herein.

FIG. 1-AH, when placed at position (4,4), forms at least a portion of a partially schematic diagram of an environment(s) and/or an implementation(s) of technologies described herein.

FIG. 1-AI, when placed at position (4,5), forms at least a portion of a partially schematic diagram of an environment(s) and/or an implementation(s) of technologies described herein.

FIG. 1-AJ, when placed at position (4,6), forms at least a portion of a partially schematic diagram of an environment(s) and/or an implementation(s) of technologies described herein.

FIG. 1-AK, when placed at position (4,7), forms at least a portion of a partially schematic diagram of an environment(s) and/or an implementation(s) of technologies described herein.

FIG. 1-AL, when placed at position (4,8), forms at least a portion of a partially schematic diagram of an environment(s) and/or an implementation(s) of technologies described herein.

FIG. 1-AM, when placed at position (4,9), forms at least a portion of a partially schematic diagram of an environment(s) and/or an implementation(s) of technologies described herein.

FIG. 1-AN, when placed at position (4,10), forms at least a portion of a partially schematic diagram of an environment(s) and/or an implementation(s) of technologies described herein.

Figure 2A:
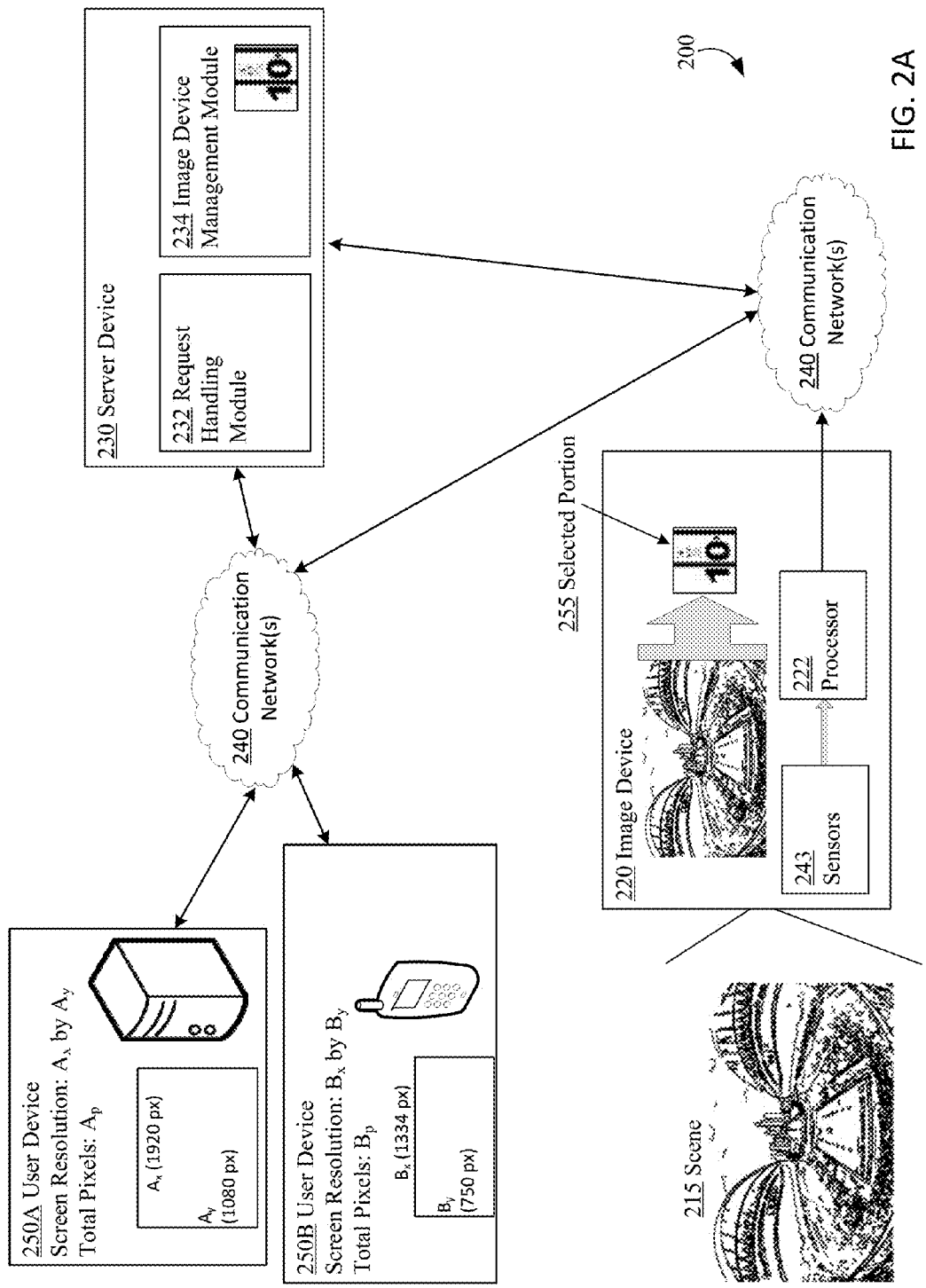

FIG. 2A shows a high-level block diagram of an exemplary environment 200, including an image device 220, according to one or more embodiments.

Figure 2B:
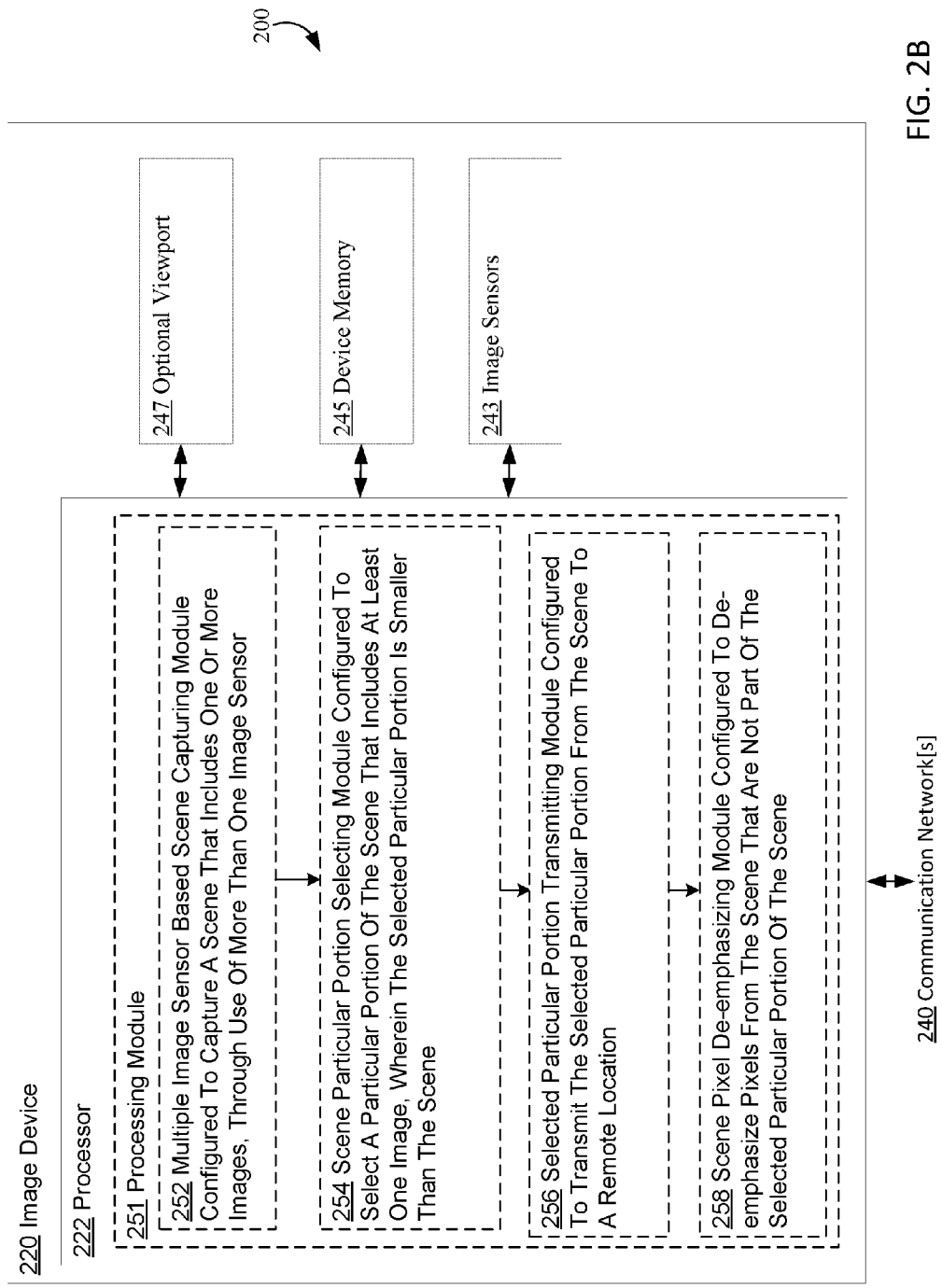

FIG. 2B shows a high-level block diagram of a computing device, e.g., a device 220 operating in an exemplary environment 200, according to one or more embodiments.

FIG. 3 shows a high-level block diagram of an exemplary operation of a device 220A in an exemplary environment 300, according to embodiments.

Figure 4:
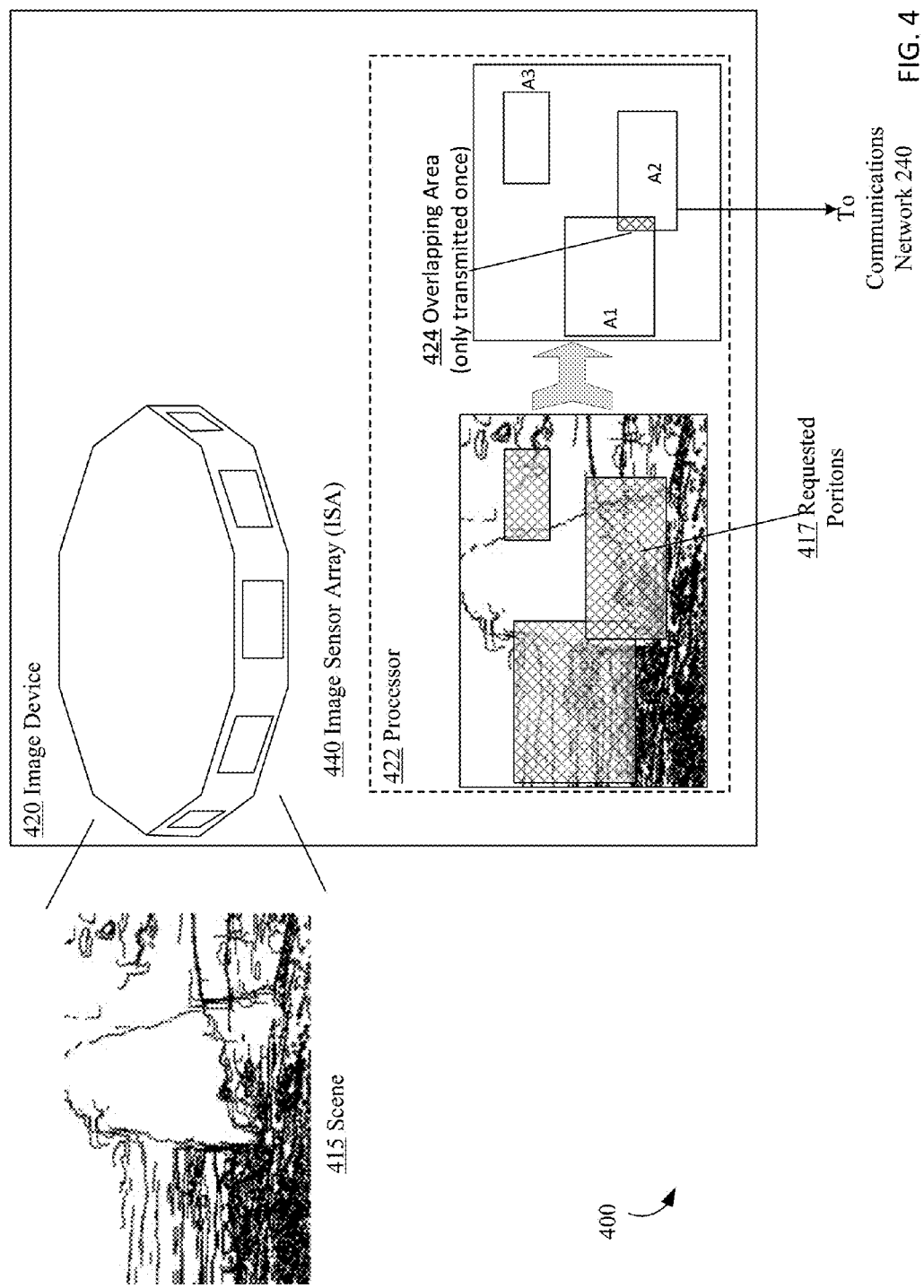

FIG. 4 shows a high-level block diagram of an exemplary operation of an image device 420 in an exemplary environment 400, according to embodiments.

Figure 5:
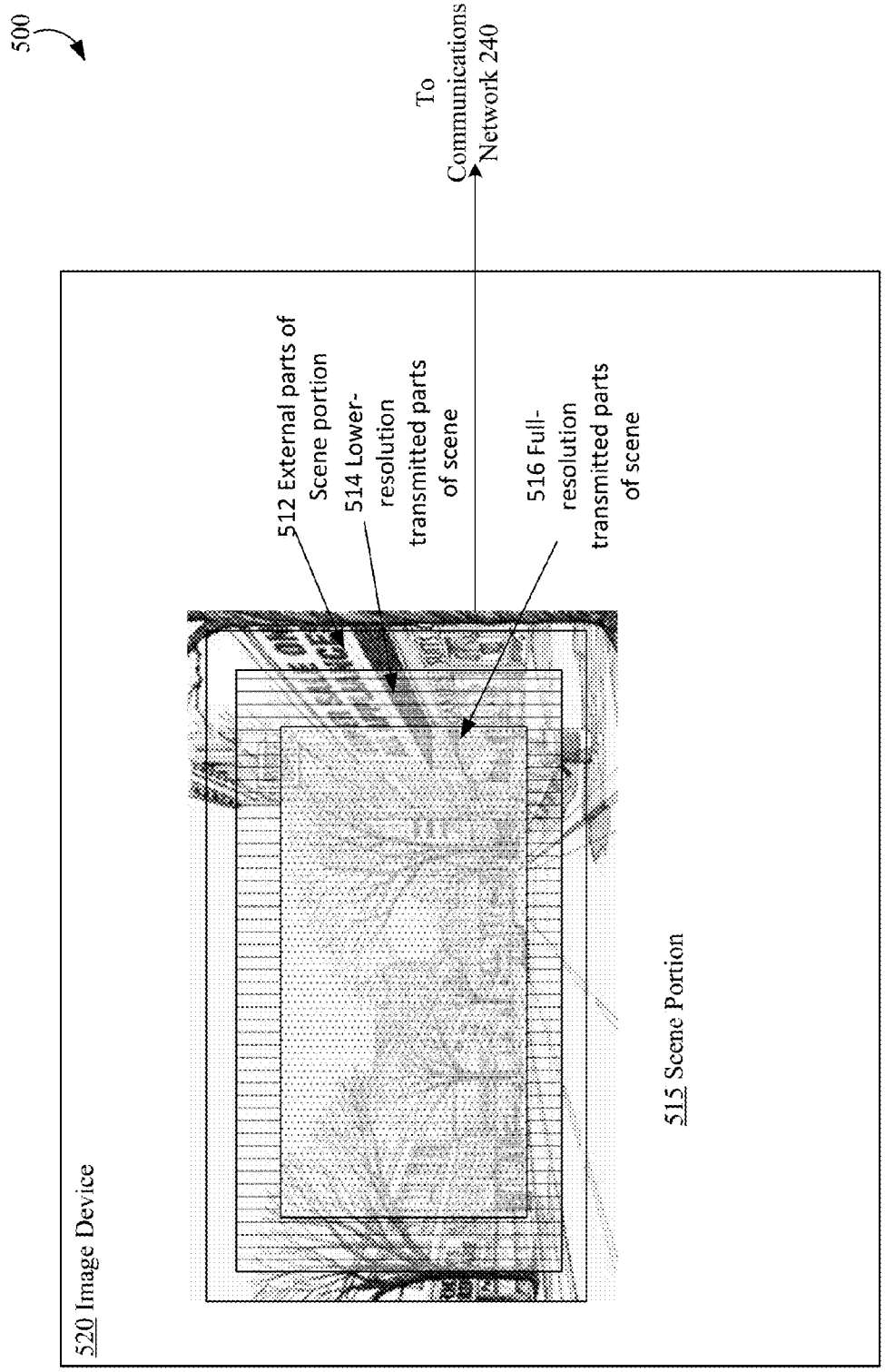

FIG. 5 shows a high-level block diagram of an exemplary operation of an image device 520 in an exemplary environment 500, according to embodiments.

Figure 6B:
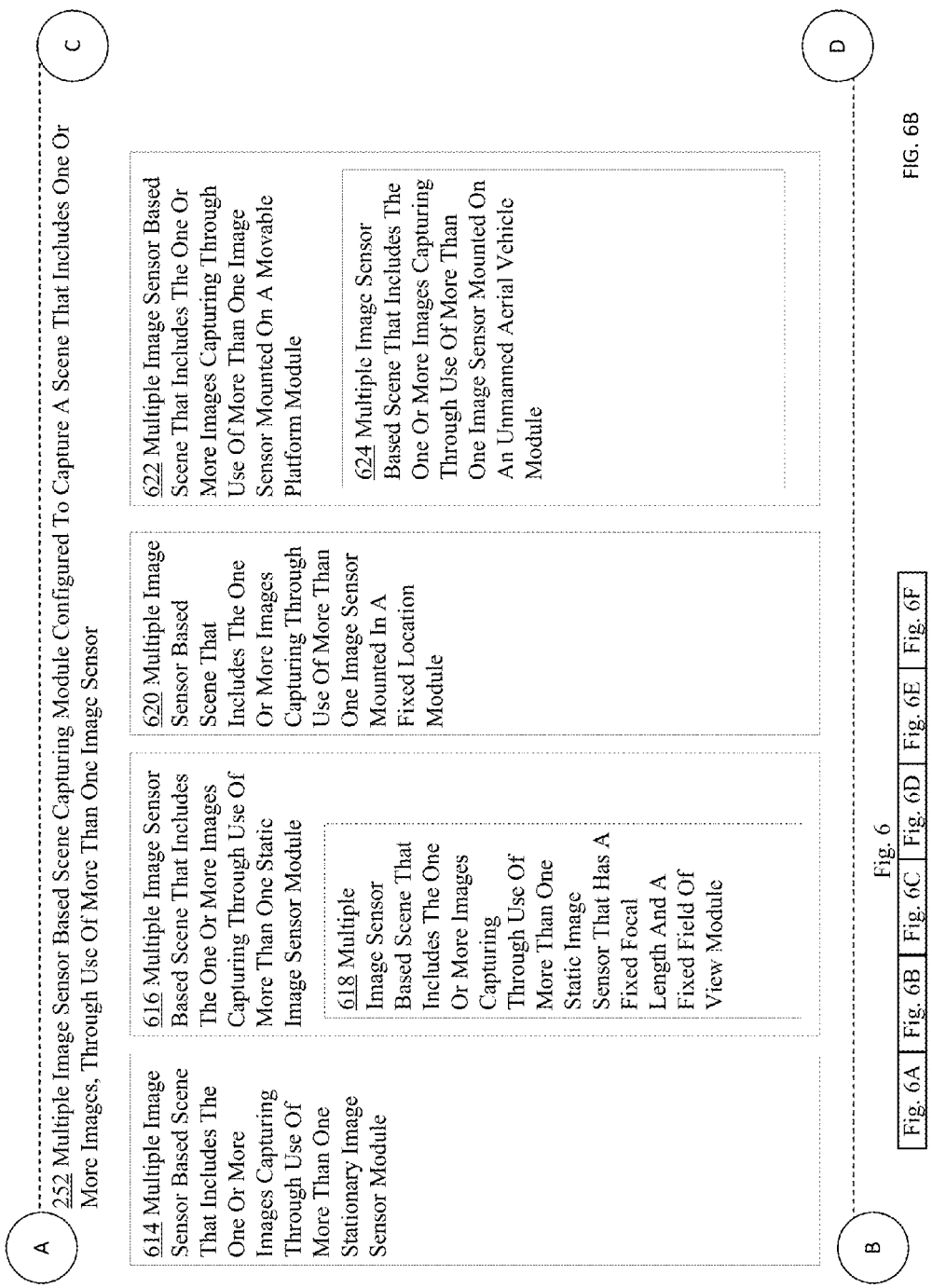
Figure 6:
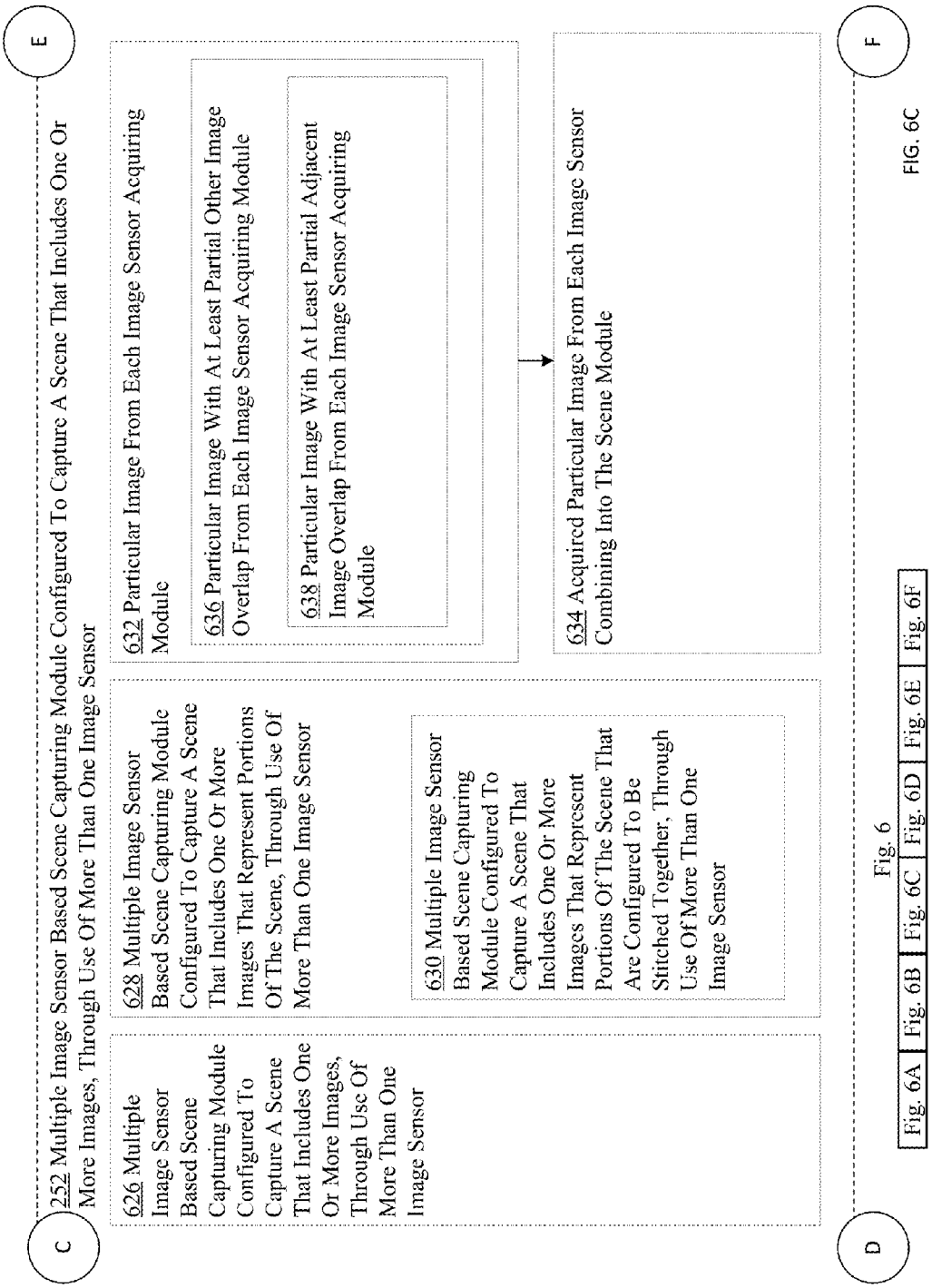

FIG. 6, including FIGS. 6A-6F, shows a particular perspective of a multiple image sensor based scene capturing module 252 of processing module 251 of image device 220 of FIG. 2B, according to an embodiment.

Figure 7:
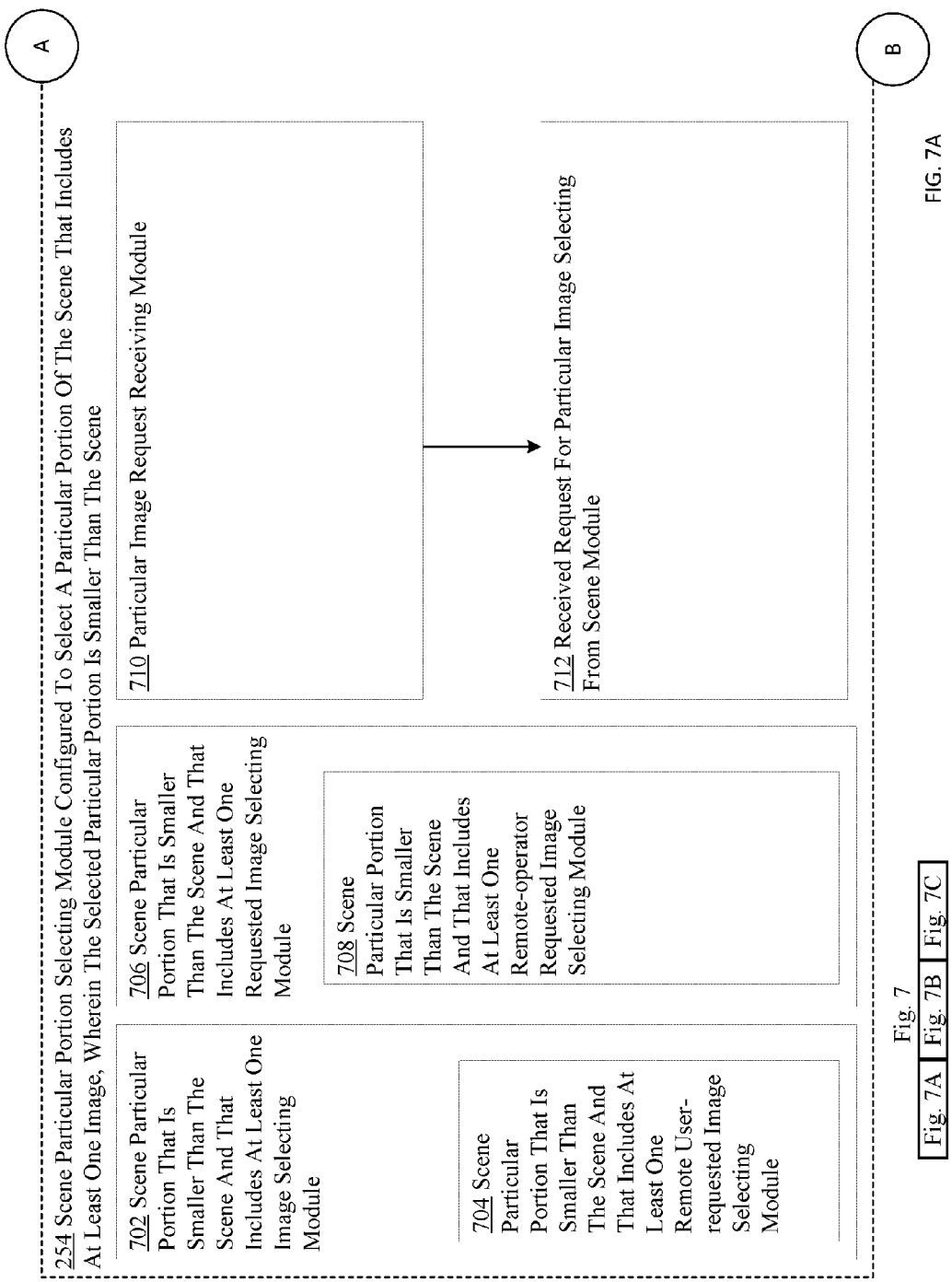
Figure 7B:
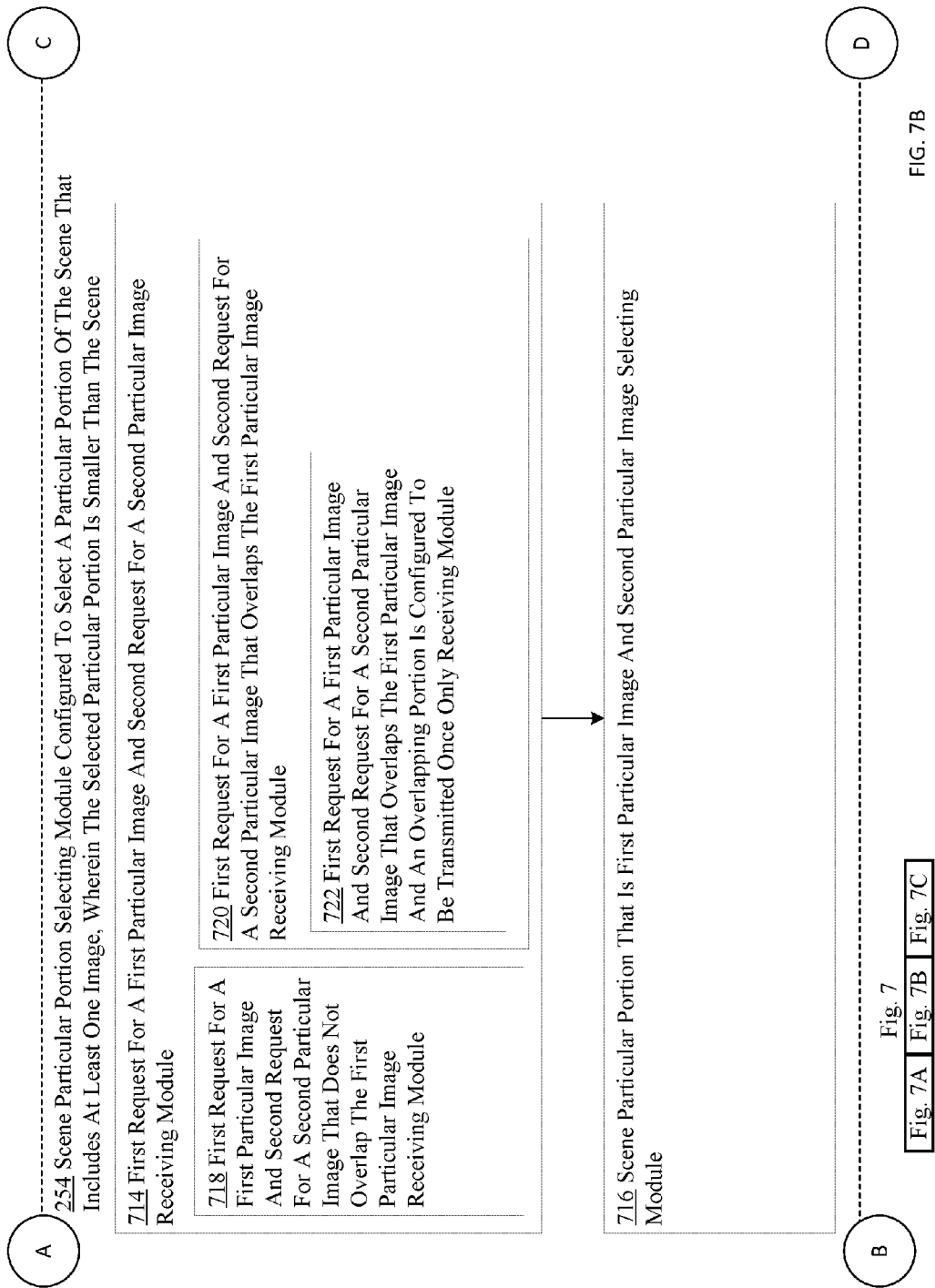

FIG. 7, including FIGS. 7A-7C, shows a particular perspective of a scene particular portion selecting module 254 of processing module 251 of image device 220 of FIG. 2B, according to an embodiment.

Figure 8D:
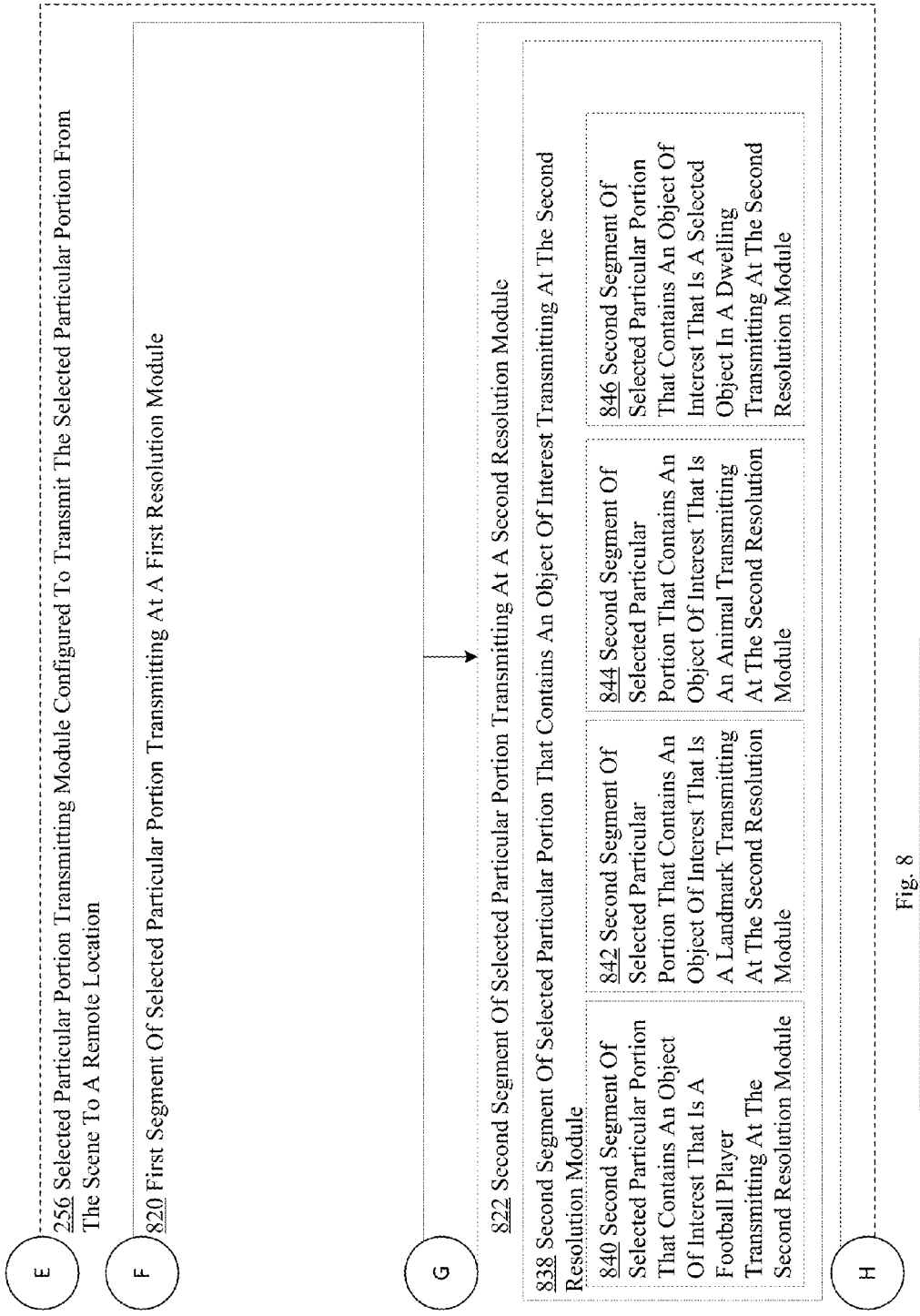

FIG. 8, including FIGS. 8A-8D, shows a particular perspective of a selected particular portion transmitting module 256 of processing module 251 of image device 220 of FIG. 2B, according to an embodiment.

Figure 9:
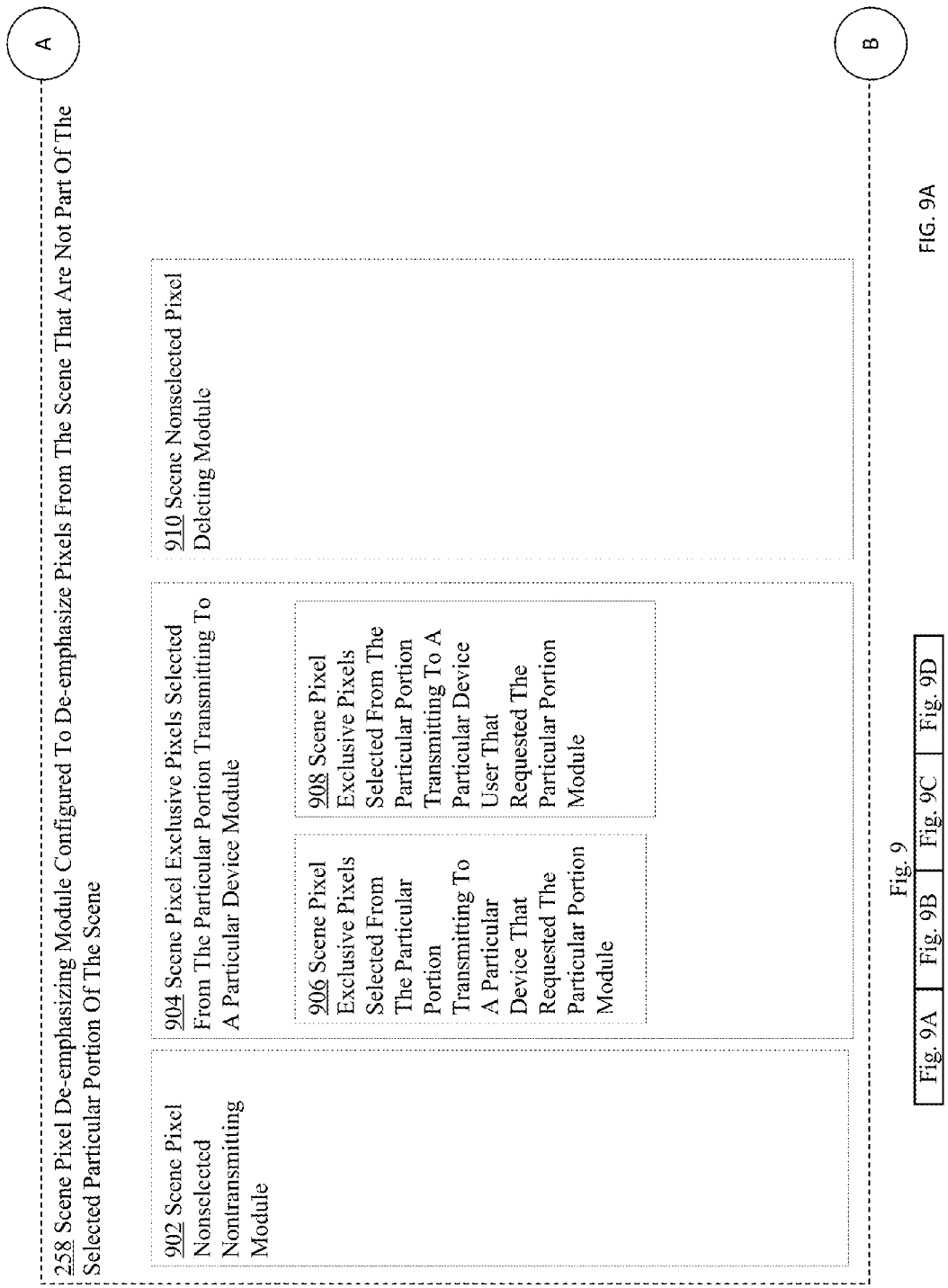

FIG. 9, including FIGS. 9A-9D, shows a particular perspective of a scene pixel de-emphasizing module 258 of processing module 250 of image device 220 of FIG. 2B, according to an embodiment.

Figure 10:
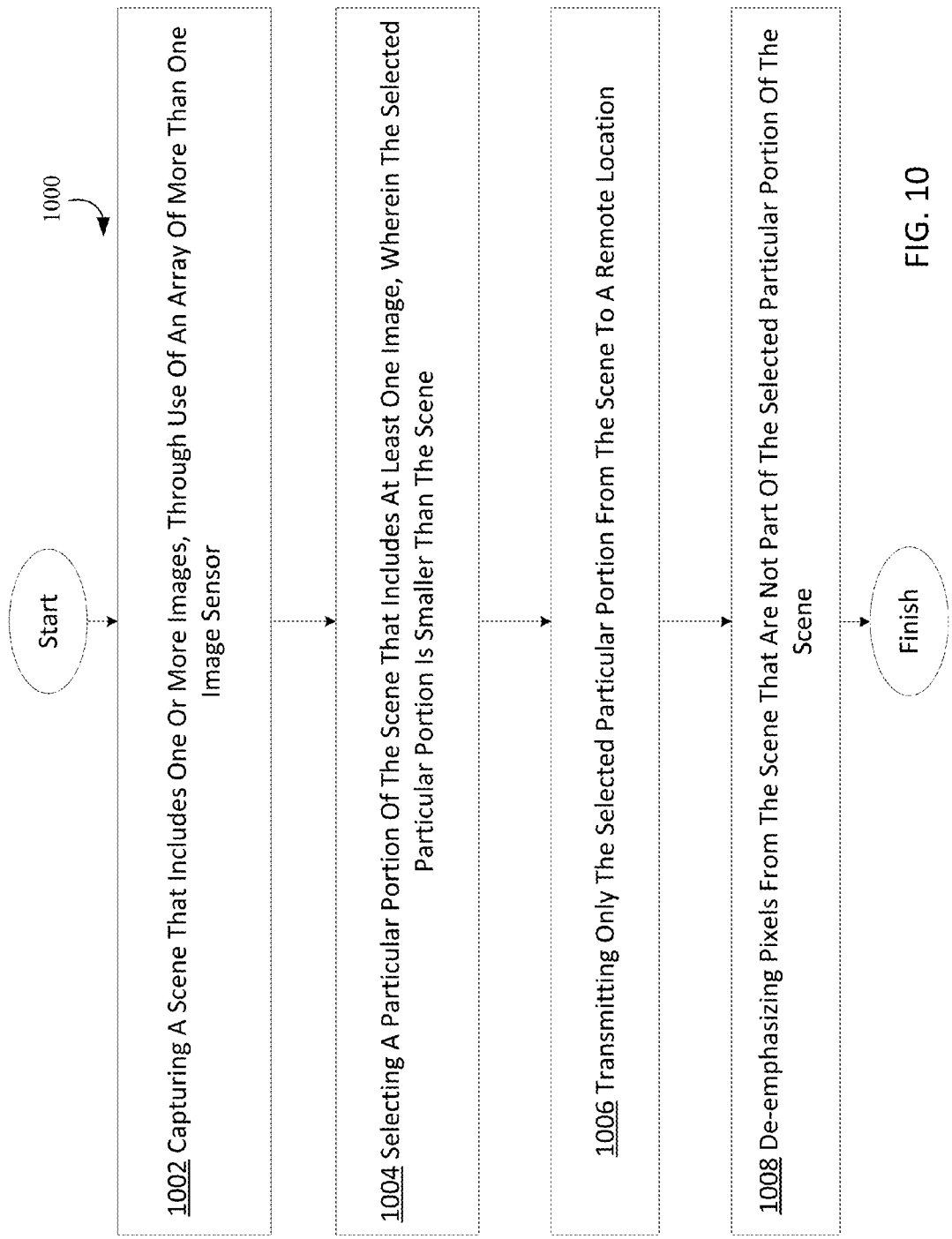

FIG. 10 is a high-level logic flowchart of a process, e.g., operational flow 1000, including one or more operations of a capturing a scene that includes one or more images operation, a selecting a particular portion of the scene that includes at least one image operation, a transmitting only the selected particular portion from the scene operation, and a de-emphasizing pixels from the scene operation, according to an embodiment.

Figure 11A:
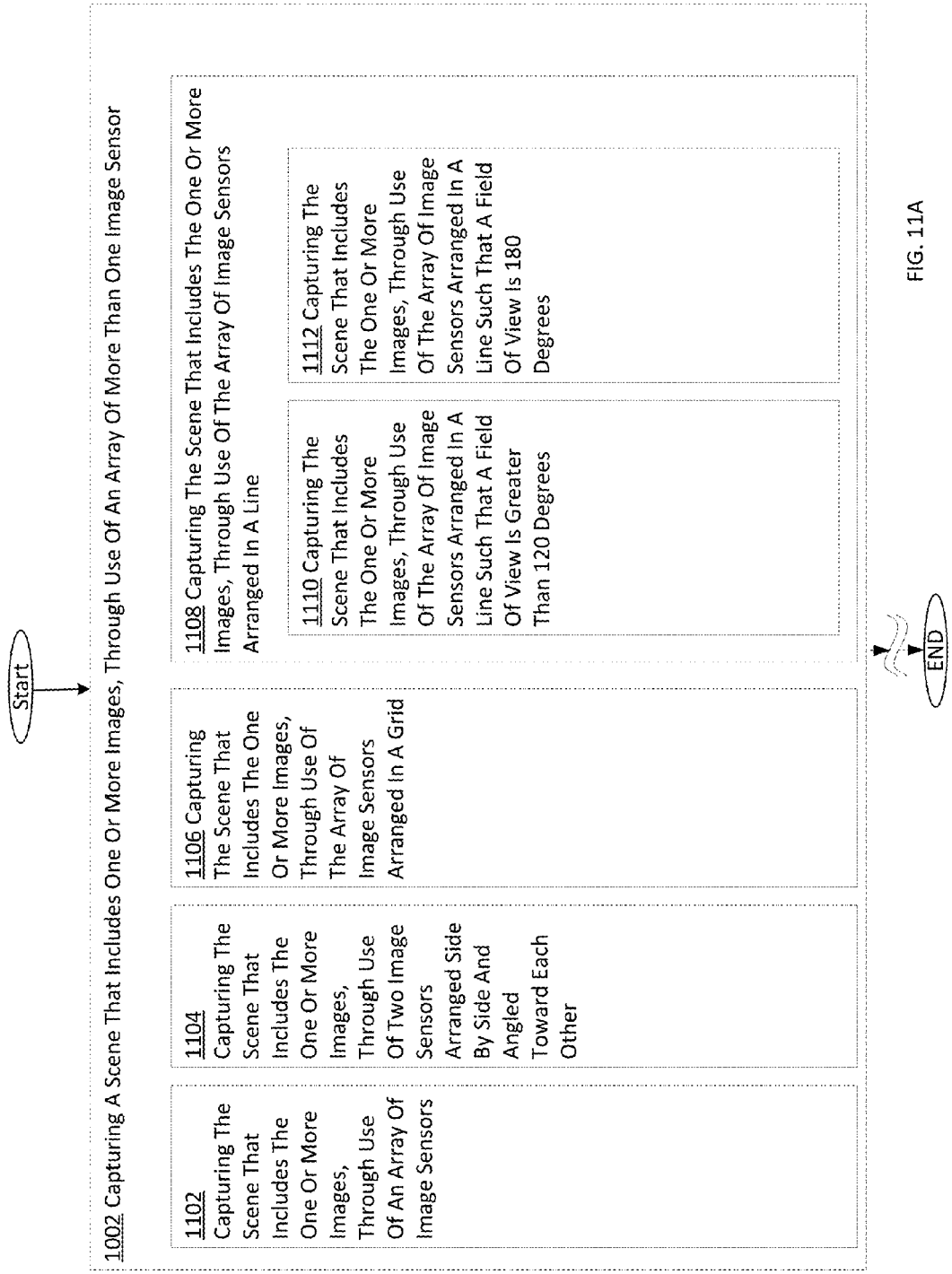

FIG. 11A is a high-level logic flow chart of a process depicting alternate implementations of a capturing a scene that includes one or more images operation 1002, according to one or more embodiments.

Figure 11B:
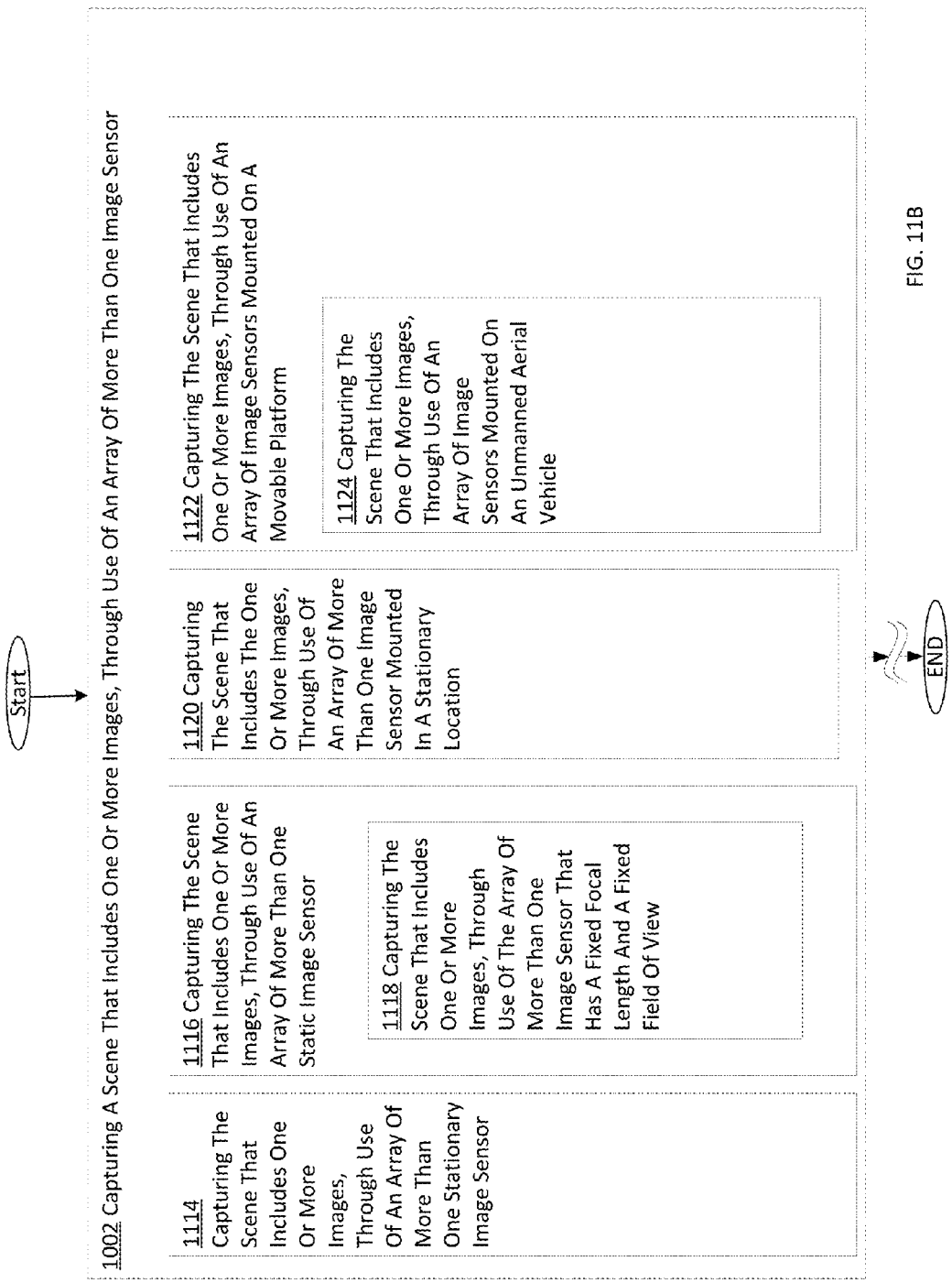

FIG. 11B is a high-level logic flow chart of a process depicting alternate implementations of a capturing a scene that includes one or more images operation 1002, according to one or more embodiments.

Figure 11C:
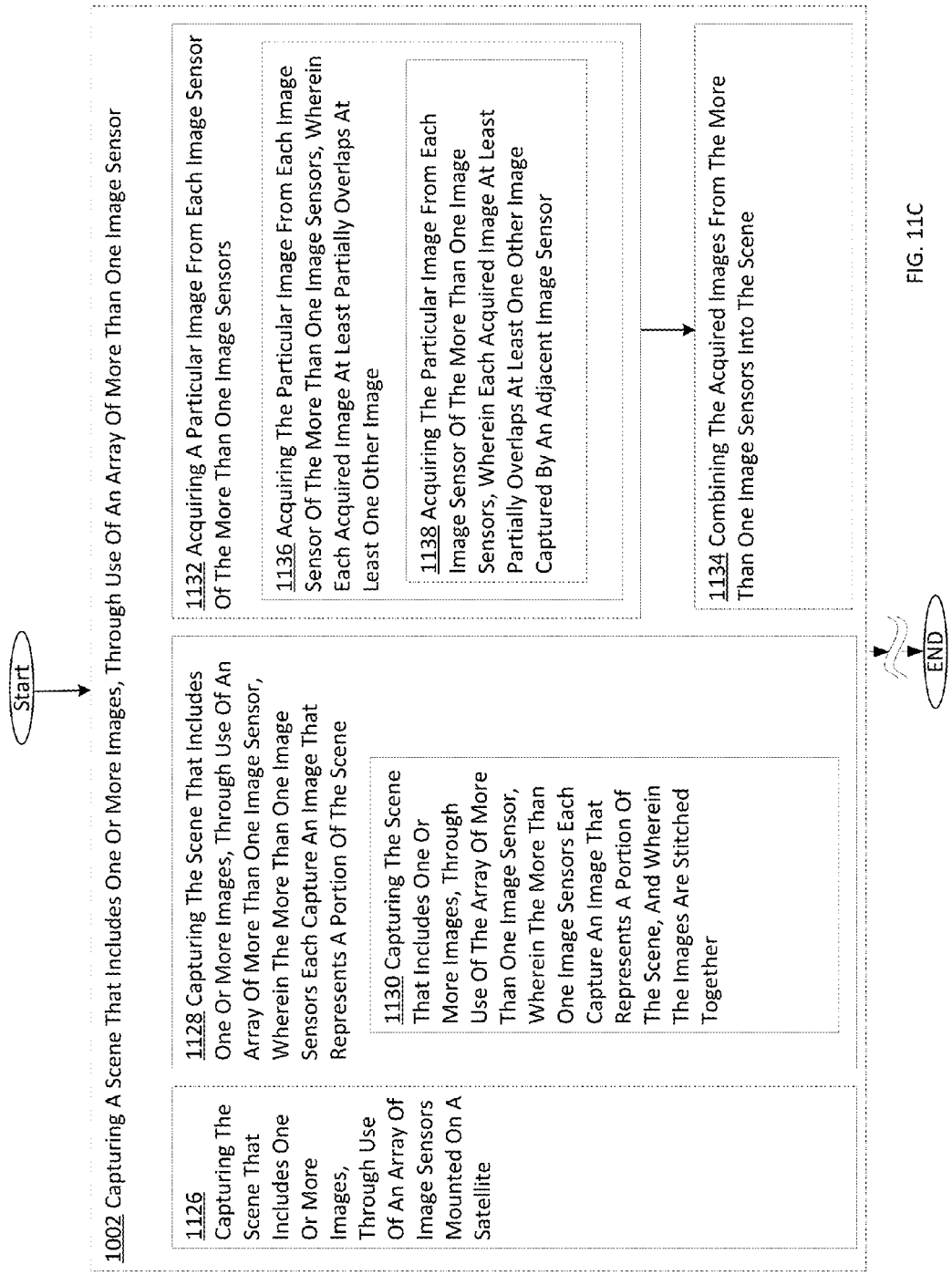

FIG. 11C is a high-level logic flow chart of a process depicting alternate implementations of a capturing a scene that includes one or more images operation 1002, according to one or more embodiments.

FIG. 11D is a high-level logic flow chart of a process depicting alternate implementations of a capturing a scene that includes one or more images operation 1002, according to one or more embodiments.

Figure 11E:
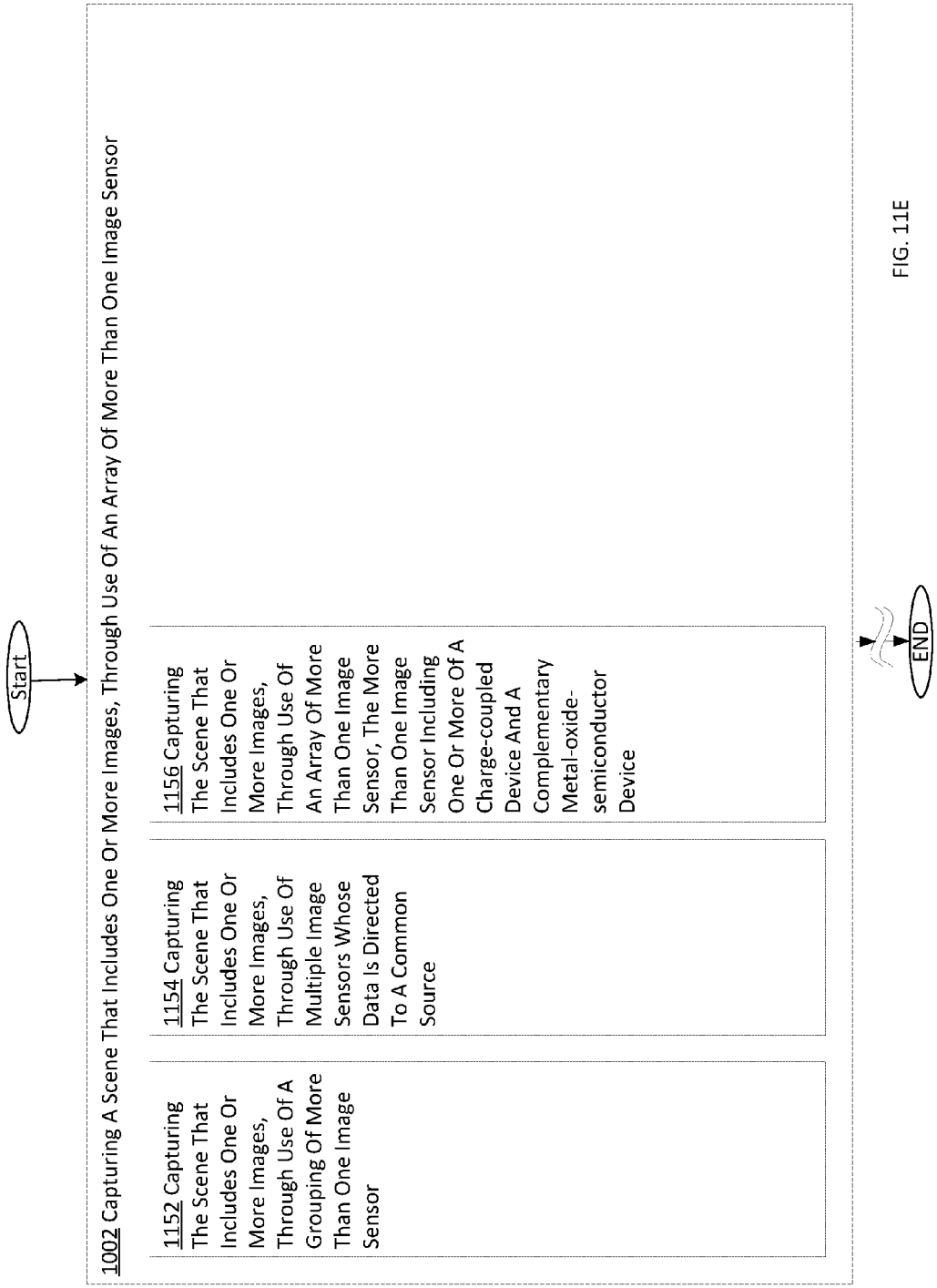

FIG. 11E is a high-level logic flow chart of a process depicting alternate implementations of a capturing a scene that includes one or more images operation 1002, according to one or more embodiments.

Figure 11F:
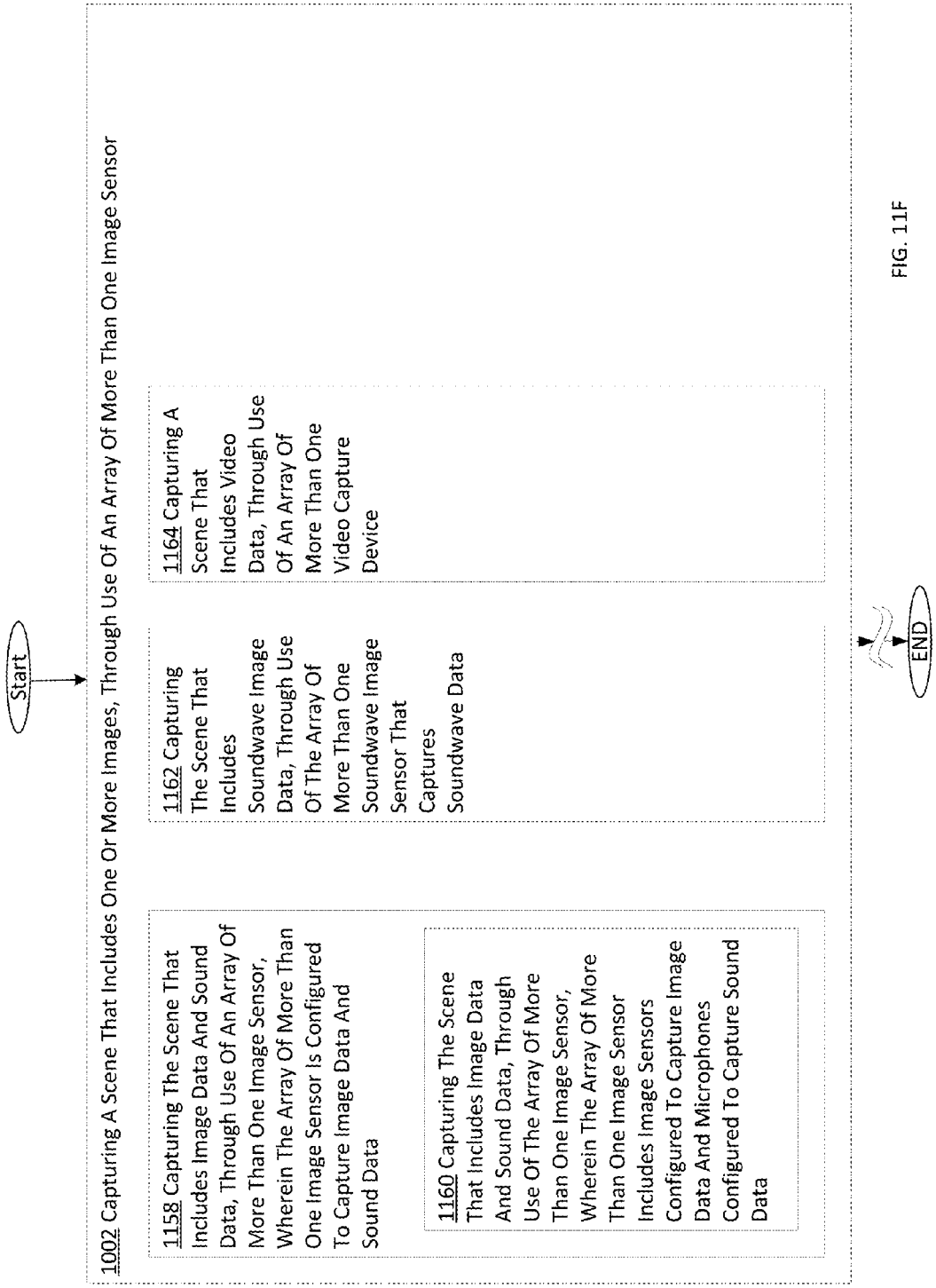

FIG. 11F is a high-level logic flow chart of a process depicting alternate implementations of a capturing a scene that includes one or more images operation 1002, according to one or more embodiments.

Figure 12A:
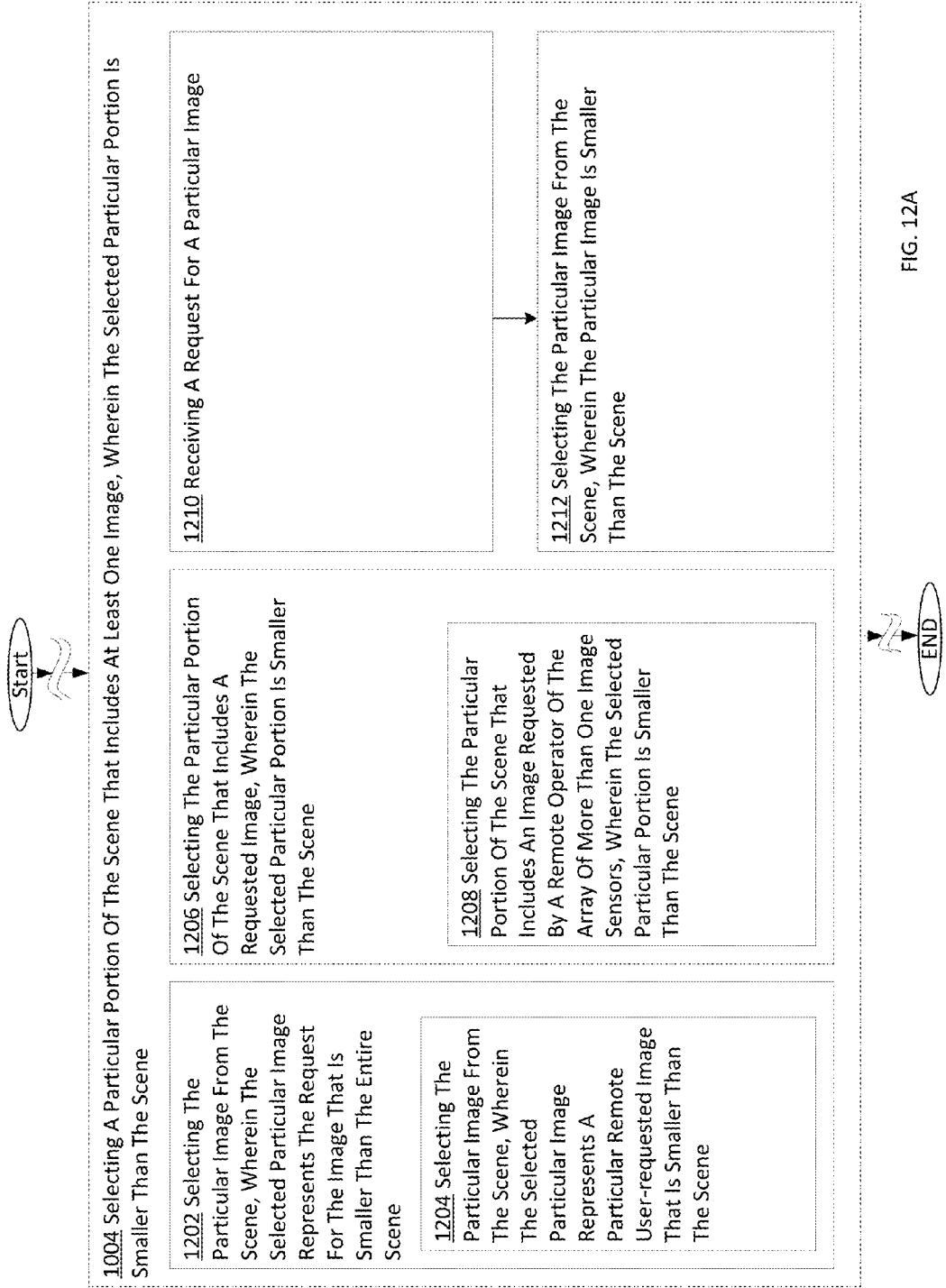

FIG. 12A is a high-level logic flow chart of a process depicting alternate implementations of a selecting a particular portion of the scene that includes at least one image operation 1004, according to one or more embodiments.

Figure 12B:
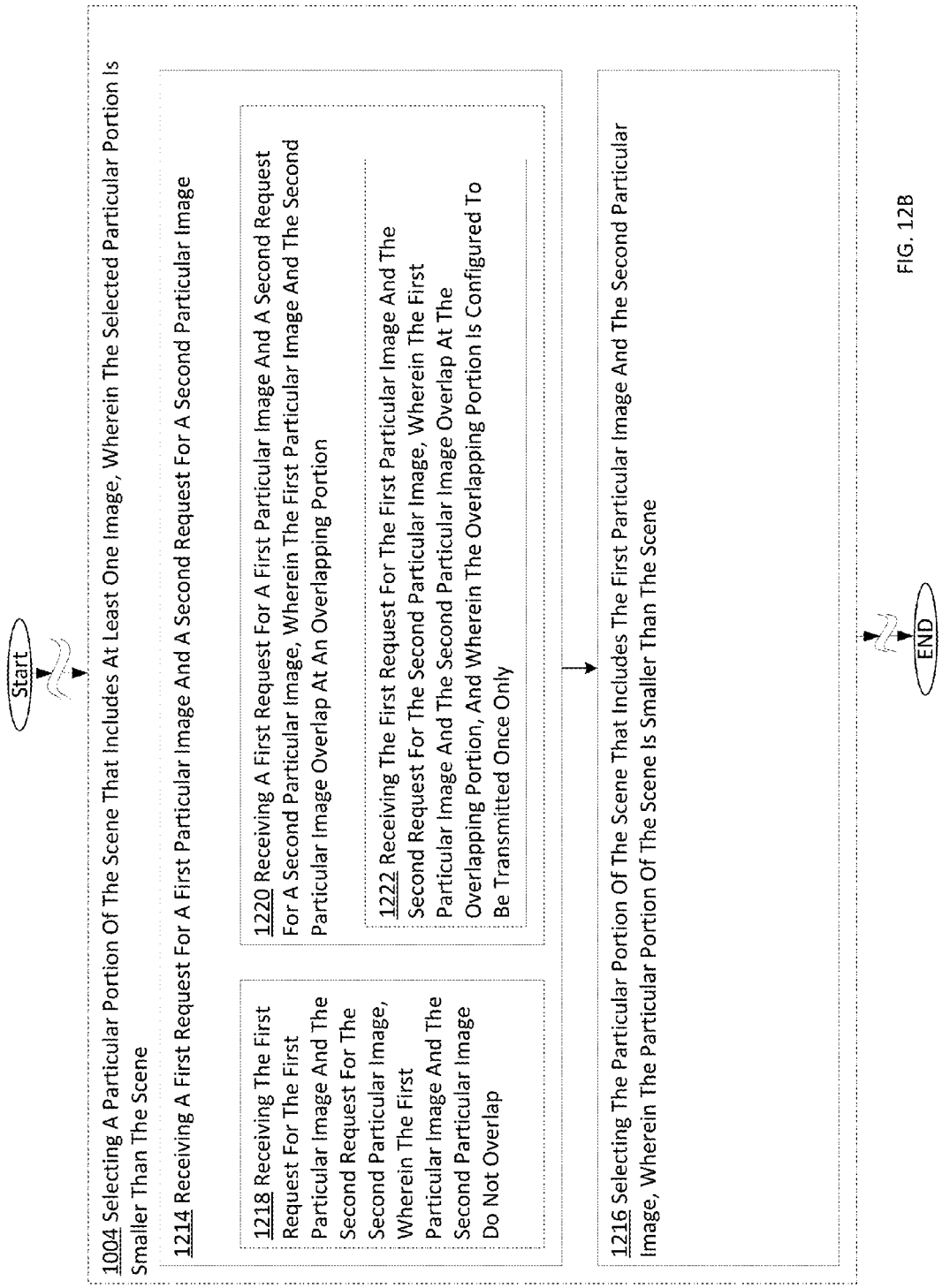

FIG. 12B is a high-level logic flow chart of a process depicting alternate implementations of a selecting a particular portion of the scene that includes at least one image operation 1004, according to one or more embodiments.

Figure 12C:
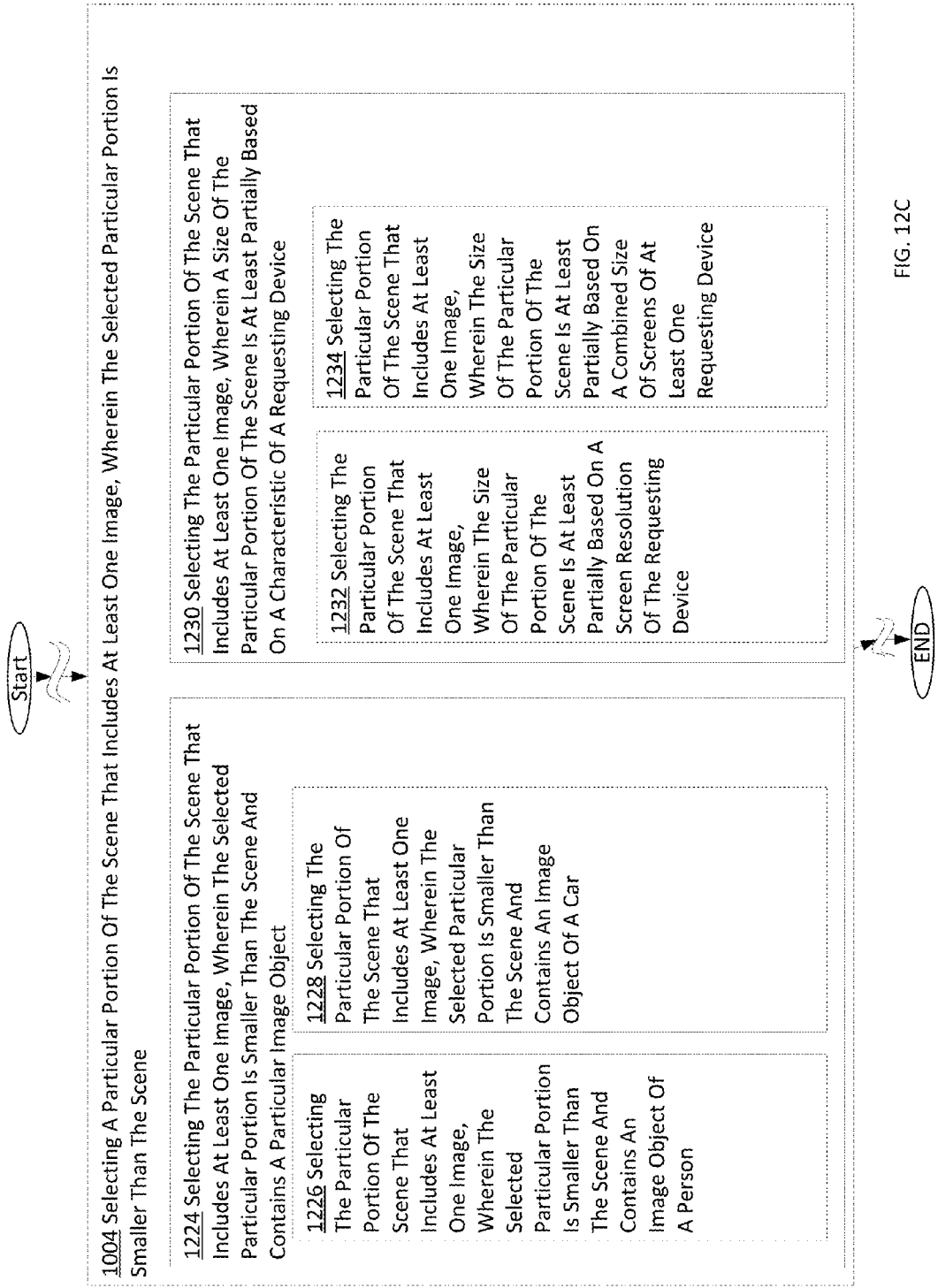

FIG. 12C is a high-level logic flow chart of a process depicting alternate implementations of a selecting a particular portion of the scene that includes at least one image operation 1004, according to one or more embodiments.

Figure 13A:
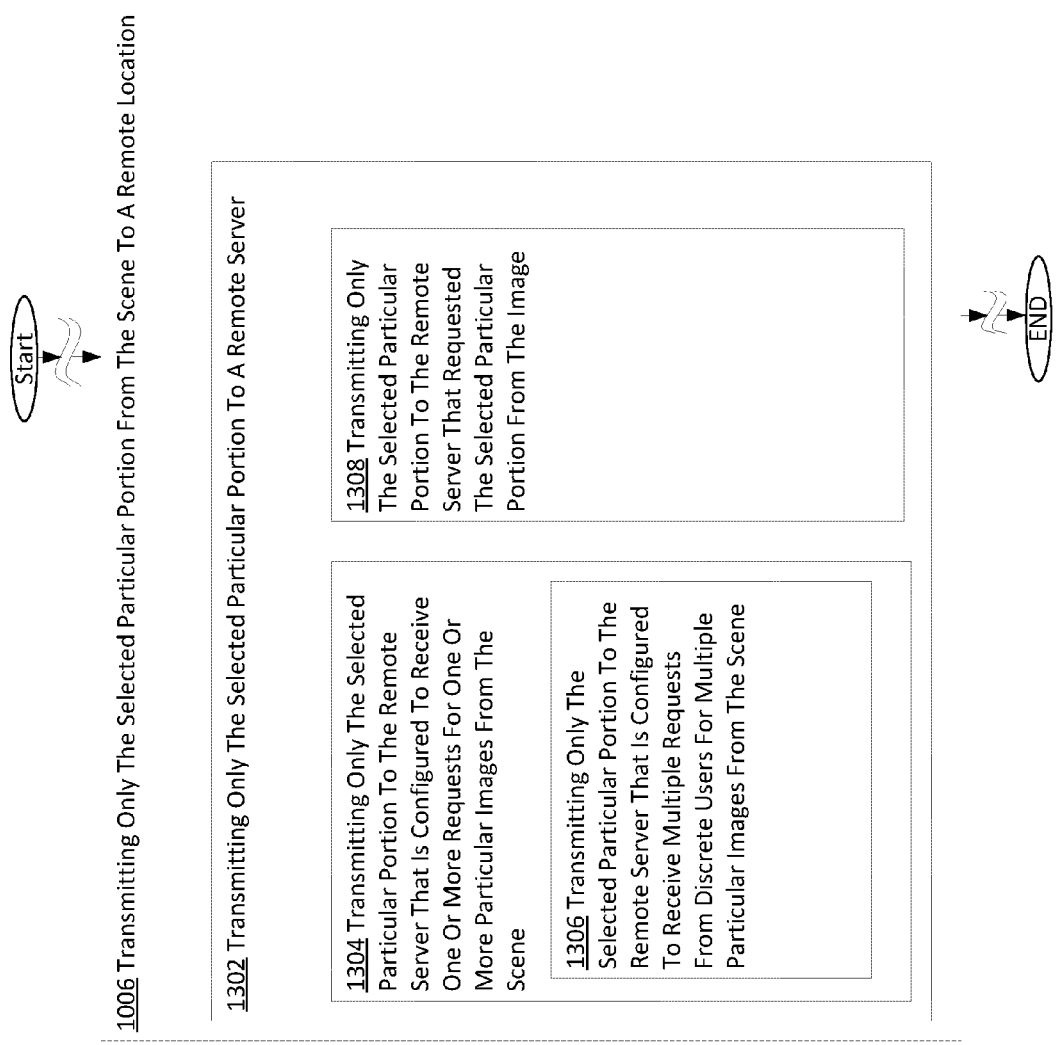

FIG. 13A is a high-level logic flow chart of a process depicting alternate implementations of a transmitting only the selected particular portion from the scene operation 1006, according to one or more embodiments.

Figure 13B:
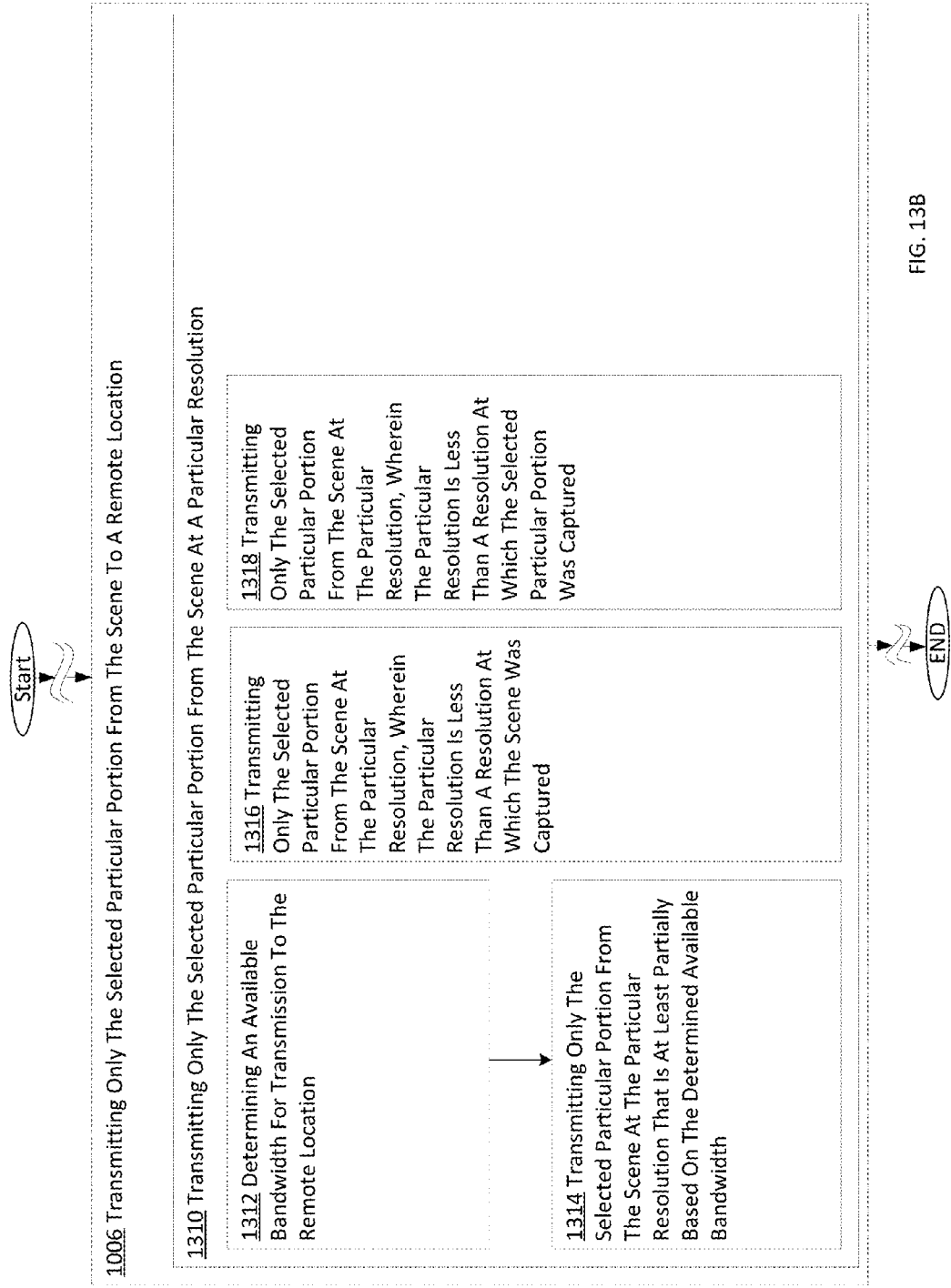

FIG. 13B is a high-level logic flow chart of a process depicting alternate implementations of a transmitting only the selected particular portion from the scene operation 1006, according to one or more embodiments.

Figure 13C:
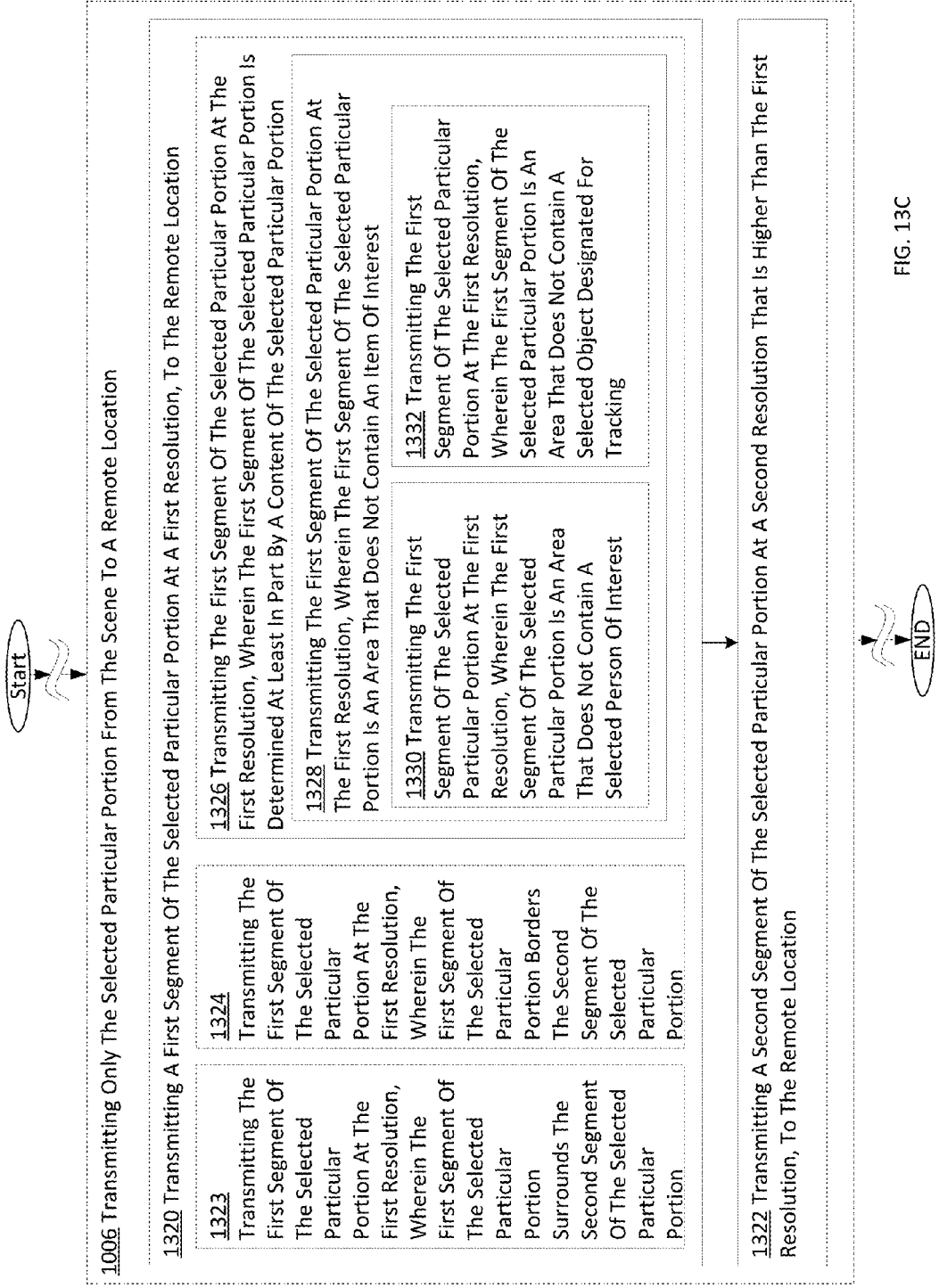

FIG. 13C is a high-level logic flow chart of a process depicting alternate implementations of a transmitting only the selected particular portion from the scene operation 1006, according to one or more embodiments.

Figure 13D:
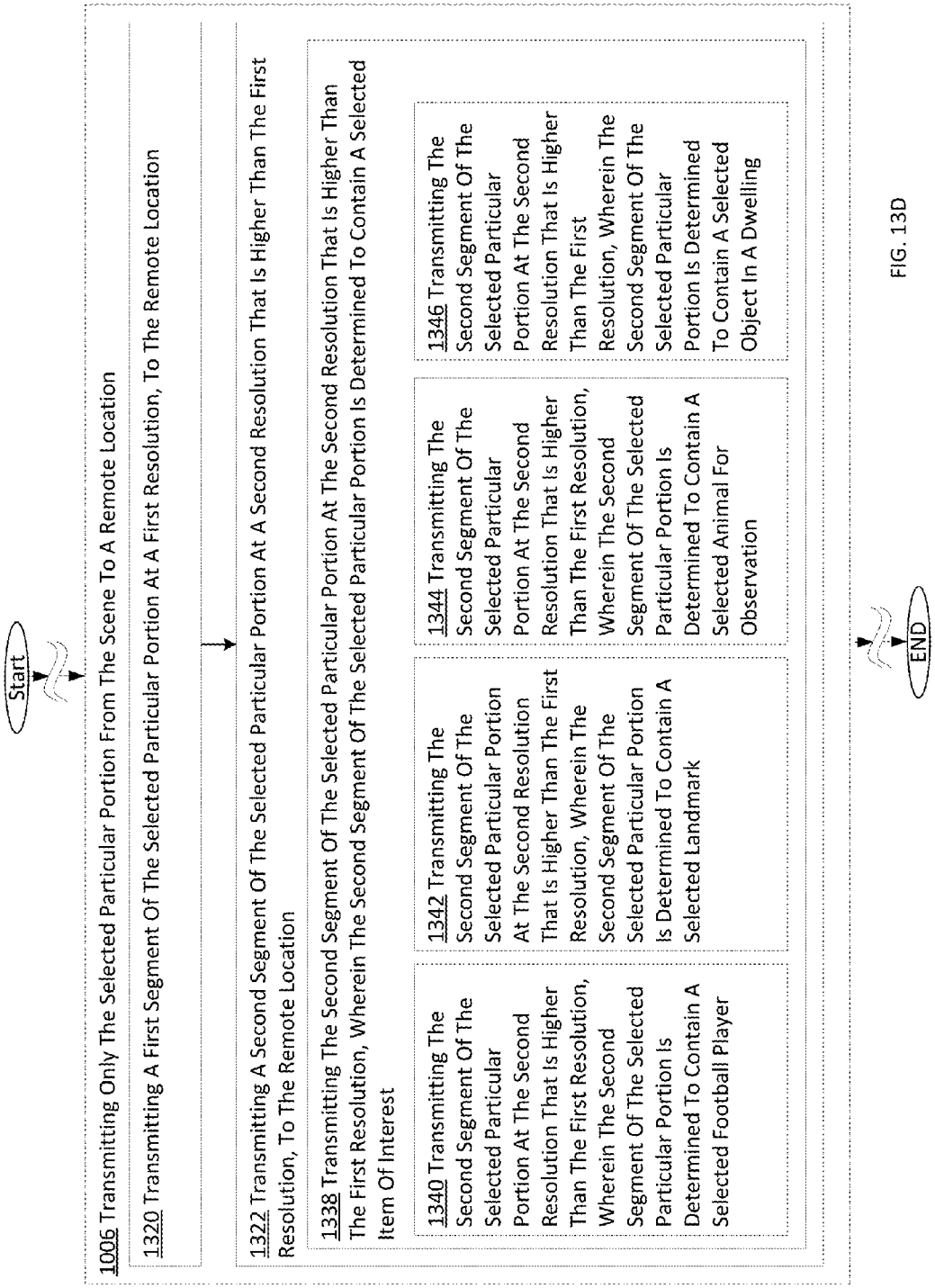

FIG. 13D is a high-level logic flow chart of a process depicting alternate implementations of a transmitting only the selected particular portion from the scene operation 1006, according to one or more embodiments.

Figure 14A:
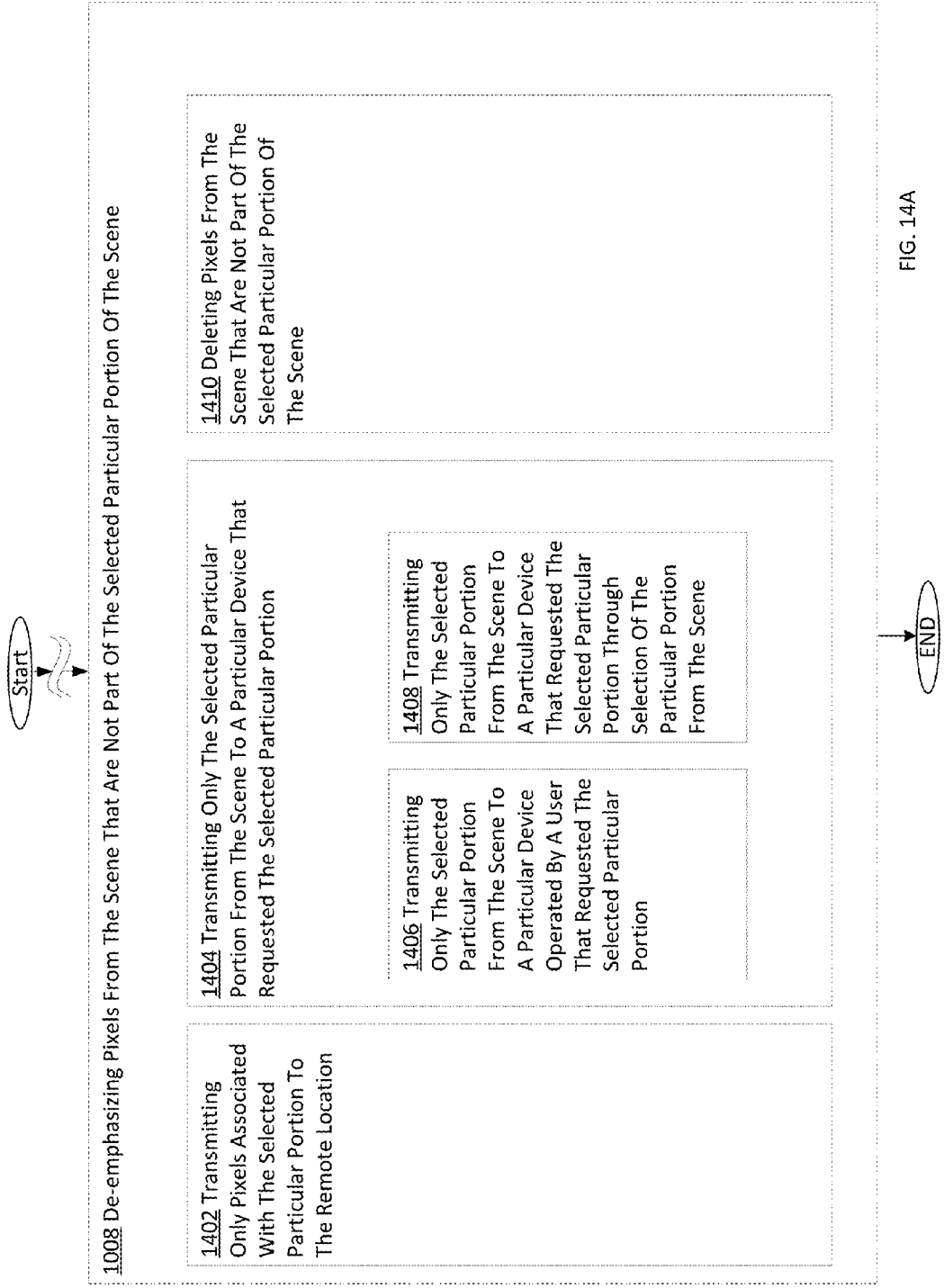

FIG. 14A is a high-level logic flow chart of a process depicting alternate implementations of a de-emphasizing pixels from the scene operation 1008, according to one or more embodiments.

Figure 14B:
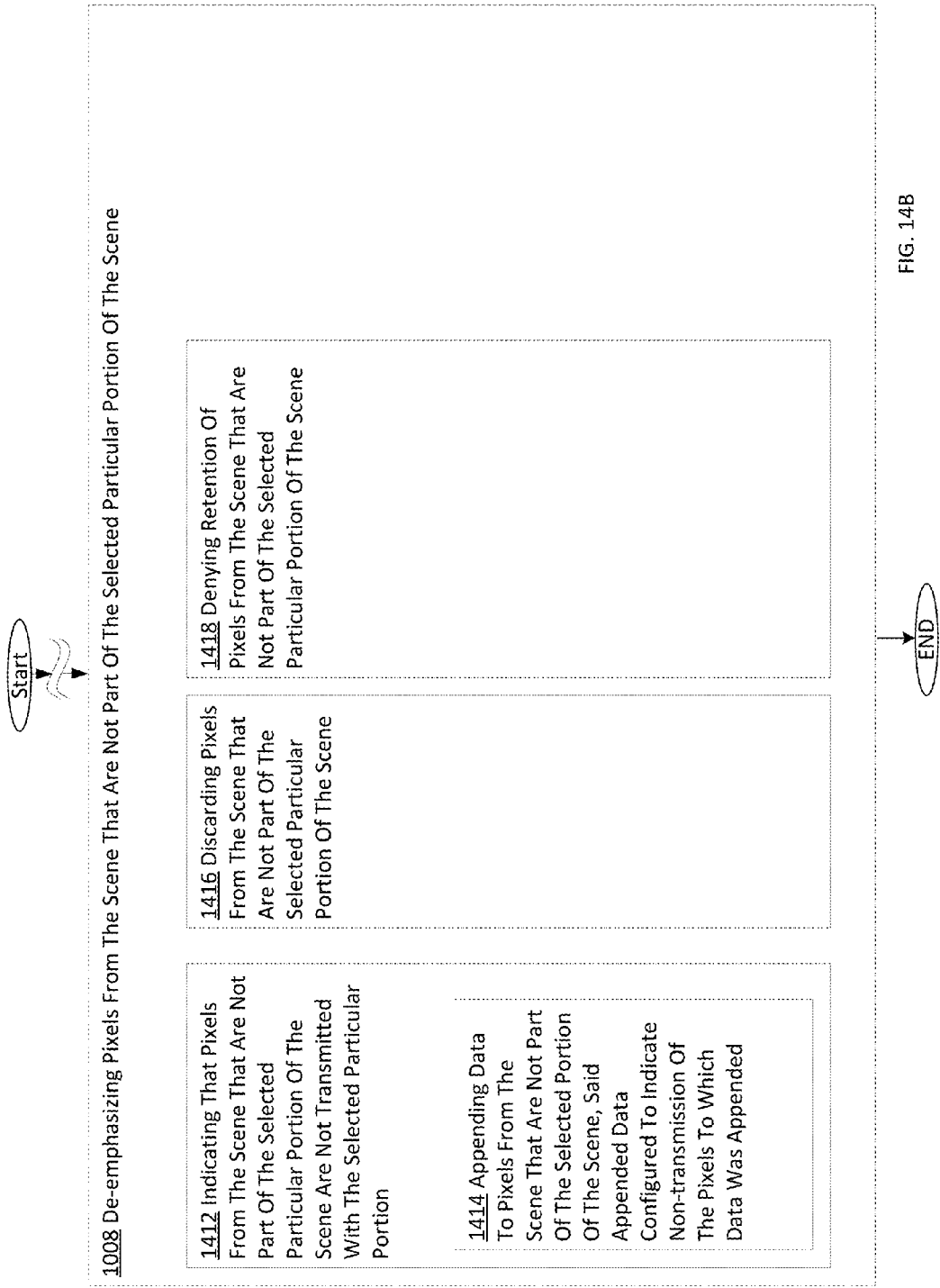

FIG. 14B is a high-level logic flow chart of a process depicting alternate implementations of a de-emphasizing pixels from the scene operation 1008, according to one or more embodiments.

Figure 14C:
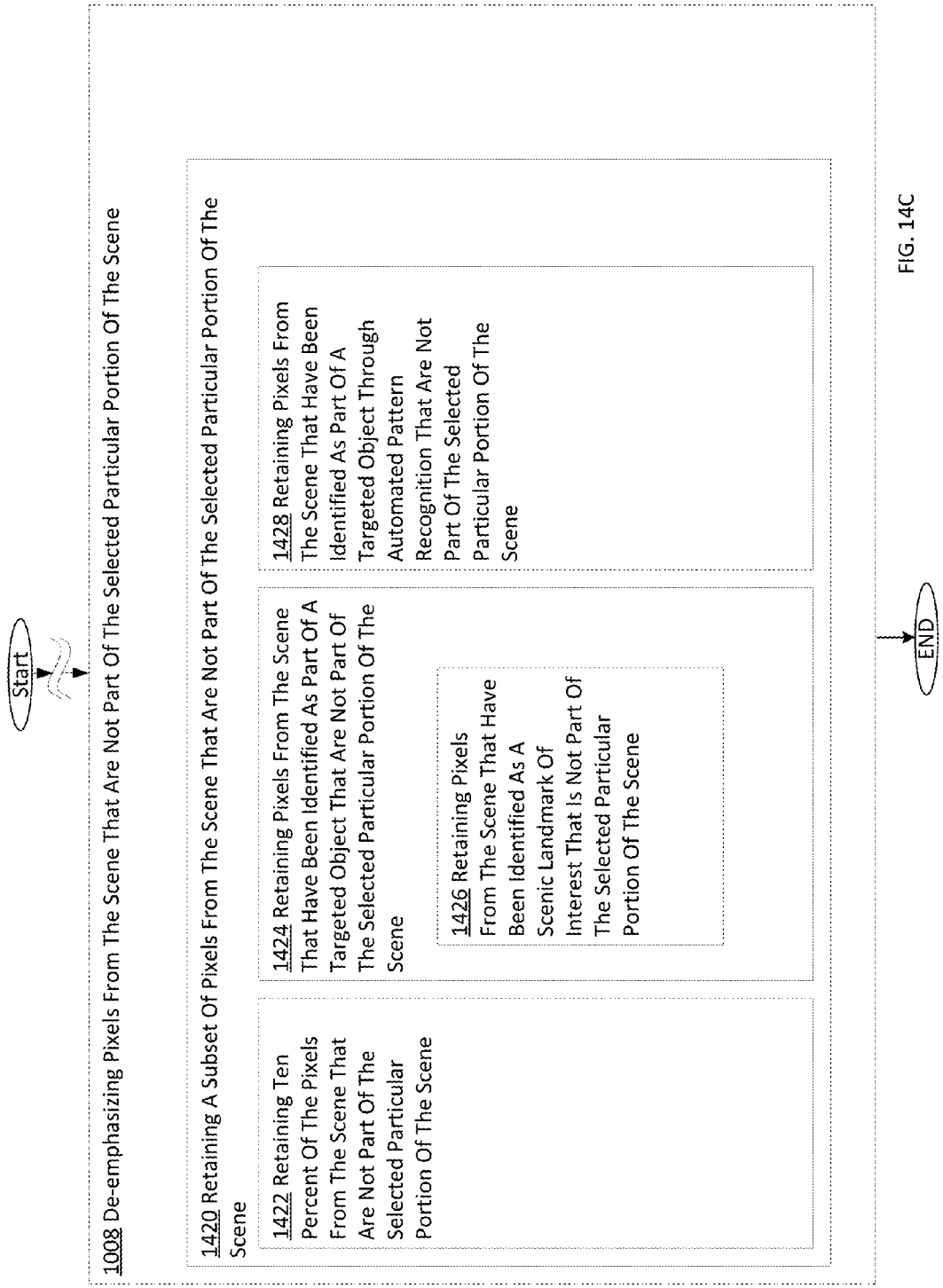

FIG. 14C is a high-level logic flow chart of a process depicting alternate implementations of a de-emphasizing pixels from the scene operation 1008, according to one or more embodiments.

Figure 14D:
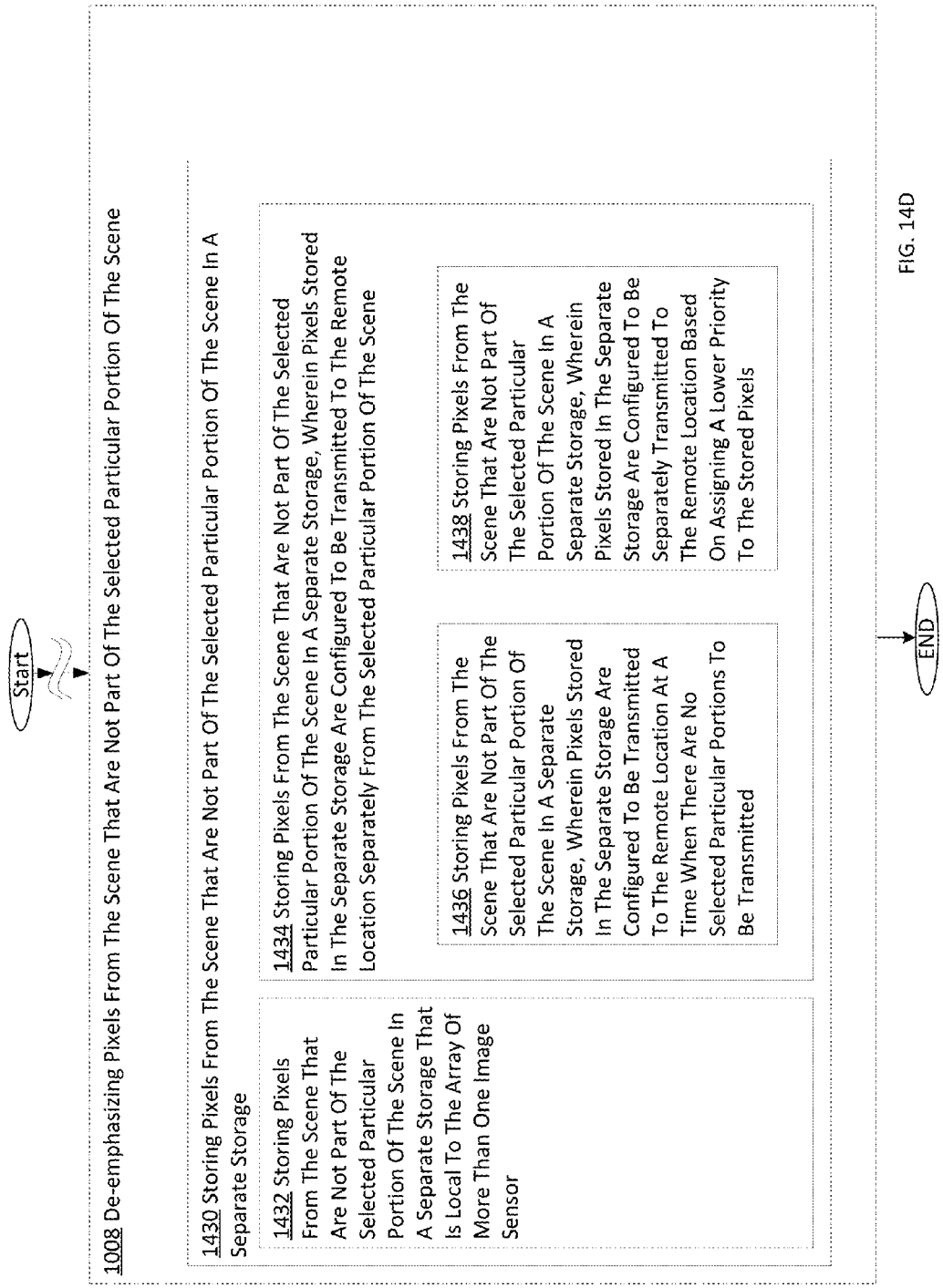

FIG. 14D is a high-level logic flow chart of a process depicting alternate implementations of a de-emphasizing pixels from the scene operation 1008, according to one or more embodiments.

DETAILED DESCRIPTION

Overview

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for capturing a scene that includes one or more images, through use of an array of more than one image sensor, selecting a particular portion of the scene that includes at least one image, wherein the selected particular portion is smaller than the scene, and transmitting only the selected particular portion from the scene to a remote location.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software (e.g., a high-level computer program serving as a hardware specification)).

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Operational/Functional Language is a Concrete Specification for Physical Implementation Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements.

This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. In order to facilitate human comprehension, in many instances, high-level programming languages resemble or even share symbols with natural languages.

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output.

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software (e.g., a high-level computer program serving as a hardware specification), and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software (e.g., a high-level computer program serving as a hardware specification), and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software (e.g., a high-level computer program serving as a hardware specification) implementation; or, yet again alternatively, the implementer may opt for some combination of hardware, software (e.g., a high-level computer program serving as a hardware specification), and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software (e.g., a high-level computer program serving as a hardware specification), and or firmware.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software (e.g., a high-level computer program serving as a hardware specification) or firmware, or of gate arrays or programmable hardware, such as by performing a reception of or a transmission of one or more instructions in relation to one or more operations described herein. Alternatively or additionally, in some variants, an implementation may include special-purpose hardware, software (e.g., a high-level computer program serving as a hardware specification), firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include, but are not limited to, physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although one or more users maybe shown and/or described herein, e.g., in FIG. 1, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

High-Level System Architecture

FIG. 1, including FIGS. 1-A-1-AN, shows partial views that, when assembled, form a complete view of an entire system, of which at least a portion will be described in more detail. An overview of the entire system of FIG. 1 is now described herein, with a more specific reference to at least one subsystem of FIG. 1 to be described later with respect to FIGS. 2-14D.

FIG. 1 shows various implementations of the overall system. At a high level, FIG. 1 shows various implementations of a multiple user video imaging array (hereinafter interchangeably referred to as a "MUVIA"). It is noted that the designation "MUVIA" is merely shorthand and descriptive of an exemplary embodiment, and not a limiting term. Although "multiple user" appears in the name MUVIA, multiple users or even a single user are not required. Further, "video" is used in the designation "MUVIA," but MUVIA systems also may capture still images, multiple images, audio data, electromagnetic waves outside the visible spectrum, and other data as will be described herein. Further, "imaging array" may be used in the MUVIA designation, but the image sensor in MUVIA is not necessarily an array or even multiple sensors (although commonly implemented as larger groups of image sensors, single-sensor implementations are also contemplated), and "array" here does not necessarily imply any specific structure, but rather any grouping of one or more sensors.

Generally, although not necessarily required, a MUVIA system may include one or more of a user device (e.g., hereinafter interchangeably referred to as a "client device," in recognition that a user may not necessarily be a human, living, or organic"), a server, and an image sensor array. A "server" in the context of this application may refer to any device, program, or module that is not directly connected to the image sensor array or to the client device, including any and all "cloud" storage, applications, and/or processing.

For example, in an embodiment, e.g., as shown in FIG. 1-A, FIG. 1-K, FIG. 1-U, FIG. 1-AE, and FIG. 1-AF, in an embodiment, the system may include one or more of image sensor array 3200, array local processing module 3300, server 4000, and user device 5200. Each of these portions will be discussed in more detail herein.

Referring now to FIG. 1-A, FIG. 1-A depicts user device 5200, which is a device that may be operated or controlled by a user of a MUVIA system. It is noted here that "user" is merely provided as a designation for ease of understanding, and does not imply control by a human or other organism, sentient or otherwise. In an embodiment, for example, in a security-type embodiment, the user device 5200 may be mostly or completely unmonitored, or may be monitored by an artificial intelligence, or by a combination of artificial intelligence, pseudo-artificial intelligence (e.g., that is intelligence amplification) and human intelligence.

User device 5200 may be, but is not limited to, a wearable device (e.g., glasses, goggles, headgear, a watch, clothing), an implant (e.g., a retinal-implant display), a computer of any kind (e.g., a laptop computer, desktop computer, mainframe, server, etc.), a tablet or other portable device, a phone or other similar device (e.g., smartphone, personal digital assistant), a personal electronic device (e.g., music player, CD player), a home appliance (e.g., a television, a refrigerator, or any other so-called "smart" device), a piece of office equipment (e.g., a copier, scanner, fax device, etc.), a camera or other camera-like device, a video game system, an entertainment/media center, or any other electrical equipment that has a functionality of presenting an image (whether visual or by other means, e.g., a screen, but also other sensory stimulating work).

User device 5200 may be capable of presenting an image, which, for purposes of clarity and conciseness will be referred to as displaying an image, although communication through forms other than generating light waves through the visible light spectrum, although the image is not required to be presented at all times or even at all. For example, in an embodiment, user device 5200 may receive images from server 4000 (or directly from the image sensor array 3200, as will be discussed herein), and may store the images for later viewing, or for processing internally, or for any other reason.

Referring again to FIG. 1-A, in an embodiment, user device 5200 may include a user selection accepting module 5210. User selection accepting module 5210 may be configured to receive user input about what the user wants to see. For example, as shown in FIG. 1-A in the exemplary interface 5212, the user selection accepting module 5210 may show an image from image sensor array 3200, and the user may "pan" and "zoom" the image using any known interface, including, but not limited to, keyboard, mouse, touch, haptic, augmented reality interface, voice command, nonverbal motion commands (e.g., as part of a video game system interface, e.g., the Microsoft Kinect). It is noted, and as will be discussed in more detail herein, the camera itself is not "zooming" or "panning," because the camera does not move. What is happening is that different pixels that are captured by the image sensor array 3200 are kept by the image sensor array 3200 and transmitted to the server 4000.

In an embodiment, the user selection accepting module 5210 may accept a selection of a particular thing—e.g., a building, an animal, or any other object whose representation is present on the screen. Moreover, a user may use a text box to "search" the image for a particular thing, and processing, done at the user device 5200 or at the server 4000, may determine the image and the zoom level for viewing that thing. The search for a particular thing may include a generic search, e.g., "search for people," or "search for penguins," or a more specific search, e.g., "search for the Space Needle," or "search for the White House." The search for a particular thing may take on any known contextual search, e.g., an address, a text string, or any other input.

In an embodiment, the "user selection" facilitated by the user selection accepting module 5210 may not involve a user at all. For example, in an embodiment, e.g., in a security embodiment, the user selection may be handled completely by machine, and may include "select any portion of the image with movement," or "select any portion of the image in which a person is recognized," or "select any portion of the image in which a particular person, e.g., a person on the FBI most wanted list" is recognized.

Referring again to FIG. 1-A, in an embodiment, user device 5200 may include a user selection transmitting module 5220. The user selection transmitting module 5220 may take the user selection from user selection transmitting module 5220, and transmit the selection to the server 4000. The transmission may include some pre-processing, for example, the user device 5200 may determine the size and parameters of the image prior to sending the request to the server 4000, or that processing may be handled by the server 4000. Following the thick-line arrow leftward from user selection transmitting module 5220 through to FIG. 1-K, the transmission goes to server 4000, as will be discussed herein. It is noted that the transmission to the server 4000 may also include data about the user device 5200, for example, the screen resolution, the window size, the type of device, an identity of the user, a level of service the user has paid for (in embodiments in which such services are prioritized by the camera/server), other capabilities of the device, e.g., framerate, and the like.

Referring again to FIG. 1-A, FIG. 1-A also includes a selected image receiving module 5230 and a user selection presenting module 5240, which will be discussed in more detail herein, with respect to the dataflow of this embodiment.

Referring now to FIG. 1-K, FIGS. 1-K and 1-U show an embodiment of a server 4000 that communicates with one or both of user device 5200 and array local processing module 3300. Sever 4000 may be a single computing device, or may be many computing devices, which may or may not be in proximity with each other.

Referring again to FIG. 1-K, server 4000 may include a user request reception module 4010. The user request reception module 4010 may receive the transmitted request from user selection transmitting module 5220. The user request reception module 4010 may then turn over processing to user request validation module 4020, which may perform, among other things, a check to make sure the user is not requesting more resolution than what their device can handle. For example, if the server has learned (e.g., through gathered information, or through information that was transmitted with the user request or in a same session as the user request), that the user is requesting a 1900×1080 resolution image, and the maximum resolution for the device is 1334× 750, then the request will be modified so that no more than the maximum resolution that can be handled by the device is requested. In an embodiment, this may conserve the bandwidth required to transmit from the MUVIA to the server 4000 and/or the user device 5200.

Referring again to FIG. 1-K, in an embodiment, server 4000 may include a user request latency management module 4030. User request latency management module 4030 may, in conjunction with user device 5200, attempt to reduce the latency from the time a specific image is requested by user device 5200 to the time the request is acted upon and data is transmitted to the user. The details for this latency management will be described in more detail herein, with varying techniques that may be carried out by any or all of the devices in the chain (e.g., user device, camera array, and server). As an example, in an embodiment, a lower resolution version of the image, e.g., that is stored locally or on the server, may be sent to the user immediately upon the request, and then that image is updated with the actual image taken by the camera. In an embodiment, user request latency management module 4030 also may handle static gap-filling, that is, if the image captured by the camera is unchanging, e.g., has not changed for a particular period of time, then a new image is not necessary to be captured, and an older image, that may be stored on server 4000, may be transmitted to the user device 5200. This process also will be discussed in more detail herein.

Referring now to FIG. 1-U, which shows more of server 4000, in an embodiment, server 4000 may include a consolidated user request transmission module 4040, which may be configured to consolidate all the user requests, perform any necessary pre-processing on those requests, and send the request for particular sets of pixels to the array local processing module 3300. The process for consolidating the user requests and performing pre-processing will be described in more detail herein with respect to some of the other exemplary embodiments. In this embodiment, however, server consolidated user request transmission module 4040 transmits the request (exiting leftward from FIG. 1-U and traveling downward to FIG. 1-AE, through a pathway identified in FIG. 1-AE as lower-bandwidth communication from remote server to ISA 3515. It is noted here that "lower bandwidth communication" does not necessarily mean "low bandwidth" or imply any specific number about the bandwidth—it is simply lower than the relatively higher bandwidth communication from the actual image sensor array 3505 to the array local processing module 3300, which will be discussed in more detail herein.

Referring again to FIG. 1-U, server 4000 also may include requested pixel reception module 4050, user request preparation module 4060, and user request transmission module 4070 (shown in FIG. 1-K), which will be discussed in more detail herein, with respect to the dataflow of this embodiment Referring now to FIGS. 1-AE and 1-AF, FIGS. 1-AE and 1-AF show an image sensor array ("ISA") 3200 and an array local processing module 3300, each of which will now be described in more detail.

Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local processing module 3300. In an embodiment, array local processing module 3300 is integrated into the image sensor array 3200. In another embodiment, the array local processing module 3300 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3300 to the remote server, which may be, but is not required to be, located further away temporally.

It is noted that, because of the large number of pixels captured by image sensor array 3200, mechanical changes to the image sensor array 3200 are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AE, the image sensor array 3300 may capture an image that is received by image capturing module 3305. Image capturing module 3305 may take the captured image and compare it to a consolidated user request, e.g., which is provided by a consolidated user request reception module 3310. Consolidated user request reception module 3310 may receive the communication from server 4000 regarding which pixels of the image have been requested. Through use of the consolidated user request and the captured image, pixel selection module 3320 may select the pixels that have been specifically requested by the user, and mark those pixels for transmission back to the server.

After the pixels to be kept are identified, the other pixels that are not to be kept are removed, e.g., decimated at unused pixel decimation module 3330. In an embodiment, these pixels are simply discarded, e.g., not stored in a long-term memory, that is removed to a digital trash 3317. In another embodiment, some or all of these pixels are stored in a local memory, e.g., local memory 3315. From here, these pixels may be transmitted to various locations at off-peak times, may be kept for image processing by the array local processing module 3300, or may be subject to other manipulations or processing separate from the user requests.

Referring again to FIG. 1-AE, the selected pixels then may be transmitted to the server 4000 using selected pixel transmission module 3340. Selected pixel transmission module 3340 may include any transmission equipment necessary, e.g., cellular radio, wireless adapter, and the like, depending on the format of communication. In an embodiment, only those pixels which have been requested are transmitted to the server via lower-bandwidth communication 3510. Similarly to lower-bandwidth communication 3515, the lower-bandwidth communication 3510 does not refer to a specific amount of bandwidth, just that the amount of bandwidth is relatively lower than higher-bandwidth communication 3505.

It is noted that more pixels than what are specifically requested by the user may be transmitted, in certain embodiments. For example, the array local processing module 3300 may send pixels that border the user's requested area, but are outside the user's requested area. In an embodiment, as will be discussed herein, those pixels may be sent at a different resolution or using a different kind of compression. In another embodiment, the additional pixels may merely be sent the same as the requested pixels. In still another embodiment, server 4000 may expand the user requested areas, so that array local processing module 3300 may send only the requested pixels, but the requested pixels cover more area than what the user originally requested. These additional pixels may be transmitted and "cached" by the server or local device, which may be used to decrease latency times, in a process that will be discussed more herein.

Referring back to FIG. 1-U, the transmitted pixels transmitted from selected pixel transmission module 3340 of array local processing module 3300 may be received by server 4000, e.g., at requested pixel reception module 4050. Requested pixel reception module 4050 may receive the requested pixels and turn them over to user request preparation module 4060, which may "unpack" the requested pixels, e.g., determining which pixels go to which user, and at what resolutions, along with any post-processing, including image adjustment, adding in missing cached data, or adding additional data to the images (e.g., advertisements or other data). In an embodiment, server 4000 also may include a user request transmission module 4070, which may be configured to transmit the requested pixels back to the user device 5200.

Referring again to FIG. 1-A, user device 5200 may include a selected image receiving module 5230, which may receive the pixels that were sent by the server 4000, and user selection presenting module 5240, which may display the requested pixels to the user, e.g., by showing them on a screen of the device. In an embodiment, the display of the image may be carried out through the exemplary interface, which allows a cycle of user requests and new images to be shown as the user navigates through what is seen on the MUVIA, e.g., as shown in FIG. 1-A.

FIGS. 1-B, 1-C, 1-M, 1-W, 1-AG, and 1-AH show another embodiment of the MUVIA system, in which multiple user devices 5510, 5520, and 5530 may request images captured by the same image sensor array 3200.

Referring now to FIGS. 1-B and 1-C, user device 5510, user device 5520, and user device 5530 are shown. In an embodiment, user devices 5510, 5520, and 5530 may have some or all of the same components as user device 5200, but are not shown here for clarity and ease of understanding the drawing. For each of user devices 5510, 5520, and 5530, exemplary screen resolutions have been chosen. There is nothing specific about these numbers that have been chosen, however, they are merely illustrated for exemplary purposes, and any other numbers could have been chosen in their place.

For example, in an embodiment, referring to FIG. 1-B, user device 5510 may have a screen resolution of 1920× 1080 (e.g., colloquially referred to as "HD quality"). User device 5510 may send an image request to the server 4000, and may also send data regarding the screen resolution of the device.

Referring now to FIG. 1-C, user device 5520 may have a screen resolution of 1334×750. User device 5520 may send another image request to the server 4000, and, in an embodiment, instead of sending data regarding the screen resolution of the device, may send data that identifies what kind of device it is (e.g., an Apple-branded smartphone). Server 4000 may use this data to determine the screen resolution for user device 5520 through an internal database, or through contacting an external source, e.g., a manufacturer of the device or a third party supplier of data about devices.

Referring again to FIG. 1-C, user device 5530 may have a screen resolution of 640×480, and may send the request by itself to the server 4000, without any additional data. In addition, server 4000 may receive independent requests from various users to change their current viewing area on the device.

Referring now to FIG. 1-M, server 4000 may include user request reception module 4110. User request reception module 4110 may receive requests from multiple user devices, e.g., user devices 5510, 5520, and 5530. Server 4000 also may include an independent user view change request reception module 4115, which, in an embodiment, may be a part of user request reception module 4110, and may be configured to receive requests from users that are already connected to the system, to change the view of what they are currently seeing.

Referring again to FIG. 1-M, server 4000 may include relevant pixel selection module 4120 configured to combine the user selections into a single area, as shown in FIG. 1-M. It is noted that, in an embodiment, the different user devices may request areas that overlap each other. In this case, there may be one or more overlapping areas, e.g., overlapping areas 4122. In an embodiment, the overlapping areas are only transmitted once, in order to save data/transmission costs and increase efficiency.

Referring now to FIG. 1-W, server 4000 may include selected pixel transmission to ISA module 4130. Module 4130 may take the relevant selected pixels, and transmit them to the array local processing module 3400 of image sensor array 3200. Selected pixel transmission to ISA module 4130 may include communication components, which may be shared with other transmission and/or reception modules.

Referring now to FIG. 1-AG, array local processing module 3400 may communicate with image sensor array 3200. Similarly to FIGS. 1-AE and 1-AF, FIGS. 1-AG and 1-AH show array local processing module 3400 and image sensor array 3200, respectively.

Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local processing module 3400. In an embodiment, array local processing module 3400 is integrated into the image sensor array. In another embodiment, the array local storage and processing module 3400 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3400 to the remote server, which may be, but is not required to be, located further away temporally.

It is noted that, because of the large number of pixels captured by image sensor array 3200, mechanical changes to the image sensor array are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AG, the image sensor array 3200 may capture an image and compare it to a consolidated user request, e.g., which is provided by a consolidated user request reception module 3410. Consolidated user request reception module 3410 may receive the communication from server 4000 regarding which pixels of the image have been requested. Through use of the consolidated user request and the captured image, pixel selection module 3420 may select the pixels that have been specifically requested by the user, and mark those pixels for transmission back to the server.

After the pixels to be kept are identified, the other pixels that are not to be kept are removed, e.g., decimated at unused pixel decimation module 3430. In an embodiment, these pixels are simply discarded, e.g., not stored in a long-term memory, that is removed to a digital trash 3417. In another embodiment, some or all of these pixels are stored in a local memory, e.g., local memory 3415. From here, these pixels may be transmitted to various locations at off-peak times, may be kept for image processing by the array local processing module 3400, or may be subject to other manipulations or processing separate from the user requests.

Referring gain to FIG. 1-AG, array local processing module 3400 may include flagged selected pixel transmission module 3440, which takes the pixels identified as requested (e.g., "flagged") and transmits them back to the server 4000 for further processing. Similarly to as previously described, this transmission may utilize a lower-bandwidth channel, and module 3440 may include all necessary hardware to effect that lower-bandwidth transmission to server 4000.

Referring again to FIG. 1-W, the flagged selected pixel transmission module 3440 of array local processing module 3400 may transmit the flagged pixels to server 4000. Specifically, flagged selected pixel transmission module 3440 may transmit the pixels to flagged selected pixel reception from ISA module 4140 of server 4000, as shown in FIG. 1-W.

Referring again to FIG. 1-W, server 4000 also may include flagged selected pixel separation and duplication module 4150, which may, effectively, reverse the process of combining the pixels from the various selections, duplicating overlapping areas where necessary, and creating the requested images for each of the user devices that requested images. Flagged selected pixel separation and duplication module 4150 also may include the post-processing done to the image, including filling in cached versions of images, image adjustments based on the device preferences and/or the user preferences, and any other image post-processing.

Referring now to FIG. 1-M (as data flows "northward" from FIG. 1-W from module 4150), server 4000 may include pixel transmission to user device module 4160, which may be configured to transmit the pixels that have been separated out and processed to the specific users that requested the image. Pixel transmission to user device module 4160 may handle the transmission of images to the user devices 5510, 5520, and 5530. In an embodiment, pixel transmission to user device module 4160 may have some or all components in common with user request reception module 4110.

Following the arrow of data flow to the right and upward from module 4160 of server 4000, the requested user images arrive at user device 5510, user device 5520, and user device 5530, as shown in FIGS. 1-B and 1-C. The user devices 5510, 5520, and 5530 may present the received images as previously discussed and/or as further discussed herein.

Referring again to FIG. 1, FIGS. 1-E, 1-O, 1-Y, 1-AH, and 1-AI depict a MUVIA implementation according to an embodiment. In an embodiment, referring now to FIG. 1-E, a user device 5600 may include a target selection reception module 5610. Target selection reception module 5610 may be a component that allows the user to select a "target" from the image, that is, a point of interest from the image. For example, in the shown example, the MUVIA array is pointed at a football stadium, e.g., CenturyLink Field. As an example, a user may select one of the football players visible on the field as a "target." This may be facilitated by a target presentation module, e.g., target presentation module 5612, which may present one or more images (e.g., which may be various versions of images from MUVIA, at different resolutions or not up-to-date) from which the user may select the target, e.g., the football player.

In an embodiment, target selection reception module 5610 may include an audible target selection module 5614 which may be configured to allow the user to select a target using audible commands, without requiring physical interaction with a device.

Referring again to FIG. 1, e.g., FIG. 1-E, in an embodiment, user device 5600 may include selected target transmission module 5620. Selected target transmission module 5620 may be configured to take the target selected by the user, and transmit the selected target to the server 4000.

Referring now to FIG. 1-O, FIG. 1-O (and FIG. 1-Y to the direct "south" of FIG. 1-O) shows an embodiment of server 4000. For example, in an embodiment, server 4000 may include a selected target reception module 4210. In an embodiment, selected target reception module 4210 of server 4000 may receive the selected target from the user device 5600. The selected target data may take various formats, e.g., it may be image data, it may be metadata that identifies the selected target, it may be some other designation, e.g., an ID number, a tracking number, or a piece of information, like a license plate or a social security number. The selected target data may be an address or a physical description, or any other instantiation of data that can be used to identify something.

Referring again to FIG. 1-O, in an embodiment, server 4000 may include selected target identification module 4220, which may be configured to take the target data received by selected target reception module 4210 and determine an image that needs to be captured in order to obtain an image that contains the selected target (e.g., in the shown example, the football player). In an embodiment, selected target identification module 4220 may use images previously received (or, in an embodiment, current images) from the image sensor array 3200 to determine the parameters of an image that contains the selected target. For example, in an embodiment, lower-resolution images from the image sensor array 3200 may be transmitted to server 4000 for determining where the target is located within the image, and then specific requests for portions of the image may be transmitted to the image sensor array 3200, as will be discussed herein.

In an embodiment, server 4000 may perform processing on the selected target data, and/or on image data that is received, in order to create a request that is to be transmitted to the image sensor array 3200. For example, in the given example, the selected target data is a football player. The server 4000, that is, selected target identification module 4220 may perform image recognition on one or more images captured from the image sensor array 3200 to determine a "sector" of the entire scene that contains the selected target. In another embodiment, the selected target identification module 4220 may use other, external sources of data to determine where the target is. In yet another embodiment, the selected target data was selected by the user from the scene displayed by the image sensor array 3200, so such processing may not be necessary.

Referring again to FIG. 1-O, in an embodiment, server 4000 may include pixel information selection module 4230, which may select the pixels needed to capture the target, and which may determine the size of the image that should be transmitted from the image sensor array 3200. The size of the image may be determined based on a type of target that is selected, one or more parameters (set by the user, by the device, or by the server, which may or may not be based on the selected target), by the screen resolution of the device, or by any other algorithm. Pixel information selection module 4230 may determine the pixels to be captured in order to express the target, and may update based on changes in the target's status (e.g., if the target is moving, e.g., in the football example, once a play has started and the football player is moving in a certain direction).

Referring now to FIG. 1-Y, FIG. 1Y includes more of server 4000 according to an embodiment. In an embodiment, server 4000 may include pixel information transmission to ISA module 4240. Pixel information transmission to ISA module 4240 may transmit the selected pixels to the array local processing module 3500 associated with image sensor array 3200.

Referring now to FIGS. 1-AH and 1-AI, FIG. 1-AH depicts an image sensor array 3200, which in this example is pointed at a football stadium, e.g., CenturyLink field. Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local processing module 3500. In an embodiment, array local processing module 3500 is integrated into the image sensor array 3200. In another embodiment, the array local processing module 3500 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3500 to the remote server, which may be, but is not required to be, located further away temporally.

It is noted that, because of the large number of pixels captured by image sensor array 3200, mechanical changes to the image sensor array 3200 are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AE, the image sensor array 3200 may capture an image that is received by image capturing module 3305. Image capturing module 3305 may take the captured image and compare it to a consolidated user request, e.g., which is provided by a consolidated user request reception module 3310. Consolidated user request reception module 3310 may receive the communication from server 4000 regarding which pixels of the image have been requested. Through use of the consolidated user request and the captured image, pixel selection module 3320 may select the pixels that have been specifically requested by the user, and mark those pixels for transmission back to the server.

After the pixels to be kept are identified, the other pixels that are not to be kept are removed, e.g., decimated at unused pixel decimation module 3330. In an embodiment, these pixels are simply discarded, e.g., not stored in a long-term memory, that is removed to a digital trash 3317. In another embodiment, some or all of these pixels are stored in a local memory, e.g., local memory 3315. From here, these pixels may be transmitted to various locations at off-peak times, may be kept for image processing by the array local processing module 3300, or may be subject to other manipulations or processing separate from the user requests. In an embodiment, unused pixel decimation module 3330 may include or communicate with a lower resolution module 3315, which may, in some embodiments, be used to transmit a lower-resolution version of more of the image (e.g., an entire scene, or more of the field of view surrounding the target) to the server 4000, so that the server 4000 may accurately determine which images are required to capture the target selected by the user.

Referring again to FIG. 1-AE, the selected pixels then may be transmitted to the server 4000 using selected pixel transmission module 3340. Selected pixel transmission module 3340 may include any transmission equipment necessary, e.g., cellular radio, wireless adapter, and the like, depending on the format of communication. In an embodiment, only those pixels which have been requested are transmitted to the server via lower-bandwidth communication 3510. Similarly to lower-bandwidth communication 3515, the lower-bandwidth communication 3510 does not refer to a specific amount of bandwidth, just that the amount of bandwidth is relatively lower than higher-bandwidth communication 3505.

Referring now again to FIG. 1-Y, server 4000 may include a requested image reception from ISA module 4250. Requested image reception from ISA module 4250 may receive the image data from the array local processing module 3500 (e.g., in the arrow coming "north" from FIG. 1-AI. That image, as depicted in FIG. 1-Y, may include the target (e.g., the football player), as well as some surrounding area (e.g., the area of the field around the football player). The "surrounding area" and the specifics of what is included/transmitted from the array local processing module may be specified by the user (directly or indirectly, e.g., through a set of preferences), or may be determined by the server, e.g., in the pixel information selection module 4230 (shown in FIG. 1-O).

Referring again to FIG. 1-Y, server 4000 may also include a requested image transmission to user device module 4260. Requested image transmission to user device module 4260 may transmit the requested image to the user device 5600. Requested image transmission to user device module 4260 may include components necessary to communicate with user device 5600 and may, in some embodiments, share components with one or more other modules of server 4000, e.g., a network interface, or a wireless antenna.

Referring again to FIG. 1-Y, server 4000 may include a server cached image updating module 4270. Server cached image updating module 4270 may take the images received from the array local processing module 3500 (e.g., which may include the image to be sent to the user), and compare the received images with stored or "cached" images on the server, in order to determine if the cached images should be updated. This process may happen frequently or infrequently, depending on embodiments, and may be continuously ongoing as long as there is a data connection, in some embodiments. In some embodiments, the frequency of the process may depend on the available bandwidth to the array local processing module 3500, e.g., that is, at off-peak times, the frequency may be increased. In an embodiment, server cached image updating module 4270 compares an image received from the array local processing module 3500, and, if the image has changed, replaces the cached version of the image with the newer image.

Referring now again to FIG. 1-E, FIG. 1-E shows user device 5600. In an embodiment, user device 5600 includes image containing selected target receiving module 5630 that may be configured to receive the image from server 4000, e.g., requested image transmission to user device module 4260 of server 4000 (e.g., depicted in FIG. 1-Y, with the data transmission indicated by a rightward-upward arrow passing through FIG. 1-Y and FIG. 1-O (to the north) before arriving at FIG. 1-E.

Referring again to FIG. 1-E, FIG. 1-E shows received image presentation module 5640, which may display the requested pixels that include the selected target to the user, e.g., by showing them on a screen of the device. In an embodiment, the display of the image may be carried out through an exemplary interface that allows the user to monitor the target, and which also may display information about the target (e.g., in an embodiment, as shown in the figures, the game statistics for the football player also may be shown), which allows a cycle of user requests and new images to be shown as the user navigates through what is seen on the MUVIA, e.g., as shown in FIG. 1-A.

Referring again to FIG. 1, FIGS. 1-F, 1-P, 1-Z, and 1-AJ depict a MUVIA implementation according to an embodiment. This embodiment may be colloquially known as "live street view" in which one or more MUVIA systems allow for a user to move through an area similarly to the well known Google-branded Maps (or Google-Street), except with the cameras working in real time. For example, in an embodiment, referring now to FIG. 1-F, a user device 5700 may include a target selection input reception module 5710. Target selection input reception module 5710 may be a component that allows the user to select a "target" from the image, that is, a point of interest from the image. For example, in the shown example, the MUVIA may be focused on a city, and the target may be an address, a building, a car, or a person in the city. As an example, a user may select a street address as a "target." This may be facilitated by a target presentation module, e.g., image selection presentation module 5712, which may present one or more images (e.g., which may be various versions of images from MUVIA, at different resolutions or not up-to-date) from which the user may select the target, e.g., the street address. In an embodiment, image selection presentation module 5712 may use static images that may or may not be sourced by the MUVIA system, and, in another embodiment, image selection presentation module 5712 may use current or cached views from the MUVIA system.

In an embodiment, image selection presentation module 5712 may include an audible target selection module 5714 which may be configured to allow the user to select a target using audible commands, without requiring physical interaction with a device.

Referring again to FIG. 1, e.g., FIG. 1-F, in an embodiment, user device 5700 may include selected target transmission module 5720. Selected target transmission module 5720 may be configured to take the target selected by the user, and transmit the selected target to the server 4000.

Referring now to FIG. 1-P, FIG. 1-P depicts a server 4000 of the MUVIA system according to embodiments. In an embodiment, server 4000 may include a selected target reception module 4310. Selected target reception module 4310 may receive the selected target from the user device 5700. In an embodiment, server 4000 may provide all or most of the data that facilitates the selection of the target, that is, the images and the interface, which may be provided, e.g., through a web portal.

Referring again to FIG. 1-P, in an embodiment, server 4000 may include a selected image pre-processing module 4320. Selected image pre-processing module 4320 may perform one or more tasks of pre-processing the image, some of which are described herein for exemplary purposes. For example, in an embodiment, selected image pre-processing module 4320 may include a resolution determination module 4322 which may be configured to determine the resolution for the image in order to show the target (and here, resolution is merely a stand-in for any facet of the image, e.g., color depth, size, shadow, pixelation, filter, etc.). In an embodiment, selected image pre-processing module 4320 may include a cached pixel fill-in module 4324. Cached pixel fill-in module 4324 may be configured to manage which portions of the requested image are recovered from a cache, and which are updated, in order to improve performance. For example, if a view of a street is requested, certain features of the street (e.g., buildings, trees, etc., may not need to be retrieved each time, but can be filled in with a cached version, or, in another embodiment, can be filled in by an earlier version. A check can be done to see if a red parked car is still in the same spot as it was in an hour ago; if so, that part of the image may not need to be updated. Using lower resolution/prior images stored in a memory 4215, as well as other image processing techniques, cached pixel fill-in module 4324 determines which portions of the image do not need to be retrieved, thus reducing bandwidth load on the connection between the array local processing module 3600 and the server 4000.

Referring again to FIG. 1-P, in an embodiment, selected image pre-processing module 4320 of server 4000 may include a static object obtaining module 4326, which may operate similarly to cached pixel fill-in module 4324. For example, as in the example shown in FIG. 1-B, static object obtaining module 4326 may obtain prior versions of static objects, e.g., buildings, trees, fixtures, landmarks, etc., which may save bandwidth load on the connection between the array local processing module 3600 and the server 4000.

Referring again to FIG. 1-P, in an embodiment, pixel information transmission to ISA module 4330 may transmit the request for pixels (e.g., an image, after the pre-processing) to the array local processing module 3600 (e.g., as shown in FIGS. 1-Z and 1-AI, with the downward extending dataflow arrow).

Referring now to FIGS. 1-Z and 1-AJ, in an embodiment, an array local processing module 3600, that may be connected by a higher bandwidth connection to an image sensor array 3200, may be present.

Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local processing module 3600. In an embodiment, array local processing module 3600 is integrated into the image sensor array 3200. In another embodiment, the array local processing module 3600 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3600 to the remote server, which may be, but is not required to be, located further away temporally.

It is noted that, because of the large number of pixels captured by image sensor array 3200, mechanical changes to the image sensor array 3200 are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AJ and FIG. 1-Z, the image sensor array 3200 may capture an image that is received by image capturing module 3305. Image capturing module 3305 may take the captured image and compare it to a consolidated user request, e.g., which is provided by a request reception module 3610. Request reception module 3610 may receive the communication from server 4000 regarding which pixels of the image have been requested. Through use of the consolidated user request and the captured image, pixel selection module 3620 may select the pixels that have been specifically requested by the user, and mark those pixels for transmission back to the server.

After the pixels to be kept are identified, the other pixels that are not to be kept are removed, e.g., decimated at unused pixel decimation module 3630. In an embodiment, these pixels are simply discarded, e.g., not stored in a long-term memory, that is removed to a digital trash 3617. In another embodiment, some or all of these pixels are stored in a local memory, e.g., local memory 3615. From here, these pixels may be transmitted to various locations at off-peak times, may be kept for image processing by the array local processing module 3600, or may be subject to other manipulations or processing separate from the user requests. In an embodiment, unused pixel decimation module may include or communicate with a lower resolution module 3514, which may, in some embodiments, be used to transmit a lower-resolution version of more of the image (e.g., an entire scene, or more of the field of view surrounding the target) to the server 4000, so that the server 4000 may accurately determine which images are required to capture the target selected by the user.

Referring again to FIG. 1-AJ, the selected pixels then may be transmitted to the server 4000 using selected pixel transmission module 3640. Selected pixel transmission module 3640 may include any transmission equipment necessary, e.g., cellular radio, wireless adapter, and the like, depending on the format of communication. In an embodiment, only those pixels which have been requested are transmitted to the server via lower-bandwidth communication 3510. Similarly to lower-bandwidth communication 3515, the lower-bandwidth communication 3510 does not refer to a specific amount of bandwidth, just that the amount of bandwidth is relatively lower than higher-bandwidth communication 3505.

It is noted that more pixels than what are specifically requested by the user may be transmitted, in certain embodiments. For example, the array local processing module 3600 may send pixels that border the user's requested area, but are outside the user's requested area. In an embodiment, as will be discussed herein, those pixels may be sent at a different resolution or using a different kind of compression. In another embodiment, the additional pixels may merely be sent the same as the requested pixels. In still another embodiment, server 4000 may expand the user requested areas, so that array local processing module 3600 may send only the requested pixels, but the requested pixels cover more area than what the user originally requested. These additional pixels may be transmitted and "cached" by the server or local device, which may be used to decrease latency times, in a process that will be discussed more herein.

Referring now again to FIG. 1-P, in an embodiment, server 4000 may include image receiving from ISA module 4340. Image receiving from ISA module 4340 may receive the image data from the array local processing module 3600 (e.g., in the arrow coming "north" from FIG. 1-AJ via FIG. 1-Z). The image may include the pixels that were requested from the image sensor array 3200. In an embodiment, server 4000 also may include received image post-processing module 4350, which may, among other post-processing tasks, fill in objects and pixels into the image that were determined not to be needed by selected image pre-processing module 4320, as previously described. In an embodiment, server 4000 may include received image transmission to user device module 4360, which may be configured to transmit the requested image to the user device 5700. Requested image transmission to user device module 4360 may include components necessary to communicate with user device 5700 and may, in some embodiments, share components with one or more other modules of server 4000, e.g., a network interface, or a wireless antenna.

Referring now again to FIG. 1-F, user device 5700 may include a server image reception module 5730. Server image reception module 5730 may receive an image sent by the server 4000, and user selection presenting module 5240, which may display the requested pixels to the user, e.g., by showing them on a screen of the device. In an embodiment, the display of the image may be carried out through the exemplary interface, which allows a cycle of user requests and new images to be shown as the user navigates through what is seen on the MUVIA, e.g., as shown in FIG. 1-F.

In an embodiment, as shown in FIGS. 1-F and 1-G, server image reception module 5730 may include an audio stream reception module 5732 and a video stream reception module 5734. In an embodiment, as discussed throughout this application, the MUVIA system may capture still images, video, and also sound, as well as other electromagnetic waves and other signals and data. In an embodiment, the audio signals and the video signals may be handled together, or they may be handled separately, as separate streams. Although not every module in the instant diagram separately shows audio streams and video streams, it is noted here that all implementations of MUVIA contemplate both audio and video coverage, as well as still image and other data collection.

Referring now to FIG. 1-G, which shows another portion of user device 5700, FIG. 1-G may include a display 5755 and a memory 5765, which may be used to facilitate presentation and/or storage of the received images.

FIGS. 1-H, 1-R, 1-AA, and 1-AB show an embodiment of a MUVIA implementation. For example, referring now to FIG. 1-H, FIG. 1-H shows an embodiment of a user device 5800. For exemplary purposes, the user device 5800 may be an augmented reality device that shows a user looking down a "street" at which the user is not actually present, e.g., a "virtual tourism" where the user may use their augmented reality device (e.g., googles, e.g., an Oculus Rift-type headgear device) which may be a wearable computer. It is noted that this embodiment is not limited to wearable computers or augmented reality, but as in all of the embodiments described in this disclosure, may be any device. The use of a wearable augmented/virtual reality device is merely used to for illustrative and exemplary purposes.

In an embodiment, user device 5800 may have a field of view 5810, as shown in FIG. 1-H. The field of view for the user 5810 may be illustrated in FIG. 1-H as follows. The most internal rectangle, shown by the dot hatching, represents the user's "field of view" as they look at their "virtual world." The second most internal rectangle, with the straight line hatching, represents the "nearest" objects to the user, that is, a range where the user is likely to "look" next, by turning their head or moving their eyes. In an embodiment, this area of the image may already be loaded on the device, e.g., through use of a particular codec, which will be discussed in more detail herein. The outermost rectangle, which is the image without hatching, represents further outside the user's viewpoint. This area, too, may already be loaded on the device. By loading areas where the user may eventually look, the system can reduce latency and make a user's motions, e.g., movement of head, eyes, and body, appear "natural" to the system.

Referring now to FIGS. 1-AA and 1-AB, these figures show an array local processing module 3700 that is connected to an image sensor array 3200 (e.g., as shown in FIG. 1-AK, and "viewing" a city as shown in FIG. 1-AJ). The image sensor array 3200 may operate as previously described in this document. In an embodiment, array local processing module 3700 may include a captured image receiving module 3710, which may receive the entire scene captured by the image sensor array 3200, through the higher-bandwidth communication channel 3505. As described previously in this application, these pixels may be "cropped" or "decimated" into the relevant portion of the captured image, as described by one or more of the user device 5800, the server 4000, and the processing done at the array local processing module 3700. This process may occur as previously described. The relevant pixels may be handled by relevant portion of captured image receiving module 3720.

Referring now to FIG. 1-AB, in an embodiment, the relevant pixels for the image that are processed by relevant portion of captured image receiving module 3720 may be encoded using a particular codec at relevant portion encoding module 3730. In an embodiment, the codec may be configured to encode the innermost rectangle, e.g., the portion that represents the current user's field of view, e.g., portion 3716, at a higher resolution, or a different compression, or a combination of both. The codec may be further configured to encode the second rectangle, e.g., with the vertical line hashing, e.g., portion 3714, at a different resolution and/or a different (e.g., a higher) compression. Similarly, the outermost portion of the image, e.g., the clear portion 3712, may again be coded at still another resolution and/or a different compression. In an embodiment, the codec itself handles the algorithm for encoding the image, and as such, in an embodiment, the codec may include information about user device 5800.

As shown in FIG. 1-AB, the encoded portion of the image, including portions 3716, 3714, and 3712, may be transmitted using encoded relevant portion transmitting module 3740. It is noted that "lower compression," "more compression," and "higher compression," are merely used as one example for the kind of processing done by the codec. For example, instead of lower compression, a different sampling algorithm or compacting algorithm may be used, or a lossier algorithm may be implemented for various parts of the encoded relevant portion.

Referring now to FIG. 1-R, FIG. 1-R depicts a server 4000 in a MUVIA system according to an embodiment. For example, as shown in FIG. 1-R, server 4000 may include, in addition to portions previously described, an encoded image receiving module 4410. Encoded image receiving module 4410 may receive the encoded image, encoded as previously described, from encoded relevant portion transmitting module 3740 of array local processing module 3700.

Referring again to FIG. 1-R, server 4000 may include an encoded image transmission controlling module 4420. Encoded image transmission controlling module 4420 may transmit portions of the image to the user device 5800. In an embodiment, at least partially depending on the bandwidth and the particulars of the user device 5800, the server may send all of the encoded image to the user device 5800, and let the user device 5800 decode the portions as needed, or may decode the image and send portions in piecemeal, or with a different encoding, depending on the needs of the user device 5800, and the complexity that can be handled by the user device 5800.

Referring again to FIG. 1-H, user device 5800 may include an encoded image transmission receiving module 5720, which may be configured to receive the image that is coded in a particular way, e.g., as will be disclosed in more detail herein. FIG. 1-H also may include an encoded image processing module 5830 that may handle the processing of the image, that is, encoding and decoding portions of the image, or other processing necessary to provide the image to the user.

Referring now to FIG. 1-AL, FIG. 1-AL shows an implementation of an Application Programming Interface (API) for the various MUVIA components. Specifically, image sensor array API 7800 may include, among other elements, a programming specification for ISA 7810, that may include, for example, libraries, classes, specifications, templates, or other coding elements that generally make up an API, and an access authentication module for ISA 7820 that governs API access to the various image sensor arrays. The API allows third party developers to access the workings of the image sensor array 3200 and the array local processing module 3700, so that the third party developers can write applications for the array local processing module 3700, as well as determine which data captured by the image sensor array 3200 (which often may be multiple gigabytes or more of data per second) should be kept or stored or transmitted. In an embodiment, API access to certain functions may be limited. For example, a tiered system may allow a certain number of API calls to the MUVIA data per second, per minute, per hour, or per day. In an embodiment, a third party might pay fees or perform a registration that would allow more or less access to the MUVIA data. In an embodiment, the third party could host their application on a separate web site, and let that web site access the image sensor array 3200 and/or the array local processing module 3700 directly.

Referring again to FIG. 1, FIGS. 1-I, 1-J, 1-S, 1-T, 1-AC, 1-AD, 1-AM, and 1-AN, in an embodiment, show a MUVIA implementation that allows insertion of advertising (or other context-sensitive material) into the images displayed to the user.

Referring again to FIG. 1-I, in an embodiment, user device 5900 may include a user selection accepting module 5910. User selection accepting module 5910 may be configured to receive user input about what the user wants to see. For example, as shown in FIG. 1-I, the user selection accepting module 5910 may show an image from image sensor array 3200, and the user may "pan" and "zoom" the image using any known interface, including, but not limited to, keyboard, mouse, touch, haptic, augmented reality interface, voice command, nonverbal motion commands (e.g., as part of a video game system interface, e.g., the Microsoft Kinect). It is noted, and as will be discussed in more detail herein, the camera itself is not "zooming" or "panning," because the camera does not move. What is happening is that different pixels that are captured by the image sensor array 3200 are kept by the image sensor array 3200 and transmitted to the server 4000.

In an embodiment, the "user selection" facilitated by the user selection accepting module 5910 may not involve a user at all. For example, in an embodiment, e.g., in a security embodiment, the user selection may be handled completely by machine, and may include "select any portion of the image with movement," or "select any portion of the image in which a person is recognized," or "select any portion of the image in which a particular person, e.g., a person on the FBI most wanted list" is recognized.

Referring again to FIG. 1-I, in an embodiment, user device 5900 may include a user selection transmitting module 5920. The user selection transmitting module 5920 may take the user selection from user selection transmitting module 5920, and transmit the selection to the server 4000. The transmission may include some pre-processing, for example, the user device 5900 may determine the size and parameters of the image prior to sending the request to the server 4000, or that processing may be handled by the server 4000. Following the thick-line arrow leftward from user selection transmitting module 5920 through to FIG. 1-K, the transmission goes to server 4000, as will be discussed herein. It is noted that the transmission to the server 4000 may also include data about the user device, for example, the screen resolution, the window size, the type of device, an identity of the user, a level of service the user has paid for (in embodiments in which such services are prioritized by the camera/server), other capabilities of the device, e.g., framerate, and the like.

Referring again to FIG. 1-I, FIG. 1-I also includes a selected image receiving module 5930 and a user selection presenting module 5940, which will be discussed in more detail herein, with respect to the dataflow of this embodiment.

Referring now to FIG. 1-T (graphically represented as "down" and "to the right" of FIG. 1-I), in an embodiment, a server 4000 may include a selected image reception module 4510. In an embodiment, selected image reception module 4510 of server 4000 may receive the selected target from the user device 5900. The selected target data may take various formats, e.g., it may be image data, it may be metadata that identifies the selected target, it may be some other designation, e.g., an ID number, a tracking number, or a piece of information, like a license plate or a social security number. The selected target data may be an address or a physical description, or any other instantiation of data that can be used to identify something.

Referring again to FIG. 1-T, in an embodiment, server 4000 may include selected image pre-processing module 4520. Selected image pre-processing module 4520 may perform one or more tasks of pre-processing the image, some of which have been previously described with respect to other embodiments. In an embodiment, server 4000 also may include pixel information transmission to ISA module 4330 configured to transmit the image request data to the image search array 3200, as has been previously described.

Referring now to FIGS. 1-AD and 1-AN, array local processing module 3700 may be connected to an image sensor array 3200 through a higher-bandwidth communication link 3505, e.g., a USB or PCI port. In an embodiment, image sensor array 3200 may include a request reception module 3710. Request reception module 3710 may receive the request for an image from the server 4000, as previously described. Request reception module 3710 may transmit the data to a pixel selection module 3720, which may receive the pixels captured from image sensor array 3200, and select the ones that are to be kept. That is, in an embodiment, through use of the (sometimes consolidated) user requests and the captured image, pixel selection module 3720 may select the pixels that have been specifically requested by the user, and mark those pixels for transmission back to the server.

After the pixels to be kept are identified, the other pixels that are not to be kept are removed, e.g., decimated at unused pixel decimation module 3730. In an embodiment, these pixels are simply discarded, e.g., not stored in a long-term memory, that is removed to a digital trash 3717. In another embodiment, some or all of these pixels are stored in a local memory, e.g., local memory 3715. From here, these pixels may be transmitted to various locations at off-peak times, may be kept for image processing by the array local processing module 3700, or may be subject to other manipulations or processing separate from the user requests, as described in previous embodiments. In an embodiment, unused pixel decimation module 3730 may be used to transmit a lower-resolution version of more of the image (e.g., an entire scene, or more of the field of view surrounding the target) to the server 4000, so that the server 4000 may accurately determine which images are required to fulfill the request of the user.

Referring again to FIG. 1-AN, the selected pixels then may be transmitted to the server 4000 using selected pixel transmission module 3740. Selected pixel transmission module 3740 may include any transmission equipment necessary, e.g., cellular radio, wireless adapter, and the like, depending on the format of communication. In an embodiment, only those pixels which have been requested are transmitted to the server via lower-bandwidth communication 3710. Similarly to lower-bandwidth communication 3715, the lower-bandwidth communication 3710 does not refer to a specific amount of bandwidth, just that the amount of bandwidth is relatively lower than higher-bandwidth communication 3505.

It is noted that more pixels than what are specifically requested by the user may be transmitted, in certain embodiments. For example, the array local processing module 3700 may send pixels that border the user's requested area, but are outside the user's requested area. In an embodiment, as will be discussed herein, those pixels may be sent at a different resolution or using a different kind of compression. In another embodiment, the additional pixels may merely be sent the same as the requested pixels. In still another embodiment, server 4000 may expand the user requested areas, so that array local processing module 3700 may send only the requested pixels, but the requested pixels cover more area than what the user originally requested. These additional pixels may be transmitted and "cached" by the server or local device, which may be used to decrease latency times, in a process that will be discussed more herein.

Referring now again to FIG. 1-T, in an embodiment, server 4000 may include received image post-processing module 4550. Received image post-processing module 4550 may receive the image data from the array local processing module 3700 (e.g., in the arrow coming "north" from FIG. 1-AN via FIG. 1-AD). The image may include the pixels that were requested from the image sensor array 3200.

In an embodiment, server 4000 also may include advertisement insertion module 4560. Advertisement insertion module 4560 may insert an advertisement into the received image. The advertisement may be based one or more of the contents of the image, a characteristic of a user or the user device, or a setting of the advertisement server component 7700 (see, e.g., FIG. 1-AC, as will be discussed in more detail herein). The advertisement insertion module 4560 may place the advertisement into the image using any known image combination techniques, or, in another embodiment, the advertisement image may be in a separate layer, overlay, or any other data structure. In an embodiment, advertisement insertion module 4560 may include context-based advertisement insertion module 4562, which may be configured to add advertisements that are based on the context of the image. For example, if the image is a live street view of a department store, the context of the image may show advertisements related to products sold by that department store, e.g., clothing, cosmetics, or power tools.

Referring again to FIG. 1-T, server 4000 may include a received image with advertisement transmission to user device module 4570 configured to transmit the image. Received image with advertisement transmission to user device module 4570 may include components necessary to communicate with user device 5900 and may, in some embodiments, share components with one or more other modules of server 4000, e.g., a network interface, or a wireless antenna.

Referring again to FIG. 1-I, user device 5900 may include a selected image receiving module 5930, which may receive the pixels that were sent by the server 4000, and user selection presenting module 5940, which may display the requested pixels to the user, including the advertisement, e.g., by showing them on a screen of the device. In an embodiment, the display of the image may be carried out through the exemplary interface, which allows a cycle of user requests and new images to be shown as the user navigates through what is seen on the MUVIA, e.g., as shown in FIG. 1-I.

Referring now to FIG. 1-AC, FIG. 1-AC shows an advertisement server component 7700 configured to deliver advertisements to the server 4000 for insertion into the images prior to delivery to the user. In an embodiment, advertisement server component 7700 may be integrated with server 4000. In another embodiment, advertisement server component may be separate from server 4000 and may communicate with server 4000. In yet another embodiment, rather than interacting with server 4000, advertisement server component 7700 may interact directly with the user device 5900, and insert the advertisement into the image after the image has been received, or, in another embodiment, cause the user device to display the advertisement concurrently with the image (e.g., overlapping or adjacent to). In such embodiments, some of the described modules of server 4000 may be incorporated into user device 5900, but the functionality of those modules would operate similarly to as previously described.

Referring again to FIG. 1-AC, in an embodiment, advertisement server component 7700 may include a user data collection module 7705. User data collection module 7705 may collect data from user device 5900, and use that data to drive placement of advertisements (e.g., based on a user's browser history, e.g., to sports sites, and the like).

Referring again to FIG. 1-AC, in an embodiment, advertisement server component 7700 may include advertisement database 7715 which includes advertisements that are ready to be inserted into images. In an embodiment, these advertisements may be created on the fly.

Referring again to FIG. 1-AC, in an embodiment, advertisement server component 7700 may include an advertisement request reception module 7710 which receives a request to add an advertisement into the drawing (the receipt of the request is not shown to ease understanding of the drawings). In an embodiment, advertisement server component 7700 may include advertisement selection module 7720, which may include an image analysis module 7722 configured to analyze the image to determine the best context-based advertisement to place into the image. In an embodiment, that decision may be made by the server 4000, or partly at the server 4000 and partly at the advertisement server component 7700 (e.g., the advertisement server component may have a set of advertisements from which a particular one may be chosen). In an embodiment, various third parties may compensate the operators of server component 7700, server 4000, or any other component of the system, in order to receive preferential treatment.

Referring again to FIG. 1-AC, in an embodiment, advertisement server component 7700 may include a selected advertisement transmission module 7730, which may transmit the selected advertisement (or a set of selected advertisements) to the server 4000. In an embodiment, selected advertisement transmission module 7730 may send the complete image with the advertisement overlaid, e.g., in an implementation in which the advertisement server component 7700 also handles the placement of the advertisement. In an embodiment in which advertisement server component 7700 is integrated with server 4000, this module may be an internal transmission module, as may all such transmission/reception modules.

Exemplary Environment 200

Referring now to FIG. 2A, FIG. 2A illustrates an example environment 200 in which methods, systems, circuitry, articles of manufacture, and computer program products and architecture, in accordance with various embodiments, may be implemented by at least one image device 220. Image device 220 may include a number of individual sensors that capture data. Although commonly referred to throughout this application as "image data," this is merely shorthand for data that can be collected by the sensors. Other data, including video data, audio data, electromagnetic spectrum data (e.g., infrared, ultraviolet, radio, microwave data), thermal data, and the like, may be collected by the sensors.

Referring again to FIG. 2A, in an embodiment, image device 220 may operate in an environment 200. Specifically, in an embodiment, image device 220 may capture a scene 215. The scene 215 may be captured by a number of sensors 243. Sensors 243 may be grouped in an array, which in this context means they may be grouped in any pattern, on any plane, but have a fixed position relative to one another. Sensors 243 may capture the image in parts, which may be stitched back together by processor 222. There may be overlap in the images captured by sensors 243 of scene 215, which may be removed.

Upon capture of the scene in image device 220, in processes and systems that will be described in more detail herein, the requested pixels are selected. Specifically, pixels that have been identified by a remote user, by a server, by the local device, by another device, by a program written by an outside user with an API, by a component or other hardware or software in communication with the image device, and the like, are transmitted to a remote location via a communications network 240. The pixels that are to be transmitted may be illustrated in FIG. 2A as selected portion 255, however this is a simplified expression meant for illustrative purposes only.

Referring again to FIG. 2A, in an embodiment, server device 230 may be any device or group of devices that is connected to a communication network. Although in some examples, server device 230 is distant from image device 220, that is not required. Server device 230 may be "remote" from image device 220, which may be that they are separate components, but does not necessarily imply a specific distance. The communications network 240 may be a local transmission component, e.g., a PCI bus. Server device 230 may include a request handling module 232 that handles requests for images from user devices, e.g., user device 250A and 250B. Request handling module 232 also may handle other remote computers and/or users that want to take active control of the image device 220, e.g., through an API, or through more direct control.

Server device 230 mlso may include an image device management module 234, which may perform some of the processing to determine which of the captured pixels of image device 220 are kept. For example, image device management module 234 may do some pattern recognition, e.g., to recognize objects of interest in the scene, e.g., a particular football stadium, as shown in the example of FIG. 2A. In other embodiments, this processing may be handled at the image device 220 or at the user device 250. In an embodiment, server device 230 limits a size of the selected portion 255 by a screen resolution of the requesting user device.

Server device 230 then may transmit the requested portions to the user devices, e.g., user device 250A and user device 250B. In another embodiment, the user device or devices may directly communicate with image device 220, cutting out server device 230 from the system.

In an embodiment, user device 250A and 250B are shown, however user devices may be any electronic device or combination of devices, which may be located together or spread across multiple devices and/or locations. Image device 220 may be a server device, or may be a user-level device, e.g., including, but not limited to, a cellular phone, a network phone, a smartphone, a tablet, a music player, a walkie-talkie, a radio, an augmented reality device (e.g., augmented reality glasses and/or headphones), wearable electronics, e.g., watches, belts, earphones, or "smart" clothing, earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like. User device 250 may include a viewfinder or a viewport that allows a user to "look" through the lens of image device 220, regardless of whether the user device 250 is spatially close to the image device 220.

Referring again to FIG. 2A, in various embodiments, the communication network 240 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 240 may be wired, wireless, or a combination of wired and wireless networks. It is noted that "communication network" as it is used in this application refers to one or more communication networks, which may or may not interact with each other.

Referring now to FIG. 2B, FIG. 2B shows a more detailed version of image device 220, according to an embodiment. The image device 220 may include a device memory 245. In an embodiment, device memory 245 may include memory, random access memory ("RAM"), read only memory ("ROM"), flash memory, hard drives, disk-based media, disc-based media, magnetic storage, optical storage, volatile memory, nonvolatile memory, and any combination thereof. In an embodiment, device memory 245 may be separated from the device, e.g., available on a different device on a network, or over the air. For example, in a networked system, there may be more than one image device 220 whose device memories 245 may be located at a central server that may be a few feet away or located across an ocean. In an embodiment, device memory 245 may include of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In an embodiment, memory 245 may be located at a single network site. In an embodiment, memory 245 may be located at multiple network sites, including sites that are distant from each other.

Referring again to FIG. 2B, in an embodiment, image device 220 may include one or more image sensors 243 and may communicate with a communication network 240. Although sensors 243 are referred to as "image" sensors, this is merely shorthand for sensors that collect data, including image data, video data, sound data, electromagnetic spectrum data, and other data. The image sensors 243 may be in an array, which merely means that the image sensors 243 may have a specific location relative to each other.

Referring again to FIG. 2B, FIG. 2B shows a more detailed description of image device 220. In an embodiment, device 220 may include a processor 222. Processor 222 may include one or more microprocessors, Central Processing Units ("CPU"), a Graphics Processing Units ("GPU"), Physics Processing Units, Digital Signal Processors, Network Processors, Floating Point Processors, and the like. In an embodiment, processor 222 may be a server. In an embodiment, processor 222 may be a distributed-core processor. Although processor 222 is as a single processor that is part of a single device 220, processor 222 may be multiple processors distributed over one or many devices 220, which may or may not be configured to operate together.

Processor 222 is illustrated as being configured to execute computer readable instructions in order to execute one or more operations described above, and as illustrated in FIG. 10, FIGS. 11A-11F, FIGS. 12A-12C, FIGS. 13A-13D, and FIGS. 14A-14D. In an embodiment, processor 222 is designed to be configured to operate as processing module 251, which may include one or more of a multiple image sensor based scene capturing module 252 configured to capture a scene that includes one or more images, through use of more than one image sensor, a scene particular portion selecting module 254 configured to select a particular portion of the scene that includes at least one image, wherein the selected particular portion is smaller than the scene, a selected particular portion transmitting module 256 configured to transmit the selected particular portion from the scene to a remote location, and a scene pixel de-emphasizing module 258 configured to de-emphasize pixels from the scene that are not part of the selected particular portion of the scene.

Exemplary Environment 300

Referring now to FIG. 3, FIG. 3 shows an exemplary embodiment of an image device, e.g., image device 220A operating in an environment 300. In an embodiment, image device 220A may include an array 310 of image sensors 312 as shown in FIG. 3. The array of image sensors in this image is shown in a rectangular grid, however this is merely exemplary to show that image sensors 312 may be arranged in any format. In an embodiment, each image sensor 312 may capture a portion of scene 315, which portions are then processed by processor 350. Although processor 350 is shown as local to image device 220A, it may be remote to image device 220A, with a sufficiently high-bandwidth connection to receive all of the data from the array of image sensors 310 (e.g., multiple USB 3.0 lines). In an embodiment, the selected portions from the scene (e.g., the portions shown in the shaded box, e.g., selected portion 315), may be transmitted to a remote device 330, which may be a user device or a server device, as previously described. In an embodiment, the pixels that are not transmitted to remote device 330 may be stored in a local memory 340 or discarded.

Exemplary Environment 400

Referring now to FIG. 4, FIG. 4 shows an exemplary embodiment of an image device, e.g., image device 420 operating in an environment 400. In an embodiment, image device 420 may include an image sensor array 420, e.g., an array of image sensors, which, in this example, are arranged around a polygon to increase the field of view that can be captured, that is, they can capture scene 415, illustrated in FIG. 4 as a natural landmark that can be viewed in a virtual tourism setting. Processor 422 receives the scene 415 and selects the pixels from the scene 415 that have been requested by a user, e.g., requested portions 417. Requested portions 417 may include an overlapping area 424 that is only transmitted once. In an embodiment, the requested portions 417 may be transmitted to a remote location via communications network 240.

Exemplary Environment 500

Referring now to FIG. 5, FIG. 5 shows an exemplary embodiment of an image device, e.g., image device 520 operating in an environment 500. In an embodiment, image device 520 may capture a scene, of which a part of the scene, e.g., scene portion 515, as previously described in other embodiments (e.g., some parts of image device 520 are omitted for simplicity of drawing). In an embodiment, e.g., scene portion 515 may show a street-level view of a busy road, e.g., for a virtual tourism or virtual reality simulator. In an embodiment, different portions of the scene portion 515 may be transmitted at different resolutions or at different times. For example, in an embodiment, a central part of the scene portion 515, e.g., portion 516, which may correspond to what a user's eyes would see, is transmitted at a first resolution, or "full" resolution relative to what the user's device can handle. In an embodiment, an outer border outside portion 516, e.g., portion 514, may be transmitted at a second resolution, which may be lower, e.g., lower than the first resolution. In another embodiment, a further outside portion, e.g., portion 512, may be discarded, transmitted at a still lower rate, or transmitted asynchronously.

Exemplary Embodiments of the Various Modules of Portions of Processor 250

FIGS. 6-9 illustrate exemplary embodiments of the various modules that form portions of processor 250. In an embodiment, the modules represent hardware, either that is hard-coded, e.g., as in an application-specific integrated circuit ("ASIC") or that is physically reconfigured through gate activation described by computer instructions, e.g., as in a central processing unit.

Referring now to FIG. 6, FIG. 6 illustrates an exemplary implementation of the multiple image sensor based scene capturing module 252. As illustrated in FIG. 6, the multiple image sensor based scene capturing module may include one or more sub-logic modules in various alternative implementations and embodiments. For example, as shown in FIG. 6, e.g., FIG. 6A, in an embodiment, module 252 may include one or more of multiple image sensor based scene that includes the one or more images capturing through use of an array of image sensors module 602, multiple image sensor based scene that includes the one or more images capturing through use of two image sensors arranged side by side and angled toward each other module 604, multiple image sensor based scene that includes the one or more images capturing through use of image sensors aligned in a grid pattern module 606, and multiple image sensor based scene that includes the one or more images capturing through use of image sensors aligned in a line pattern module 608. In an embodiment, module 608 may include one or more of multiple image sensor based scene that includes the one or more images capturing through use of image sensors aligned in a line such that a field of view is greater than 120 degrees module 610 and multiple image sensor based scene that includes the one or more images capturing through use of image sensors aligned in a line such that a field of view is 180 degrees module 612.

Referring again to FIG. 6, e.g., FIG. 6B, as described above, in an embodiment, module 252 may include one or more of multiple image sensor based scene that includes the one or more images capturing through use of more than one stationary image sensor module 614, multiple image sensor based scene that includes the one or more images capturing through use of more than one static image sensor module 616, multiple image sensor based scene that includes the one or more images capturing through use of more than one image sensor mounted in a fixed location module 620, and multiple image sensor based scene that includes the one or more images capturing through use of more than one image sensor mounted on a movable platform module 622. In an embodiment, module 616 may include multiple image sensor based scene that includes the one or more images capturing through use of more than one static image sensor that has a fixed focal length and a fixed field of view module 618. In an embodiment, module 622 may include multiple image sensor based scene that includes the one or more images capturing through use of more than one image sensor mounted on an unmanned aerial vehicle module 624.

Referring again to FIG. 6, e.g., FIG. 6C, in an embodiment, module 252 may include one or more of multiple image sensor based scene capturing module configured to capture a scene that includes one or more images, through use of more than one image sensor 626, multiple image sensor based scene capturing module configured to capture a scene that includes one or more images that represent portions of the scene, through use of more than one image sensor 628, particular image from each image sensor acquiring module 632, and acquired particular image from each image sensor combining into the scene module 634. In an embodiment, module 628 may include multiple image sensor based scene capturing module configured to capture a scene that includes one or more images that represent portions of the sene that are configured to be stitched together, through use or more than one image sensor module 630. In an embodiment, module 632 may include particular image with at least partial other image overlap from each image sensor acquiring module 636. In an embodiment, module 636 may include particular image with at least partial adjacent image overlap from each image sensor acquiring module 638.

Referring again to FIG. 6, e.g., FIG. 6D, in an embodiment, module 252 may include one or more of multiple image sensor based scene that is larger than a bandwidth for remote transmission of the scene capturing through use of more than one image sensor module 640, multiple image sensor based scene of a tourist destination capturing through use of more than one image sensor module 646, multiple image sensor based scene of a highway bridge capturing through use of more than one image sensor module 648, and multiple image sensor based scene of a home interior capturing through use of more than one image sensor module 650. In an embodiment, module 640 may include multiple image sensor based scene that contains more image data than a bandwidth for remote transmission of the scene capturing through use of more than one image sensor module 642. In an embodiment, module 642 may include multiple image sensor based scene that contains more image data than a bandwidth for remote transmission of the scene by a factor of ten capturing through use of more than one image sensor module 644.

Referring again to FIG. 6, e.g., FIG. 6E, in an embodiment, module 252 may include one or more of multiple image sensor based scene that includes the one or more images capturing through use of a grouping of image sensors module 652, multiple image sensor based scene that includes the one or more images capturing through use of a grouping of image sensors that direct image data to a common collector module 654, and multiple image sensor based scene that includes the one or more images capturing through use of a grouping of image sensors that include charge-coupled devices and complementary metal-oxide-semiconductor devices module 656.

Figure 6F:
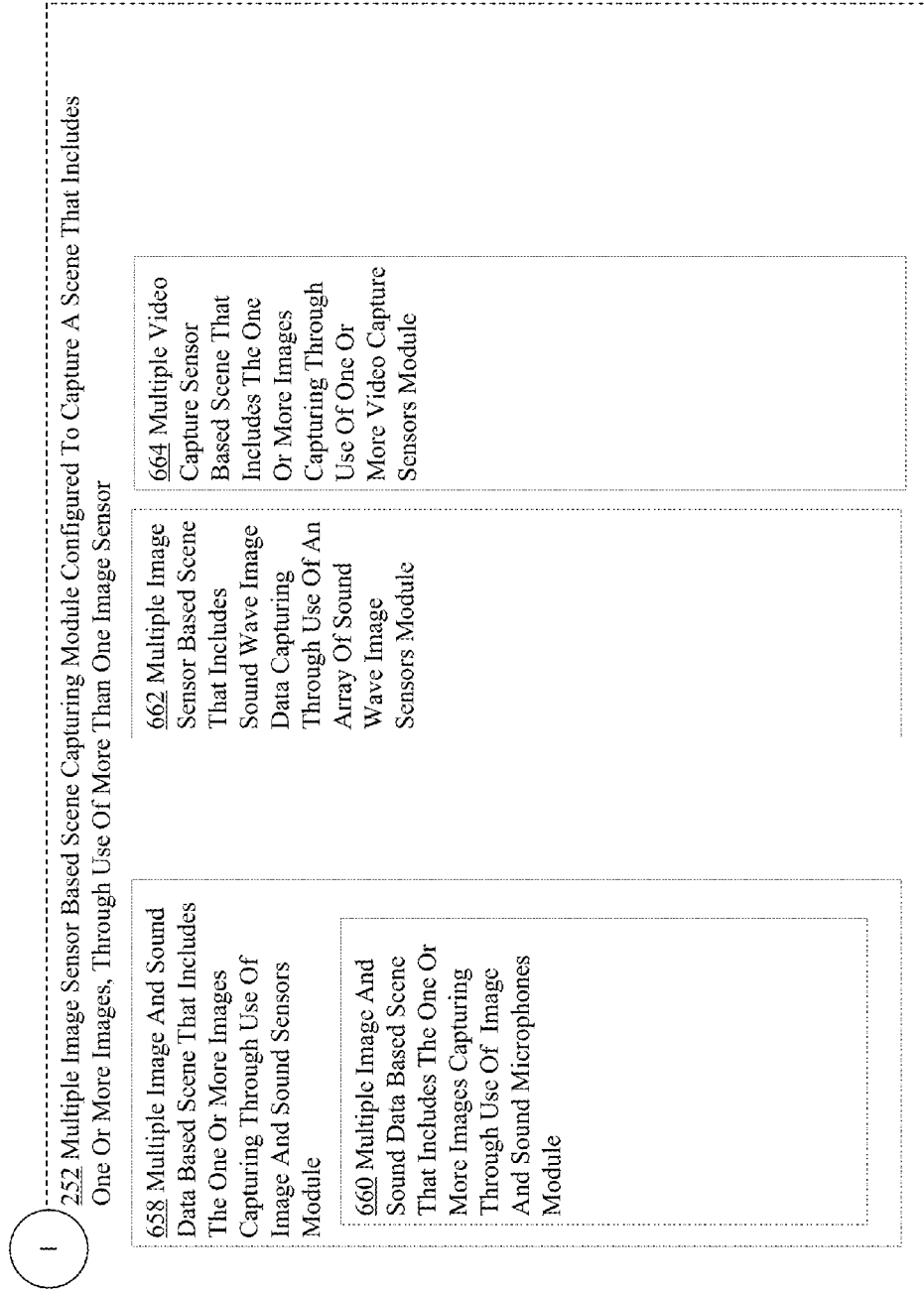

Referring again to FIG. 6, e.g., FIG. 6F, in an embodiment, module 252 may include one or more of multiple image and sound data based scene that includes the one or more images capturing through use of image and sound sensors module 658, multiple image sensor based scene that includes sound wave image data capturing through use of an array of sound wave image sensors module 662, and multiple video capture sensor based scene that includes the one or more images capturing through use of one or more video capture sensors module 664. In an embodiment, module 658 may include multiple image and sound data based scene that includes the one or more images capturing through use of image and sound microphones module 660.

Referring now to FIG. 7, FIG. 7 illustrates an exemplary implementation of scene particular portion selecting module 254. As illustrated in FIG. 7, the scene particular portion selecting module 254 may include one or more sub-logic modules in various alternative implementations and embodiments. For example, as shown in FIG. 7, e.g., FIG. 7A, in an embodiment, module 254 may include one or more of scene particular portion that is smaller than the scene and that includes at least one image selecting module 702, scene particular portion that is smaller than the scene and that includes at least one requested image selecting module 706, particular image request receiving module 710, and received request for particular image selecting from scene module 712. In an embodiment, module 702 may include scene particular portion that is smaller than the scene and that includes at least one remote user-requested image selecting module 704. In an embodiment, module 706 may include scene particular portion that is smaller than the scene and that includes at least one remote-operator requested image selecting module 708.

Referring again to FIG. 7, e.g., FIG. 7B, in an embodiment, module 254 may include one or more of first request for a first particular image and second request for a second particular image receiving module 714 and scene particular portion that is first particular image and second particular image selecting module 716. In an embodiment, module 714 may include one or more of first request for a first particular image and second request for a second particular image that does not overlap the first particular image receiving module 718 and first request for a first particular image and second request for a second particular image that overlaps the first particular image receiving module 720. In an embodiment, module 720 may include first request for a first particular image and second request for a second particular image that overlaps the first particular image and an overlapping portion is configured to be transmitted once only receiving module 722.

Referring again to FIG. 7, e.g., FIG. 7C, in an embodiment, module 254 may include scene particular portion that is smaller than the scene and that contains a particular image object selecting module 724. In an embodiment, module 724 may include one or more of scene particular portion that is smaller than the scene and that contains a particular image object that is a person selecting module 726 and scene particular portion that is smaller than the scene and that contains a particular image object that is a vehicle selecting module 728. In an embodiment, module 254 may include scene particular portion that is smaller than the scene and is size-defined by a characteristic of a requesting device selecting module 730. In an embodiment, module 730 may include one or more of scene particular portion that is smaller than the scene and is size-defined by a screen resolution of a requesting device selecting module 732 and scene particular portion that is smaller than the scene and is size-defined by a combined screen size of at least one requesting device selecting module 734.

Referring now to FIG. 8, FIG. 8 illustrates an exemplary implementation of selected particular portion transmitting module 256. As illustrated in FIG. 8A, the selected particular portion transmitting module 256 may include one or more sub-logic modules in various alternative implementations and embodiments. For example, as shown in FIG. 8, e.g., FIG. 8A, in an embodiment, module 256 may include selected particular portion transmitting to a remote server module 802. In an embodiment, module 802 may include one or more of selected particular portion transmitting to a remote server configured to receive particular image requests module 804 and selected particular portion transmitting to a remote server that requested a particular image module 808. In an embodiment, module 804 may include selected particular portion transmitting to a remote server configured to receive particular discrete image requests module 806.

Referring again to FIG. 8, e.g., FIG. 8B, in an embodiment, module 256 may include selected particular portion transmitting at a particular resolution module 810. In an embodiment, module 810 may include one or more of available bandwidth to remote location determining module 812, selected particular portion transmitting at a particular resolution based on determined available bandwidth module 814, selected particular portion transmitting at a particular resolution less than a scene resolution module 816, and selected particular portion transmitting at a particular resolution less than a captured particular portion resolution module 818.

Referring again to FIG. 8, e.g., FIG. 8C, in an embodiment, module 256 may include one or more of first segment of selected particular portion transmitting at a first resolution module 820 and second segment of selected particular portion transmitting at a second resolution module 822. In an embodiment, module 820 may include one or more of first segment of selected particular portion that surrounds the second segment transmitting at a first resolution module 823, first segment of selected particular portion that borders the second segment transmitting at a first resolution module 824, and first segment of selected particular portion that is determined by selected particular portion content transmitting at a first resolution module 826. In an embodiment, module 826 may include first segment of selected particular portion that is determined as not containing an item of interest transmitting at a first resolution module 828. In an embodiment, module 828 may include one or more of first segment of selected particular portion that is determined as not containing a person of interest transmitting at a first resolution module 830 and first segment of selected particular portion that is determined as not containing an object designated for tracking transmitting at a first resolution module 832. In an embodiment, module 822 may include one or more of second segment that is a user-selected area of selected particular portion transmitting at a second resolution that is higher than the first resolution module 834 and second segment that is surrounded by the first segment transmitting at a second resolution that is higher than the first resolution module 836.

Referring again to FIG. 8, e.g., FIG. 8D, in an embodiment, module 256 may include modules 820 and 822, as previously described. In an embodiment, module 822 may include second segment of selected particular portion that contains an object of interest transmitting at the second resolution module 838. In an embodiment, module 838 may include one or more of second segment of selected particular portion that contains an object of interest that is a football player transmitting at the second resolution module 840, second segment of selected particular portion that contains an object of interest that is a landmark transmitting at the second resolution module 842, second segment of selected particular portion that contains an object of interest that is an animal transmitting at the second resolution module 844, and second segment of selected particular portion that contains an object of interest that is a selected object in a dwelling transmitting at the second resolution module 846.

Referring now to FIG. 9, FIG. 9 illustrates an exemplary implementation of scene pixel de-emphasizing module 258. As illustrated in FIG. 9A, the scene pixel de-emphasizing module 258 may include one or more sub-logic modules in various alternative implementations and embodiments. For example, as shown in FIG. 9, e.g., FIG. 9A, in an embodiment, module 258 may include one or more of scene pixel nonselected nontransmitting module 902, scene pixel exclusive pixels selected from the particular portion transmitting to a particular device module 904, and scene nonselected pixel deleting module 910. In an embodiment, module 904 may include one or more of scene pixel exclusive pixels selected from the particular portion transmitting to a particular device that requested the particular portion module 906 and scene pixel exclusive pixels selected from the particular portion transmitting to a particular device user that requested the particular portion module 908.

Referring again to FIG. 9, e.g., FIG. 9B, in an embodiment, module 258 may include one or more of scene nonselected pixels indicating as nontransmitted module 912, scene nonselected pixels discarding module 916, and scene nonselected retention preventing module 918. In an embodiment, module 912 may include scene nonselected pixels appending data that indicates nontransmission module 914.

Figure 9C:
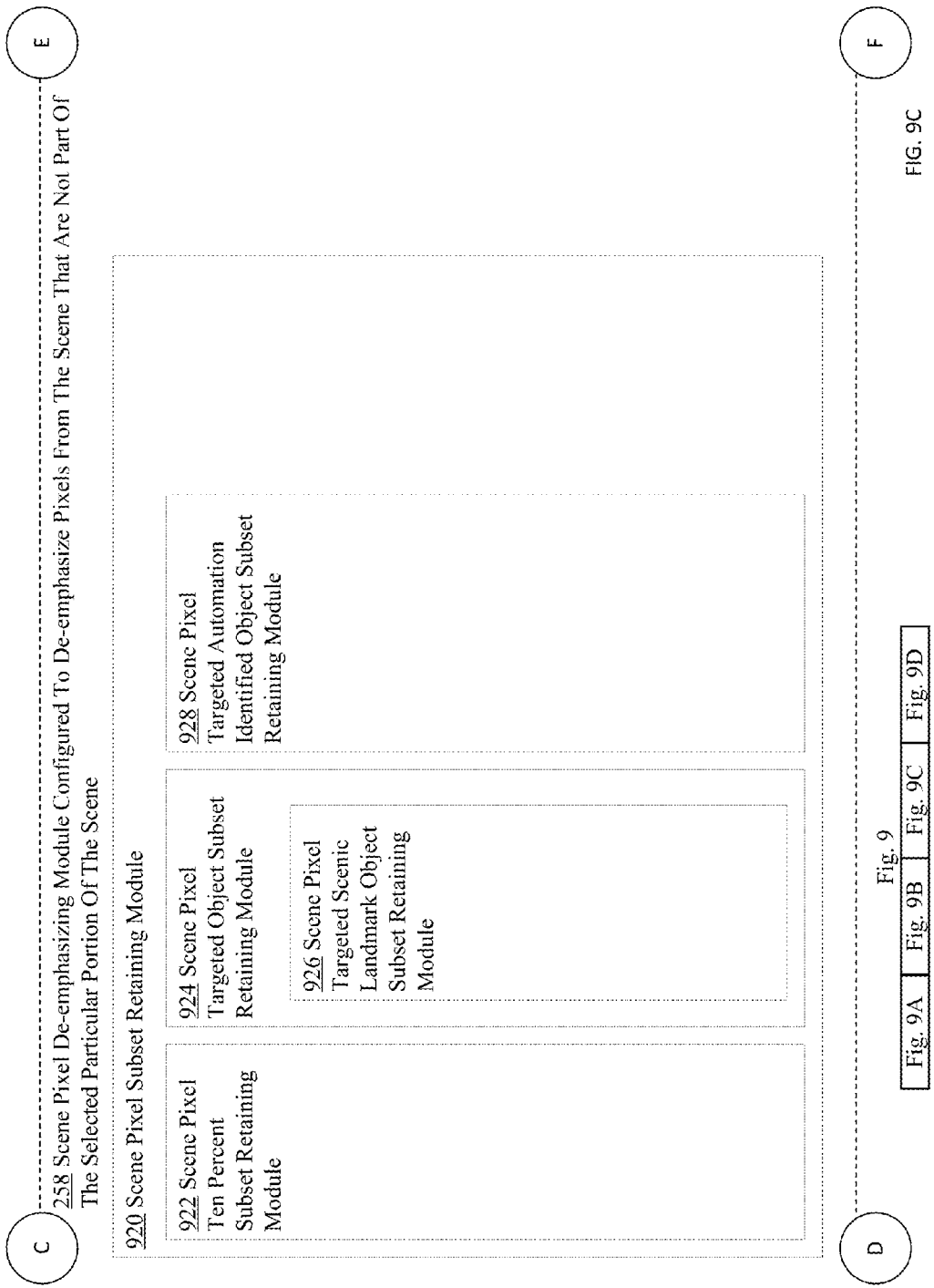

Referring again to FIG. 9, e.g., FIG. 9C, in an embodiment, module 258 may include scene pixel subset retaining module 920. In an embodiment, module 920 may include one or more of scene pixel ten percent subset retaining module 922, scene pixel targeted object subset retaining module 924, and scene pixel targeted automation identified object subset retaining module 928. In an embodiment, module 924 may include scene pixel targeted scenic landmark object subset retaining module 926.

Figure 9D:
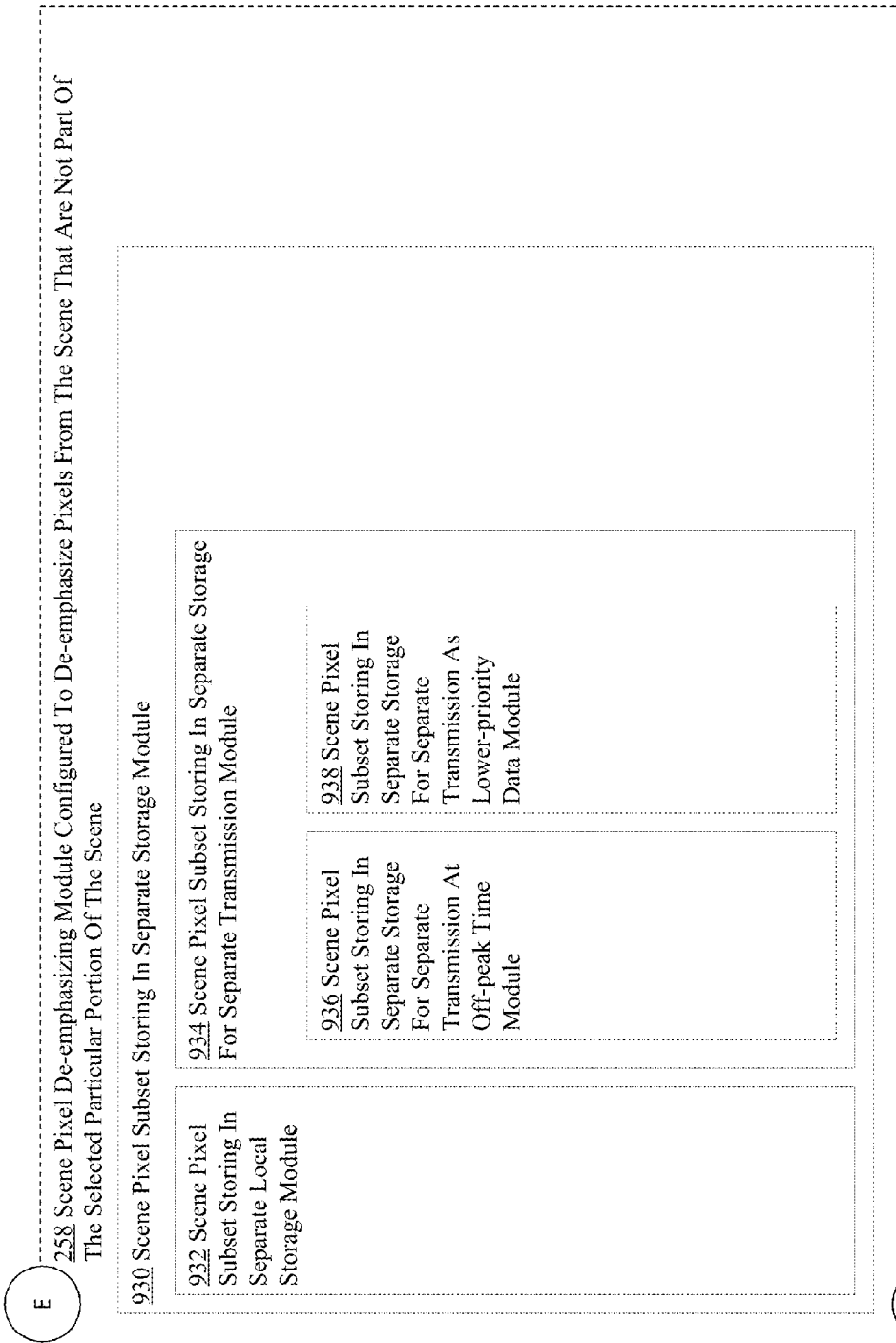

Referring again to FIG. 9, e.g., FIG. 9D, in an embodiment, module 258 may include scene pixel subset storing in separate storage module 930. In an embodiment, module 930 may include scene pixel subset storing in separate local storage module 932 and scene pixel subset storing in separate storage for separate transmission module 934. In an embodiment, module 934 may include one or more of scene pixel subset storing in separate storage for separate transmission at off-peak time module 936 and scene pixel subset storing in separate storage for separate transmission as lower-priority data module 938.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Exemplary Operational Implementation of Processor 250 and Exemplary Variants Further, in FIG. 10 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 10 as well as the other operations to be described herein may be performed by at least one of a machine, an article of manufacture, or a composition of matter.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

Referring now to FIG. 10, FIG. 10 shows operation 1000, e.g., an example operation of message processing device 230 operating in an environment 200. In an embodiment, operation 1000 may include operation 1002 depicting capturing a scene that includes one or more images, through use of an array of more than one image sensor. For example, FIG. 6, e.g., FIG. 6B, shows multiple image sensor based scene capturing module 252 capturing (e.g., collecting data, that includes visual data, e.g., pixel data, sound data, electromagnetic data, nonvisible spectrum data, and the like) that includes one or more images (e.g., graphical representations of things, e.g., that are composed of pixels or other electronic data, or that are captured by an image sensor, e.g., a CCM or a CMOS sensor), through use of an array (e.g., any grouping configured to work together in unison, regardless of arrangement, symmetry, or appearance) of more than one image sensor (e.g., a device, component, or collection of components configured to collect light, sound, or other electromagnetic spectrum data, and/or to convert the collected into digital data, or perform at least a portion of the foregoing actions).

Referring again to FIG. 10, operation 1000 may include operation 1004 depicting selecting a particular portion of the scene that includes at least one image, wherein the selected particular portion is smaller than the scene. For example, FIG. 2, e.g., FIG. 2B, shows scene particular portion selecting module 254 selecting (e.g., whether actively or passively, choosing, flagging, designating, denoting, signifying, marking for, taking some action with regard to, changing a setting in a database, creating a pointer to, storing in a particular memory or part/address of a memory, etc.) a particular portion (e.g., some subset of the entire scene that includes some pixel data, whether pre- or post-processing, which may or may not include data from multiple of the array of more than one image sensor) of the scene (e.g., the data, e.g., image data or otherwise (e.g., sound, electromagnetic), captured by the array of more than one image sensor, combined or stitched together, at any stage of processing, pre, or post), that includes at least one image (e.g., a portion of pixel or other data that is related temporally or spatially (e.g., contiguous or partly contiguous), wherein the selected particular portion is smaller (e.g., some objectively measurable feature has a lower value, e.g., size, resolution, color, color depth, pixel data granularity, number of colors, hue, saturation, alpha value, shading) than the scene scene (e.g., the data, e.g., image data or otherwise (e.g., sound, electromagnetic), captured by the array of more than one image sensor, combined or stitched together, at any stage of processing, pre, or post)).

Referring again to FIG. 10, operation 1000 may include operation 1006 depicting transmitting only the selected particular portion from the scene to a remote location. For example, FIG. 2 e.g., FIG. 2B shows selected particular portion transmitting module 256 transmitting only (e.g., not transmitting the parts of the scene that are not part of the selected particular portion) the selected particular portion (e.g., the designated pixel data) from the scene (e.g., the data, e.g., image data or otherwise (e.g., sound, electromagnetic), captured by the array of more than one image sensor, combined or stitched together, at any stage of processing, pre, or post) to a remote location (e.g., a device or other component that is separate from the image device, "remote" here not necessarily implying or excluding any particular distance, e.g., the remote device may be a server device, some combination of cloud devices, an individual user device, or some combination of devices).

Referring again to FIG. 10, operation 1000 may include operation 1008 depicting de-emphasizing pixels from the scene that are not part of the selected particular portion of the scene. For example, FIG. 2, e.g., FIG. 2B, shows scene pixel de-emphasizing module 258 de-emphasizing (e.g., whether actively or passively, taking some action to separate pixels from the scene that are not part of the selected particular portion, including deleting, marking for deletion, storing in a separate location or memory address, flagging, moving, or, in an embodiment, simply not saving the pixels in an area in which they can be readily retained.

FIGS. 11A-11F depict various implementations of operation 1002, depicting capturing a scene that includes one or more images, through use of an array of more than one image sensor according to embodiments. Referring now to FIG. 11A, operation 1002 may include operation 1102 depicting capturing the scene that includes the one or more images, through use of an array of image sensors. For example, FIG. 6, e.g., FIG. 6A shows multiple image sensor based scene that includes the one or more images capturing through use of an array of image sensors module 402 capturing the scene that includes the one or more images, through use of an array of image sensors (e.g., one hundred three-megapixel image sensors attached to a metal plate and arranged in a consistent pattern).

FIGS. 11A-11E depict various implementations of operation 1002, depicting capturing a scene that includes one or more images, through use of an array of more than one image sensor according to embodiments. Referring now to FIG. 11A, operation 1002 may include operation 1102 depicting capturing the scene that includes the one or more images, through use of an array of image sensors. For example, FIG. 6, e.g., FIG. 6A shows multiple image sensor based scene that includes the one or more images capturing through use of an array of image sensors module 402 capturing the scene (e.g., a live street view of a busy intersection in Alexandria, Va.) that includes the one or more images (e.g., images of cars passing by in the live street view, images of shops on the intersection, images of people in the crosswalk, images of trees growing on the side, images of a particular person that has been designated for watching).

Referring again to FIG. 11A, operation 1002 may include operation 1104 depicting capturing the scene that includes the one or more images, through use of two image sensors arranged side by side and angled toward each other. For example, FIG. 6, e.g., FIG. 6A, shows multiple image sensor based scene that includes the one or more images capturing through use of two image sensors arranged side by side and angled toward each other module 604 capturing the scene (e.g., a virtual tourism scene, e.g., a camera array pointed at the Great Pyramids) that includes the one or more images (e.g., images that have been selected by users that are using the virtual tourism scene, e.g., to view the pyramid entrance or the top vents in the pyramid) through use of two image sensors (e.g., two digital cameras with a 100 megapixel rating) arranged side by side (e.g., in a line, when viewed from a particular perspective) and angled toward each other (e.g., the digital cameras are pointed toward each other).

Referring again to FIG. 11A, operation 1002 may include operation 1106 depicting capturing the scene that includes the one or more images, through use of the array of image sensors arranged in a grid. For example, FIG. 6, e.g., FIG. 6A, shows multiple image sensor based scene that includes the one or more images capturing through use of image sensors aligned in a grid pattern module 606 capturing the scene (e.g., a football stadium area) that includes the one or more images (e.g., images of the field, images of a person in the crowd, images of a specific football player), through use of the array of image sensors (e.g., one hundred image sensors) arranged in a grid (e.g., the image sensors are attached to a rigid object and formed in a 10×10 grid pattern).

Referring again to FIG. 11A, operation 1002 may include operation 1108 depicting capturing the scene that includes the one or more images, through use of the array of image sensors arranged in a line. For example, FIG. 6, e.g., FIG. 6A, shows multiple image sensor based scene that includes the one or more images capturing through use of image sensors aligned in a line pattern module 608 capturing the scene (e.g., a checkout line at a grocery) that includes the one or more images (e.g., images of the shoppers and the items in the shoppers' carts.

Referring again to FIG. 11A, operation 1108 may include operation 1110 depicting capturing the scene that includes the one or more images, through use of the array of image sensors arranged in a line such that a field of view is greater than 120 degrees. For example, FIG. 6, e.g., FIG. 6A, shows multiple image sensor based scene that includes the one or more images capturing through use of image sensors aligned in a line such that a field of view is greater than 120 degrees module 610 capturing the scene (e.g., a highway bridge) that includes the one or more images (e.g., automatically tracked images of the license plates of every car that crosses the highway bridge), through use of the array of image sensors arranged in a line such that a field of view (e.g., the viewable area of the camera array) is greater than 120 degrees.

Referring again to FIG. 11A, operation 1108 may include operation 1112 depicting capturing the scene that includes the one or more images, through use of the array of image sensors arranged in a line such that a field of view is 180 degrees. For example, FIG. 6, e.g., FIG. 6A, shows multiple image sensor based scene that includes the one or more images capturing through use of image sensors aligned in a line such that a field of view is 180 degrees module 612 capturing the scene (e.g., a room of a home) that includes the one or more images (e.g., images of the appliances in the home and recordation of when those appliances are used, e.g., when a refrigerator door is opened, when a microwave is used, when a load of laundry is placed into a washing machine) arranged in a line such that a field of view is 180 degrees.

Referring now to FIG. 11B, operation 1002 may include operation 1114 depicting capturing the scene that includes one or more images, through use of an array of more than one stationary image sensor. For example, FIG. 6, e.g., FIG. 6B, shows multiple image sensor based scene that includes the one or more images capturing through use of more than one stationary image sensor module 614 capturing the scene (e.g., a warehouse that is a target for break-ins) that includes one or more images (e.g., images of each person that walks past the warehouse), through use of an array of more than one stationary image sensor (e.g., the image sensor does not move independently of the other image sensors).

Referring again to FIG. 11B, operation 1002 may include operation 1116 depicting capturing the scene that includes one or more images, through use of an array of more than one static image sensor. For example, FIG. 6, e.g., FIG. 6B, shows multiple image sensor based scene that includes the one or more images capturing through use of more than one static image sensor module 616 capturing the scene (e.g., a virtual tourism scene of a waterfall and lake) that includes one or more images (e.g., images of the waterfall and of the animals that collect there), through use of an array of more than one static image sensor (e.g., an image sensor that does not change its position, zoom, or pan).

Referring again to FIG. 11B, operation 1116 may include operation 1118 depicting capturing the scene that includes one or more images, through use of the array of more than one image sensor that has a fixed focal length and a fixed field of view. For example, FIG. 6, e.g., FIG. 6B, shows multiple image sensor based scene that includes the one or more images capturing through use of more than one static image sensor that has a fixed focal length and a fixed field of view module 618 capturing the scene (e.g., a virtual tourism scene of a mountain trail) that includes one or more images, through use of the array of more than one image sensor that has a fixed focal length and a fixed field of view.

Referring again to FIG. 11B, operation 1002 may include operation 1120 depicting capturing the scene that includes the one or more images, through use of an array of more than one image sensor mounted in a stationary location. For example, FIG. 6, e.g., FIG. 6B, shows multiple image sensor based scene that includes the one or more images capturing through use of more than one image sensor mounted in a fixed location module 620 capturing the scene (e.g., a juvenile soccer field) that includes the one or more images (e.g., images of each player on the youth soccer team), through use of an array of more than one image sensor mounted in a stationary location (e.g., on a pole, or on the side of a building our structure).

Referring again to FIG. 11B, operation 1002 may include operation 1122 depicting capturing the scene that includes one or more images, through use of an array of image sensors mounted on a movable platform. For example, FIG. 6, e.g., FIG. 6B, shows multiple image sensor based scene that includes the one or more images capturing through use of more than one image sensor mounted on a movable platform module 622 capturing the scene (e.g., a line of people leaving a warehouse-type store with a set of items that has to be compared against a receipt) that includes one or more images (e.g., images of the person's receipt that is visible in the cart, and images of the items in the cart, through use of an array of image sensors mounted on a movable platform (e.g., like a rotating camera, or on a drone, or on a remote controlled vehicle, or simply on a portable stand that can be picked up and set down).

Referring again to FIG. 11B, operation 1122 may include operation 1124 depicting capturing the scene that includes one or more images, through use of an array of image sensors mounted on an unmanned aerial vehicle. For example, FIG. 6, e.g., FIG. 6B, shows multiple image sensor based scene that includes the one or more images capturing through use of more than one image sensor mounted on an unmanned aerial vehicle module 624 capturing the scene (e.g., a view of a campsite where soldiers are gathered) that includes one or more images (e.g., images of the soldiers and their equipment caches), through use of an array of image sensors mounted on an unmanned aerial vehicle (e.g., a drone).

Referring now to FIG. 11C, operation 1002 may include operation 1126 depicting capturing the scene that includes one or more images, through use of an array of image sensors mounted on a satellite. For example, FIG. 6, e.g., FIG. 6C, shows multiple image sensor based scene that includes the one or more images capturing through use of more than one image sensor mounted on a satellite module 626 capturing the scene (e.g., a live street view inside the city of Seattle, Wash.) that includes one or more images, through use of an array of image sensors mounted on a satellite.

Referring again to FIG. 11C, operation 1002 may include operation 1128 depicting capturing the scene that includes one or more images, through use of an array of more than one image sensor, wherein the more than one image sensors each capture an image that represents a portion of the scene. For example, FIG. 6, e.g., FIG. 6C, shows multiple image sensor based scene capturing module configured to capture a scene that includes one or more images that represent portions of the scene, through use of more than one image sensor 628 capturing the scene that includes one or more images, through use of an array of more than one image sensor, wherein the more than one image sensors (e.g., two megapixel CCM sensors) each capture an image that represents a portion of the scene (e.g., a live street view of a parade downtown).

Referring again to FIG. 11C, operation 1128 may include operation 1130 depicting capturing the scene that includes one or more images, through use of the array of more than one image sensor, wherein the more than one image sensors each capture an image that represents a portion of the scene, and wherein the images are stitched together. For example, FIG. 6, e.g., FIG. 6C, shows multiple image sensor based scene capturing module configured to capture a scene that includes one or more images that represent portions of the scene that are configured to be stitched together, through use of more than one image sensor 630 capturing the scene (e.g., a protest in a city square) that includes one or more images (e.g., images of people in the protest), through use of the array of more than one image sensor (e.g., twenty-five ten megapixel sensors), wherein the more than one image sensors each capture an image that represents a portion of the scene, and wherein the images are stitched together (e.g., after capturing, an automated process lines up the individually captured images, removes overlap, and merges them into a single image).

Referring again to FIG. 11C, operation 1002 may include operation 1132 depicting acquiring an image from each image sensor of the more than one image sensors. For example, FIG. 6, e.g., FIG. 6C, shows particular image from each image sensor acquiring module 632 acquiring an image from each image sensor of the more than one image sensors.

Referring again to FIG. 11C, operation 1002 may include operation 1134, which may appear in conjunction with operation 1132, operation 1134 depicting combining the acquired images from the more than one image sensors into the scene. For example, FIG. 6, e.g., FIG. 6C, shows acquired particular image from each image sensor combining into the scene module 634 combining the acquired images (e.g., images from a scene of a plains oasis) from the more than one image sensors (e.g., three thousand one-megapixel sensors) into the scene (e.g., the scene of a plains oasis).

Referring again to FIG. 11C, operation 1132 may include operation 1136 depicting acquiring images from each image sensor of the more than one image sensors, wherein each acquired image at least partially overlaps at least one other image. For example, FIG. 6, e.g., FIG. 6C, shows particular image with at least partial other image overlap from each image sensor acquiring module 636 acquiring images (e.g., a portion of the overall image, e.g., which is a view of a football stadium during a game) from each image sensor (e.g., a CMOS sensor), wherein each acquired image at least partially overlaps at least one other image (e.g., each image overlaps its neighboring image by five percent).

Referring again to FIG. 11C, operation 1136 may include operation 1138 depicting acquiring the image from each image sensor of the more than one image sensors, wherein each acquired image at least partially overlaps at least one other image captured by an adjacent image sensor. For example, FIG. 6, e.g., FIG. 6C, shows particular image with at least partial adjacent image overlap from each image sensor acquiring module 638 acquiring the image from each image sensor of the more than one image sensors, wherein each acquired image (e.g., each image is a portion of a street corner that will form a live street view) at least partially overlaps at least one other image captured by an adjacent (e.g., there are no intervening image sensors in between) image sensor.

Referring now to FIG. 11D, operation 1002 may include operation 1140 depicting capturing the scene that includes one or more images, through use of the array of more than one image sensor, wherein a size of the scene is greater than a capacity to transmit the scene. For example, FIG. 6, e.g., FIG. 6D, shows multiple image sensor based scene that is larger than a bandwidth for remote transmission of the scene capturing through use of more than one image sensor module 640 capturing the scene that includes one or more images, through use of the array of more than one image sensor, wherein a size of the scene (e.g., 1 gigapixel, captured 60 times per second) is greater than a capacity to transmit the scene (e.g., the capacity to transmit may be 30 megapixels/second).

Referring again to FIG. 11D, operation 1140 may include operation 1142 depicting capturing the scene that includes one or more images, through use of the array of more than one image sensor, wherein an amount of image data captured exceeds a bandwidth for transmitting the image data to a remote location. For example, FIG. 6, e.g., FIG. 6D, shows multiple image sensor based scene that contains more image data than a bandwidth for remote transmission of the scene capturing through use of more than one image sensor module 642 capturing the scene that includes one or more images, through use of the array of more than one image sensor, wherein an amount of image data captured (e.g., 750 megapixels/second) exceeds a bandwidth for transmitting the image data to a remote location (e.g., the capacity to transmit may be 25 megapixels/second).

Referring again to FIG. 11D, operation 1142 may include operation 1144 depicting capturing the scene that includes one or more images, through use of the array of more than one image sensor, wherein the amount of image data captured exceeds the bandwidth for transmitting the image data to the remote location by a factor of ten. For example, FIG. 6, e.g., FIG. 6D, shows multiple image sensor based scene that contains more image data than a bandwidth for remote transmission of the scene by a factor of ten capturing through use of more than one image sensor module 644 capturing the scene that includes one or more images, through use of the array of more than one image sensor, wherein an amount of image data captured (e.g., 750 megapixels/second) exceeds a bandwidth for transmitting the image data to a remote location by a factor of ten (e.g., the capacity to transmit may be 75 megapixels/second).

Referring again to FIG. 11D, operation 1002 may include operation 1146 depicting capturing a scene of a tourist destination that includes one or more images, through use of an array of more than one image sensor. For example, FIG. 6, e.g., FIG. 6D, shows multiple image sensor based scene of a tourist destination capturing through use of more than one image sensor module 646 capturing a scene of a tourist destination that includes one or more images (e.g., images of Mount Rushmore) through use of an array of more than one image sensor (e.g., fifteen CMOS 10 megapixel sensors aligned in two staggered arc-shaped rows).

Referring again to FIG. 11D, operation 1002 may include operation 1148 depicting capturing a scene of a highway across a bridge that includes one or more images, through use of an array of more than one image sensor, wherein the one or more images include one or more images of cars crossing the highway across the bridge. For example, FIG. 6, e.g., FIG. 6D, shows multiple image sensor based scene of a highway bridge capturing through use of more than one image sensor module 648 capturing a scene of a highway across a bridge that includes one or more images, through use of an array of more than one image sensor (e.g., twenty-two inexpensive, lightweight 2 megapixel sensors, arranged in a circular grid), wherein the one or more images include one or more images of cars crossing the highway across the bridge).

Referring again to FIG. 11D, operation 1002 may include operation 1150 depicting capturing a scene of a home that includes one or more images, through use of an array of more than one image sensor, wherein the one or more images include an image of an appliance in the home. For example, FIG. 6, e.g., FIG. 6D, shows multiple image sensor based scene of a home interior capturing through use of more than one image sensor module 650 capturing a scene of a home that includes one or more images, through use of an array of more than one image sensor (e.g., multiple sensors working in connection but placed at different angles and placements across the house, and which may feed into a same source, and which may provide larger views of the house), wherein the one or more images include an image of an appliance (e.g., a refrigerator) in the home.

Referring now to FIG. 11E, operation 1002 may include operation 1152 depicting capturing the scene that includes one or more images, through use of a grouping of more than one image sensor. For example, FIG. 6, e.g., FIG. 6E, shows multiple image sensor based scene that includes the one or more images capturing through use of a grouping of image sensors module 652 capturing the scene (e.g., a historic landmark) that includes one or more images (e.g., images of the entrance to the historic landmark and points of interest at the historic landmark), through use of a grouping of more than one image sensor (e.g., a grouping of one thousand two-megapixel camera sensors arranged on a concave surface).

Referring again to FIG. 11E, operation 1002 may include operation 1154 depicting capturing the scene that includes one or more images, through use of multiple image sensors whose data is directed to a common source. For example, FIG. 6, e.g., FIG. 6E, shows multiple image sensor based scene that includes the one or more images capturing through use of a grouping of image sensors that direct image data to a common collector module 654 capturing the scene that includes one or more images, through use of multiple image sensors (e.g., 15 CMOS sensors) whose data is directed to a common source (e.g., a common processor, e.g., the fifteen CMOS sensors all transmit their digitized data to be processed by a common processor, or a common architecture (e.g., multi processor or multi-core processors)).

Referring again to FIG. 11E, operation 1002 may include operation 1156 depicting capturing the scene that includes one or more images, through use of an array of more than one image sensor, the more than one image sensor including one or more of a charge-coupled devices and a complementary metal-oxide-semiconductor devices. For example, FIG. 6, e.g., FIG. 6E, shows multiple image sensor based scene that includes the one or more images capturing through use of a grouping of image sensors that include charge-coupled devices and complementary metal-oxide-semiconductor devices module 656 capturing the scene (e.g., a museum interior for a virtual tourism site) that includes one or more images (e.g., images of one or more exhibits and/or artifacts in the museum), through use of an array of more than one image sensor, the more than one image sensor including one or more of a charge-coupled device and a complementary metal-oxide semiconductor device.

Referring now to FIG. 11F, operation 1002 may include operation 1158 depicting capturing the scene that includes image data and sound data, through use of an array of more than one image sensor, wherein the array of more than one image sensor is configured to capture image data and sound data. For example, FIG. 6, e.g., FIG. 6F, shows multiple image and sound data based scene that includes the one or more images capturing through use of image and sound sensors module 658 capturing the scene that includes image data (e.g., images of a waterfall and oasis for animals) and sound data (e.g., sound of the waterfall and the cries and calls of the various animals at the oasis), through use of an array of more than one image sensor (e.g., a grouping of twelve sensors each rated at 25 megapixels, and twelve further sensors, each rated at 2 megapixels), wherein the array of more than one image sensor is configured to capture image data (e.g., the images at the waterfall) and sound data (e.g., the sounds from the waterfall and the animals that are there).

Referring again to FIG. 11F, operation 1158 may include operation 1160 depicting capturing the scene that includes image data and sound data, through use of the array of more than one image sensor, wherein the array of more than one image sensor includes image sensors configured to capture image data and microphones configured to capture sound data. For example, FIG. 6, e.g., FIG. 6F, shows multiple image and sound data based scene that includes the one or more images capturing through use of image and sound microphones module 660 capturing the scene (e.g., images of an old battlefield for virtual tourism) that includes image data and sound data, through use of the array of more than one image sensor (e.g., alternatively placed CMOS sensors and microphones), wherein the array of more than one image sensor includes image sensors configured to capture image data and microphones configured to capture sound data.

Referring again to FIG. 11F, operation 1002 may include operation 1162 depicting capturing the scene that includes soundwave image data, through use of the array of more than one soundwave image sensor that captures soundwave data. For example, FIG. 6, e.g., FIG. 6F, shows multiple image sensor based scene that includes sound wave image data capturing through use of an array of sound wave image sensors module 662 capturing the scene that includes soundwave image data, through use of the array of more than one soundwave image sensor (e.g., audio sensors) that captures soundwave data (e.g., sound data, whether in visualization form or convertible to visualization form).

Referring again to FIG. 11F, operation 1002 may include operation 1164 depicting capturing a scene that includes video data, through use of an array of more than one video capture device. For example, FIG. 6, e.g., FIG. 6F, shows multiple video capture sensor based scene that includes the one or more images capturing through use of one or more video capture sensors module 664 capturing a scene (e.g., a scene of a watering hole) that includes video data (e.g., a video of a lion sunning itself), through use of an array of more than one video capture device (e.g., a video camera, or a group of CMOS sensors capturing video at 15 frames per second).

FIGS. 12A-12C depict various implementations of operation 1004, depicting selecting a particular portion of the scene that includes at least one image, wherein the selected particular portion is smaller than the scene, according to embodiments. Referring now to FIG. 12A, operation 1004 may include operation 1202 depicting selecting the particular image from the scene, wherein the selected particular image represents the request for the image that is smaller than the entire scene. For example, FIG. 7, e.g., FIG. 7A, shows scene particular portion that is smaller than the scene and that includes at least one image selecting module 702 selecting the particular image (e.g., a picture of a bear) from the scene (e.g., a tropical oasis), wherein the selected particular image (e.g., the image of the bear) represents the request for the image that is smaller than the entire scene (e.g., the entire scene, when combined, may be close to 1,000,000×1,000,000, but the image of the bear may be matched to the user device's resolution, e.g., 640×480).

Referring again to FIG. 12A, operation 1202 may include operation 1204 depicting selecting the particular image from the scene, wherein the selected particular image represents a particular remote user-requested image that is smaller than the scene. For example, FIG. 7, e.g., FIG. 7A, shows scene particular portion that is smaller than the scene and that includes at least one remote user-requested image selecting module 704 selecting the particular image (e.g., an image of the quarterback) from the scene (e.g., a football game at a stadium), wherein the selected particular image (e.g., the image of the quarterback) represents a particular remote-user requested image (e.g., a user, watching the game back home, has selected that the images focus on the quarterback) that is smaller than the scene (e.g., the image of the quarterback is transmitted at 1920×1080 resolution at 30 fps, whereas the scene is captured at approximately 1,000,000× 1,000,000 at 60 fps).

Referring again to FIG. 12A, operation 1004 may include operation 1206 depicting selecting the particular portion of the scene that includes a requested image, wherein the selected particular portion is smaller than the scene. For example, FIG. 7, e.g., FIG. 7A, shows scene particular portion that is smaller than the scene and that includes at least one requested image selecting module 706 selecting the particular portion of the scene (e.g., a particular restaurant, e.g., Ray's Steakhouse, and a particular person, e.g., President Obama) of the scene (e.g., a street corner during live street view) that includes a requested image, wherein the selected particular portion (e.g., the steakhouse and the President) is smaller than the scene (e.g., a city block where the steakhouse is located).

Referring again to FIG. 12A, operation 1206 may include operation 1208 depicting selecting the particular portion of the scene that includes an image requested by a remote operator of the array of more than one image sensors, wherein the selected particular portion is smaller than the scene. For example, FIG. 7, e.g., FIG. 7A, shows scene particular portion that is smaller than the scene and that includes at least one remote-operator requested image selecting module 708 selecting the particular portion of the scene that includes an image requested by a remote operator of the array (e.g., by "remote operator" here it is meant the remote operator selects from the images available from the scene, giving the illusion of "zooming" and "panning"; in other embodiments, the array of image sensors or the individual image sensors may be moved by remote command, if so equipped (e.g., on movable platforms or mounted on UAVs or satellites, or if each image sensor is wired to hydraulics or servos)) of more than one image sensors, wherein the selected particular portion is smaller than the scene.

Referring again to FIG. 12A, operation 1004 may include operation 1210 depicting receiving a request for a particular image. For example, FIG. 7, e.g., FIG. 7A, shows particular image request receiving module 710 receiving a request for a particular image (e.g., an image of a soccer player on the field as a game is going on).

Referring again to FIG. 12A, operation 1004 may include operation 1212, which may appear in conjunction with operation 1210, operation 1212 depicting selecting the particular image from the scene, wherein the particular image is smaller than the scene. For example, FIG. 7, e.g., FIG. 7A, shows received request for particular image selecting from scene module 712 selecting the particular image (e.g., the player on the soccer field) from the scene (e.g., the soccer field and the stadium, and, e.g., the surrounding parking lots), wherein the particular image (e.g., the image of the player) is smaller than (e.g., is expressed in fewer pixels than) the scene (e.g., the soccer field and the stadium, and, e.g., the surrounding parking lots).

Referring now to FIG. 12B, operation 1004 may include operation 1214 depicting receiving a first request for a first particular image and a second request for a second particular image. For example, FIG. 7, e.g., FIG. 7B, shows first request for a first particular image and second request for a second particular image receiving module 714 receiving a first request for a first particular image (e.g., a quarterback player on the football field) and a second request for a second particular image (e.g., a defensive lineman on the football field).

Referring again to FIG. 12B, operation 1004 may include operation 1216, which may appear in conjunction with operation 1214, operation 1216 depicting selecting the particular portion of the scene that includes the first particular image and the second particular image, wherein the particular portion of the scene is smaller than the scene. For example, FIG. 7, e.g., FIG. 7B, shows scene particular portion that is first particular image and second particular image selecting module 716 selecting the particular portion of the scene that includes the first particular image (e.g., the area at which the quarterback is standing) and the second particular image (e.g., the area at which the defensive lineman is standing), wherein the particular portion of the scene is smaller than the scene. In an embodiment, the detection of the image that contains the quarterback is done by automation. In another embodiment, the user selects the person they wish to follow (e.g., by voice), and the system tracks that person as they move through the scene, capturing that person as the "particular image" regardless of their location in the scene.

Referring again to FIG. 12B, operation 1214 may include operation 1218 depicting receiving the first request for the first particular image and the second request for the second particular image, wherein the first particular image and the second particular image do not overlap. For example, FIG. 7, e.g., FIG. 7B, shows first request for a first particular image and second request for a second particular image that does not overlap the first particular image receiving module 718 receiving the first request for the first particular image (e.g., a request to see the first exhibit in a museum) and the second request for the second particular image (e.g., a request to see the last exhibit in the museum), wherein the first particular image and the second particular image do not overlap (e.g., the first particular image and the second particular image are both part of the scene, but do not share any common pixels).

Referring again to FIG. 12B, operation 1214 may include operation 1220 depicting receiving a first request for a first particular image and a second request for a second particular image, wherein the first particular image and the second particular image overlap at an overlapping portion. For example, FIG. 7, e.g., FIG. 7B, shows first request for a first particular image and second request for a second particular image that overlaps the first particular image receiving module 720 receiving a first request for a first particular image (e.g., a request to watch a particular animal at a watering hole) and a second request for a second particular image (e.g., a request to watch a different animal, e.g., an alligator), wherein the first particular image and the second particular image overlap at an overlapping portion (e.g., a portion of the pixels in the first particular image are the same ones as used in the second particular image).

Referring again to FIG. 12B, operation 1220 may include operation 1222 depicting receiving the first request for the first particular image and the second request for the second particular image, wherein the first particular image and the second particular image overlap at the overlapping portion, and wherein the overlapping portion is configured to be transmitted once only. For example, FIG. 7, e.g., FIG. 7B, shows first request for a first particular image and second request for a second particular image that overlaps the first particular image and an overlapping portion is configured to be transmitted once only receiving module 722 first particular image (e.g., a request to watch a particular animal at a watering hole) and a second request for a second particular image (e.g., a request to watch a different animal, e.g., an alligator), wherein the first particular image and the second particular image overlap at an overlapping portion (e.g., a portion of the pixels in the first particular image are the same ones as used in the second particular image), and wherein the overlapping portion is configured to be transmitted once only (e.g., the shared pixels are transmitted once only to a remote server, where they are used to transmit both the first particular image and the second particular image to their ultimate destinations).

Referring now to FIG. 12C, operation 1004 may include operation 1224 depicting selecting the particular portion of the scene that includes at least one image, wherein the selected particular portion is smaller than the scene and contains a particular image object. For example, FIG. 7, e.g., FIG. 7C, shows scene particular portion that is smaller than the scene and that contains a particular image object selecting module 724 selecting the particular portion (e.g., a person walking down the street) of the scene (e.g., a street view of a busy intersection) that includes at least one image (e.g., the image of the person), wherein the selected particular portion is smaller than the scene and contains a particular image object (e.g., the person walking down the street).

Referring again to FIG. 12C, operation 1224 may include operation 1226 depicting selecting the particular portion of the scene that includes at least one image, wherein the selected particular portion is smaller than the scene and contains an image object of a person. For example, FIG. 7, e.g., FIG. 7C, shows scene particular portion that is smaller than the scene and that contains a particular image object that is a person selecting module 726 selecting the particular portion (e.g., a person walking down the street) of the scene (e.g., a street view of a busy intersection) that includes at least one image (e.g., the image of the person), wherein the selected particular portion is smaller than the scene and contains an image object of a person (e.g., the person walking down the street).

Referring again to FIG. 12C, operation 1224 may include operation 1228 depicting selecting the particular portion of the scene that includes at least one image, wherein the selected particular portion is smaller than the scene and contains an image object of a car. For example, FIG. 7, e.g., FIG. 7C, shows scene particular portion that is smaller than the scene and that contains a particular image object that is a vehicle selecting module 728 selecting the particular portion (e.g., an area of a bridge) of the scene (e.g., a highway bridge) that includes at least one image (e.g., an image of a car, with license plates and silhouettes of occupants of the car), wherein the selected particular portion is smaller (e.g., occupies less space in memory) than the scene and contains an image object of a car.

Referring again to FIG. 12C, operation 1004 may include operation 1230 depicting selecting the particular portion of the scene that includes at least one image, wherein a size of the particular portion of the scene is at least partially based on a characteristic of a requesting device. For example, FIG. 7, e.g., FIG. 7C, shows scene particular portion that is smaller than the scene and is size-defined by a characteristic of a requesting device selecting module 730 selecting the particular portion of the scene (e.g., a picture of a lion at a scene of a watering hole) that includes at least one image (e.g., a picture of a lion), wherein a size of the particular portion (e.g., a number of pixels) of the scene (e.g., the watering hole) is at least partially based on a characteristic (e.g., an available bandwidth) of a requesting device (e.g., a smartphone device).

Referring again to FIG. 12C, operation 1230 may include operation 1232 depicting selecting the particular portion of the scene that includes at least one image, wherein the size of the particular portion of the scene is at least partially based on a screen resolution of the requesting device. For example, FIG. 7, e.g., FIG. 7C, shows scene particular portion that is smaller than the scene and is size-defined by a screen resolution of a requesting device selecting module 732 selecting the particular portion of the scene (e.g., a rock concert) that includes at least one image, wherein the size of the particular portion of the scene is at least partially based on a screen resolution (e.g., 1920 pixels by 1080 pixels, e.g., "HD" quality) of the requesting device (e.g., a smart TV).

Referring again to FIG. 12C, operation 1230 may include operation 1234 depicting selecting the particular portion of the scene that includes at least one image, wherein the size of the particular portion of the scene is at least partially based on a combined size of screens of at least one requesting device. For example, FIG. 7, e.g., FIG. 7C, shows scene particular portion that is smaller than the scene and is size-defined by a combined screen size of at least one requesting device selecting module 734 selecting the particular portion of the scene (e.g., a historic battlefield) that includes at least one image (e.g., particular areas of the battlefield), wherein the size (e.g., the number of pixels) of the particular portion of the scene is at least partially based on a combined size of screens of at least one requesting device (e.g., if there are five devices that are requesting 2000×1000 size images, then the particular portion may be 10000×1000 pixels (that is, 5× as large), less any overlap, for example).

FIGS. 13A-13D depict various implementations of operation 1006, depicting transmitting only the selected particular portion from the scene to a remote location, according to embodiments. Referring now to FIG. 13A, operation 1006 may include operation 1302 depicting transmitting only the selected particular portion to a remote server. For example, FIG. 8, e.g., FIG. 8A, shows selected particular portion transmitting to a remote server module 802 transmitting only the selected particular portion (e.g., an image of a drummer at a live show) to a remote server (e.g., a remote location that receives requests for various parts of the scene and transmits the requests to the camera array).

Referring again to FIG. 13A, operation 1302 may include operation 1304 depicting transmitting only the selected particular portion to the remote server that is configured to receive one or more requests for one or more particular images from the scene. For example, FIG. 8, e.g., FIG. 8A, shows selected particular portion transmitting to a remote server configured to receive particular image requests module 804 transmitting only the selected particular portion to the remote server that is configured to receive one or more requests for one or more particular images (e.g., points of interest in a virtual tourism setting) from the scene.

Referring again to FIG. 13A, operation 1304 may include operation 1306 depicting transmitting only the selected particular portion to the remote server that is configured to receive multiple requests from discrete users for multiple particular images from the scene. For example, FIG. 8, e.g., FIG. 8A, shows selected particular portion transmitting to a remote server configured to receive particular discrete image requests module 806 transmitting only the selected particular portion (the portion that includes the areas designated by discrete users as ones to watch) to the remote server that is configured to receive multiple requests from discrete users for multiple images (e.g., each discrete user may want to view a different player in a game or a different area of a field for a football game) from the scene (e.g., a football game played inside a stadium).

Referring again to FIG. 13A, operation 1302 may include operation 1308 depicting transmitting only the selected particular portion to the remote server that requested the selected particular portion from the image. For example, FIG. 8, e.g., FIG. 8A, shows selected particular portion transmitting to a remote server that requested a particular image module 808 transmitting only the selected particular portion to the remote server that requested the selected particular portion from the image.

Referring now to FIG. 13B, operation 1006 may include operation 1310 depicting transmitting only the selected particular portion from the scene at a particular resolution. For example, FIG. 8, e.g., FIG. 8B, shows selected particular portion transmitting at a particular resolution module 810 transmitting only the selected particular portion (e.g., an image that the user selected) from the scene (e.g., a virtual tourism scene of the Eiffel Tower) at a particular resolution (e.g., 1920×1080 pixels, e.g., "HD" resolution).

Referring again to FIG. 13B, operation 1310 may include operation 1312 depicting determining an available bandwidth for transmission to the remote location. For example, FIG. 8, e.g., FIG. 8B, shows available bandwidth to remote location determining module 812 determining an available bandwidth (e.g., how much data can be transmitted over a particular network at a particular time, e.g., whether compensating for conditions or component-based) for transmission to the remote location (e.g., a remote server that handles requests from users).

Referring again to FIG. 13B, operation 1310 may include operation 1314, which may appear in conjunction with operation 1312, operation 1314 depicting transmitting only the selected particular portion from the scene at the particular resolution that is at least partially based on the determined available bandwidth. For example, FIG. 8, e.g., FIG. 8B, shows selected particular portion transmitting at a particular resolution based on determined available bandwidth module 814 transmitting only the selected particular portion (e.g., an image of a lion) from the scene (e.g., a watering hole) at the particular resolution (e.g., resolution the size of a web browser that the user is using to watch the lion) that is at least partially based on the determined available bandwidth (e.g., as the bandwidth decreases, the resolution also decreases).

Referring again to FIG. 13B, operation 1310 may include operation 1316 depicting transmitting only the selected particular portion from the scene at the particular resolution, wherein the particular resolution is less than a resolution at which the scene was captured. For example, FIG. 8, e.g., FIG. 8B, shows selected particular portion transmitting at a particular resolution less than a scene resolution module 816 transmitting only the selected particular portion from the scene (e.g., a picture of a busy street from a street view), wherein the particular resolution is less than a resolution at which the scene was captured.

Referring again to FIG. 13B, operation 1310 may include operation 1318 depicting transmitting only the selected particular portion from the scene at the particular resolution, wherein the particular resolution is less than a resolution at which the selected particular portion was captured. For example, FIG. 8, e.g., FIG. 8B, shows selected particular portion transmitting at a particular resolution less than a captured particular portion resolution module 818 transmitting only the selected particular portion from the scene (e.g., a picture of a busy street from a live street view), wherein the particular resolution is less than a resolution at which the particular portion (e.g., a specific person walking across the street, or a specific car (e.g., a Lamborghini) parked on the corner) was captured.

Referring now to FIG. 13C, operation 1006 may include operation 1320 depicting transmitting a first segment of the selected particular portion at a first resolution, to the remote location. For example, FIG. 8, e.g., FIG. 8C, shows first segment of selected particular portion transmitting at a first resolution module 820 transmitting a first segment (e.g., an exterior portion) of the selected particular portion (e.g., a view of a street) at a first resolution (e.g., at full high-definition resolution), to the remote location (e.g., to a server that is handling user requests for a virtual reality environment).

Referring again to FIG. 13C, operation 1006 may include operation 1322, which may appear in conjunction with operation 1320, operation 1322 depicting transmitting a second segment of the selected particular portion at a second resolution that is higher than the first resolution, to the remote location. For example, FIG. 8, e.g., FIG. 8C, shows second segment of selected particular portion transmitting at a second resolution module 822 transmitting a second segment of the selected particular portion (e.g., an interior portion, e.g., the portion that the user selected) that is higher than the first resolution, to the remote location (e.g., a remote server that is handling user requests and specifying to the image device which pixels to be captured).

Referring again to FIG. 13C, operation 1320 may include operation 1323 depicting transmitting the first segment of the selected particular portion at the first resolution, wherein the first segment of the selected particular portion surrounds the second segment of the selected particular portion. For example, FIG. 8, e.g., FIG. 8C, shows first segment of selected particular portion that surrounds the second segment transmitting at a first resolution module 823 transmitting the first segment of the selected particular portion (e.g., a portion of the image that surrounds the portion requested by the user, e.g., a portion that an automated calculation has determined is likely to contain the lion from the scene of the watering hole at some point) at the first resolution, wherein the first seglment of the selected particular portion surrounds (e.g., is around the second particular portion in at least two opposite directions) the second segment of the selected particular portion (e.g., the lion from the watering hole, e.g., the portion requested by the user)

Referring again to FIG. 13C, operation 1320 may include operation 1324 depicting transmitting the first segment of the selected particular portion at the first resolution, wherein the first segment of the selected particular portion borders the second segment of the selected particular portion. For example, FIG. 8, e.g., FIG. 8C, shows first segment of selected particular portion that borders the second segment transmitting at a first resolution module 824 transmitting the first segment of the selected particular portion (e.g., an area of a live street view that a person is walking towards) at the first resolution, wherein the first segment of the selected particular portion borders the second segment of the selected particular portion (e.g., the second segment includes the person the user wants to watch, and the first segment, which borders the second segment, is where the device automation is calculating where the person will be, based on a direction the person is moving).

Referring again to FIG. 13C, operation 1320 may include operation 1326 depicting transmitting the first segment of the selected particular portion at the first resolution, wherein the first segment of the selected particular portion is determined at least in part by a content of the selected particular portion. For example, FIG. 8, e.g., FIG. 8C, shows first segment of selected particular portion that is determined by selected particular portion content transmitting at a first resolution module 826 transmitting the first segment of the selected particular portion (e.g., the segment surrounding a soccer player at a game) at the first resolution, wherein the first segment of the selected particular portion is determined at least in part by a content (e.g., the first segment does not contain the person of interest, e.g., the soccer player) of the selected particular portion.

Referring again to FIG. 13C, operation 1326 may include operation 1328 depicting transmitting the first segment of the selected particular portion at the first resolution, wherein the first segment of the selected particular portion is an area that does not contain an item of interest. For example, FIG. 8, e.g., FIG. 8C, shows first segment of selected particular portion that is determined as not containing an item of interest transmitting at a first resolution module 828 transmitting the first segment of the selected particular portion at the first resolution, wherein the first segment of the selected particular portion is an area that does not contain an item of interest (e.g., no animal activity at the watering hole in the first segment of the selected particular portion, where the scene is a watering hole).

Referring again to FIG. 13C, operation 1328 may include operation 1330 depicting transmitting the first segment of the selected particular portion at the first resolution, wherein the first segment of the selected particular portion is an area that does not contain a selected person of interest. For example, FIG. 8, e.g., FIG. 8C, shows first segment of selected particular portion that is determined as not containing a person of interest transmitting at a first resolution module 830 transmitting the first segment of the selected particular portion at the first resolution, wherein the first segment of the selected particular portion is an area that does not contain a selected person of interest (e.g., a user is watching the football game and wants to see the quarterback, and the first segment does not contain the quarterback (e.g., but may contain a lineman, a receiver, or a running back).

Referring again to FIG. 13C, operation 1328 may include operation 1332 depicting transmitting the first segment of the selected particular portion at the first resolution, wherein the first segment of the selected particular portion is an area that does not contain a selected object designated for tracking. For example, FIG. 8, e.g., FIG. 8C, shows first segment of selected particular portion that is determined as not containing an object designated for tracking transmitting at a first resolution module 832 transmitting the first segment of the selected particular portion at the first resolution (e.g., 1920×1080, e.g., HD resolution), wherein the first segment of the selected particular portion is an area that does not contain a selected object designated for tracking (e.g., in a virtual safari, tracking an elephant moving across the plains, and the first segment does not contain the elephant, but may be a prediction about where the elephant will be).

Referring now to FIG. 13D, operation 1322 may include operation 1334 depicting transmitting the second segment of the selected particular portion at the second resolution that is higher than the first resolution, wherein the second segment of the selected particular portion represents an area selected by a user, and the first segment of the selected particular portion represents a border area that borders the area selected by the user. For example, FIG. 8, e.g., FIG. 8C, shows second segment that is a user-selected area of selected particular portion transmitting at a second resolution that is higher than the first resolution module 834 depicting transmitting the second segment of the selected particular portion at the second resolution that is higher than the first resolution, wherein the second segment of the selected particular portion represents an area selected by a user, and the first segment of the selected particular portion represents a border area that borders the area selected by the user.

Referring again to FIG. 13D, operation 1322 may include operation 1336 depicting transmitting the second segment of the selected particular portion at the second resolution that is higher than the first resolution, wherein the second segment of the selected particular portion is surrounded by the first segment of the selected particular portion. For example, FIG. 8, e.g., FIG. 8C, shows second segment that is a surrounded by the first segment transmitting at a second resolution that is higher than the first resolution module 836 transmitting the second segment of the selected particular portion (e.g., a person walking down the street in a live street view) at the second resolution (e.g., 1920×1080 pixel count at 64-bit depth) that is higher than the first resolution (e.g., 1920×1080 pixel count at 8-bit depth), wherein the seconde segment of the selected particular portion is surrounded by the first segment of the selected particular portion.

Referring again to FIG. 13D, operation 1322 may include operation 1338 depicting transmitting the second segment of the selected particular portion at the second resolution that is higher than the first resolution, wherein the second segment of the selected particular portion is determined to contain a selected item of interest. For example, FIG. 8, e.g., FIG. 8C, shows second segment of selected particular portion that contains an object of interest transmitting at the second resolution module 838 transmitting the second segment of the selected particular portion (e.g., on a security camera array, the second segment is the portion that contains the person that is walking around the building at night) at the second resolution (e.g., 640×480 pixel resolution) that is higher than the first resolution (e.g., 320×200 pixel resolution), wherein the second segment of the selected particular portion is determined to contain a selected item of interest (e.g., a person or other moving thing (e.g., animal, robot, car) moving around a perimeter of a building).

Referring again to FIG. 13D, operation 1338 may include operation 1340 depicting transmitting the second segment of the selected particular portion at the second resolution that is higher than the first resolution, wherein the second segment of the selected particular portion is determined to contain a selected football player. For example, FIG. 8, e.g., FIG. 8D, shows second segment of selected particular portion that contains an object of interest that is a football player transmitting at the second resolution module 840 transmitting the second segment of the selected particular portion transmitting the second segment of the selected particular portion at the second resolution (e.g., 3840×2160, e.g., "4K resolution") that is higher than the first resolution (e.g., 640×480 resolution), wherein the second segment of the selected particular portion is determined to contain a selected football player.

Referring again to FIG. 13D, operation 1338 may include operation 1342 depicting transmitting the second segment of the selected particular portion at the second resolution that is higher than the first resolution, wherein the second segment of the selected particular portion is determined to contain a selected landmark. For example, FIG. 8, e.g., FIG. 8D, shows second segment of selected particular portion that contains an object of interest that is a landmark transmitting at the second resolution module 842 transmitting the second segment of the selected particular portion (e.g., a nose of the Sphinx, where the selected particular portion also includes the first segment which is the area around the Sphinx's nose) at the second resolution (e.g., 2560×1400) that is higher than the first resolution (e.g., 1920×1080), wherein the second segment of the selected particular portion is determined to contain a selected landmark (e.g., the Sphinx's nose).

Referring again to FIG. 13D, operation 1338 may include operation 1344 depicting transmitting the second segment of the selected particular portion at the second resolution that is higher than the first resolution, wherein the second segment of the selected particular portion is determined to contain a selected animal for observation. For example, FIG. 8, e.g., FIG. 8D, shows second segment of selected particular portion that contains an object of interest that is an animal transmitting at the second resolution module 844 transmitting the second segment of the selected particular portion at the second resolution (e.g., 640×480) that is higher than the first resolution (e.g., 320×240), wherein the second segment of the selected particular portion is determined to contain a selected animal (e.g., a panda bear at an oasis) for observation (e.g., a user has requested to see the panda bear).

Referring again to FIG. 13D, operation 1338 may include operation 1346 depicting transmitting the second segment of the selected particular portion at the second resolution that is higher than the first resolution, wherein the second segment of the selected particular portion is determined to contain a selected object in a dwelling. For example, FIG. 8, e.g., FIG. 8D, shows second segment of selected particular portion that contains an object of interest that is a selected object in a dwelling transmitting at the second resolution module 846 transmitting the second segment of the selected particular portion (e.g., the second segment contains the refrigerator) at the second resolution (e.g., full HD resolution) that is higher than the first resolution (e.g., the first resolution is 60% of the second resolution), wherein the second segment of the selected particular portion is determined to contain a selected object (e.g., a refrigerator) in a dwelling.

FIGS. 14A-14D depict various implementations of operation 1008, depicting de-emphasizing pixels from the scene that are not part of the selected particular portion of the scene, according to embodiments. Referring now to FIG. 14A, operation 1008 may include operation 1402 depicting transmitting only pixels associated with the selected particular portion to the remote location. For example, FIG. 9, e.g., FIG. 9A, shows scene pixel nonselected nontransmitting module 902 transmitting only pixels associated with the selected particular portion to the remote location (e.g., a remote server that handles access requests and determines which portions of the captured scene will be transmitted).

Referring again to FIG. 14A, operation 1008 may include operation 1404 depicting transmitting only the selected particular portion from the scene to a particular device that requested the selected particular portion. For example, FIG. 9, e.g., FIG. 9A, shows scene pixel exclusive pixels selected from the particular portion transmitting to a particular device module 904 transmitting only the selected particular portion (e.g., a person wheeling a shopping cart out of a discount store) from the scene (e.g., an exit area of a discount store at which people's receipts are compared against the items they have purchased) to a particular device (e.g., a television screen of a remote manager who is not on site at the discount store) that requested the selected particular portion.

Referring again to FIG. 14A, operation 1404 may include operation 1406 depicting transmitting only the selected particular portion from the scene to a particular device operated by a user that requested the selected particular portion. For example, FIG. 9, e.g., FIG. 9A, shows scene pixel exclusive pixels selected from the particular portion transmitting to a particular device that requested the particular portion module 906 transmitting only the selected particular portion (e.g., the picture of the panda from the zoo) from the scene (e.g., the panda area at a zoo) to a particular device (e.g., a smartphone device) operated by a user that requested the selected particular portion (e.g., the panda area).

Referring again to FIG. 14A, operation 1404 may include operation 1408 depicting transmitting only the selected particular portion from the scene to a particular device that requested the selected particular portion through selection of the particular portion from the scene. For example, FIG. 9, e.g., FIG. 9A, shows scene pixel exclusive pixels selected from the particular portion transmitting to a particular device user that requested the particular portion module 908 transmitting only the selected particular portion (e.g., a drummer from a rock concert) from the scene (e.g., a concert venue where a rock concert is taking place) to a particular device (e.g., a television set in a person's house over a thousand miles away) that requested the selected particular portion (e.g., the drummer from the rock concert) through selection of the particular portion from the scene (e.g., the person watching the television used the remote to navigate through the scene and draw a box around the drummer, then gave the television a verbal command to focus on the drummer, where the verbal command was picked up by the television remote and translated into a command to the television, which transmitted the command to a remote server, which caused the drummer of the rock band to be selected as the selected particular portion).

Referring again to FIG. 14A, operation 1008 may include operation 1410 depicting deleting pixels from the scene that are not part of the selected particular portion of the scene. For example, FIG. 9, e.g., FIG. 9A, shows scene nonselected pixel deleting module 910 deleting (e.g., not storing in permanent memory) pixels from the scene that are not part of the selected particular portion of the scene. It is noted here that "deleting" does not necessarily imply an active "deletion" of the pixels out of memory, but rather may include allowing the pixels to be overwritten or otherwise not retained, without an active step.

Referring now to FIG. 14B, operation 1008 may include operation 1412 depicting indicating that pixels from the scene that are not part of the selected particular portion of the scene are not transmitted with the selected particular portion. For example, FIG. 9, e.g., FIG. 9B, shows scene nonselected pixels indicating as nontransmitted module 912 indicating that pixels from the scene that are not part of the selected particular portion of the scene (e.g., a concert venue during a show) are not transmitted with the selected particular portion (e.g., a selection of the drummer in a band).

Referring again to FIG. 14B, operation 1412 may include operation 1414 depicting appending data to pixels from the scene that are not part of the selected portion of the scene, said appended data configured to indicate non-transmission of the pixels to which data was appended. For example, FIG. 9, e.g., FIG. 9B, shows scene nonselected pixels appending data that indicates nontransmission module 916 appending data to pixels (e.g., a "flag," e.g., setting a bit to zero rather than one) from the scene that are not part of the selected portion of the scene, said appended data (e.g., the bit is set to zero) configured to indicate non-transmission of the pixels to which data was appended (e.g., only those pixels to which the appended bit is "1" will be transmitted).

Referring again to FIG. 14B, operation 1008 may include operation 1416 depicting discarding pixels from the scene that are not part of the selected particular portion of the scene. For example, FIG. 9, e.g., FIG. 9B, shows scene nonselected pixels discarding module 916 discarding (e.g., not making any particular attempt to save in a manner which would allow ease of retrieval) pixels from the scene (e.g., a scene of a football stadium) that are not part of the selected particular portion of the scene (e.g., the quarterback has been selected).

Referring again to FIG. 14B, operation 1008 may include operation 1418 depicting denying retention of pixels from the scene that are not part of the selected particular portion of the scene. For example, FIG. 9, e.g., FIG. 9B, shows scene nonselected retention preventing module 918 denying retention (e.g., preventing transmission to a remote server or long term storage) of pixels from the scene (e.g., a scene of a desert oasis) that are not part of the selected particular portion of the scene (e.g., are not being "watched" by any users or that have not been instructed to be retained).

Referring now to FIG. 14C, operation 1008 may include operation 1420 depicting retaining a subset of pixels from the scene that are not part of the selected particular portion of the scene. For example, FIG. 9, e.g., FIG. 9C, shows scene pixel subset retaining module 920 retaining a subset of pixels (e.g., edge pixels and 25% sampling inside color blocks) from the scene (e.g., a virtual tourism of the Sphinx in Egypt) that are not part of the selected particular portion of the scene (e.g., the nose of the Sphinx).

Referring again to FIG. 14C, operation 1420 may include operation 1422 depicting retaining ten percent of the pixels from the scene that are not part of the selected particular portion of the scene. For example, FIG. 9, e.g., FIG. 9C, shows scene pixel ten percent subset retaining module 922 retaining ten percent (e.g., one in ten) of the pixels from the scene (e.g., a scene of an interior of a grocery store) that are not part of the selected particular portion of the scene (e.g., a specific shopper whom the owner has identified as a potential shoplifter).

Referring again to FIG. 14C, operation 1420 may include operation 1424 depicting retaining pixels from the scene that have been identified as part of a targeted object that are not part of the selected particular portion of the scene. For example, FIG. 9, e.g., FIG. 9C, shows scene pixel targeted object subset retaining module 924 retaining pixels from the scene that have been identified as part of a targeted object (e.g., a particular person of interest, e.g., a popular football player on a football field, or a person flagged by the government as a spy outside of a warehouse) that are not part of the selected particular portion of the scene (e.g., a person using the camera array is not watching that particular person).

Referring again to FIG. 14C, operation 1424 may include operation 1426 depicting retaining pixels from the scene that have been identified as a scenic landmark of interest that is not part of the selected particular portion of the scene. For example, FIG. 9, e.g., FIG. 9C, shows scene pixel targeted scenic landmark object subset retaining module 926 retaining pixels from the scene that have been identified as a scenic landmark of interest that is not part of the selected particular portion of the scene (e.g., a live street view of Yellowstone National Park).

Referring again to FIG. 14C, operation 1420 may include operation 1428 retaining pixels from the scene that have been identified as part of a targeted object through automated pattern recognition that are not part of the selected particular portion of the scene. For example, FIG. 9, e.g., FIG. 9C, shows scene pixel targeted automation identified object subset retaining module 928 retaining pixels from the scene (e.g., a virtual tourism scene through a national monument) that have been identified as part of a targeted object (e.g., part of the monument) through automated pattern recognition (e.g., automated analysis performed on the image to recognize known shapes and/or patterns, including faces, bodies, persons, objects, cars, structures, tools, etc.) that are not part of the selected particular portion (e.g., the selected particular portion was a different part of the monument) of the scene.

Referring now to FIG. 14D, operation 1008 may include operation 1430 depicting storing pixels from the scene that are not part of the selected particular portion of the scene in a separate storage. For example, FIG. 9, e.g., FIG. 9D, shows scene pixel subset storing in separate storage module 930 storing pixels from the scene that are not part of the selected particular portion of the scene (e.g., pixels that are not part of the areas selected by the user for transmission to the user screen) in a separate storage (e.g., a local storage attached to a device that houses the array of image sensors).

Referring again to FIG. 14D, operation 1430 may include operation 1432 depicting storing pixels from the scene that are not part of the selected particular portion of the scene in a separate storage that is local to the array of more than one image sensor. For example, FIG. 9, e.g., FIG. 9D, shows scene pixel subset storing in separate local storage module 932 storing pixels from the scene (e.g., a live street view of a busy intersection in Washington, D.C.) that are not part of the selected particular portion of the scene (e.g., that are not part of the selected person or area of interest) in a separate storage (e.g., a local memory, e.g., a hard drive that is connected to a processor that receives data from the array of image sensors) that is local to the array of more than one image sensor (e.g., is in the same general vicinity, without specifying a specific type of connection).

Referring again to FIG. 14D, operation 1430 may include operation 1434 depicting storing pixels from the scene that are not part of the selected particular portion of the scene in a separate storage, wherein pixels stored in the separate storage are configured to be transmitted to the remote location separately from the selected particular portion of the scene. For example, FIG. 9, e.g., FIG. 9D, shows scene pixel subset storing in separate storage for separate transmission module 934 storing pixels from the scene that are not part of the selected particular portion of the scene in a separate storage, wherein pixels stored in the separate storage are configured to be transmitted to the remote location (e.g., a remote server) separately from the selected particular portion of the scene (e.g., at a different time, or through a different communications channel or medium, or at a different bandwidth, transmission speed, error checking rate, etc.).

Referring again to FIG. 14D, operation 1434 may include operation 1436 depicting storing pixels from the scene that are not part of the selected particular portion of the scene in a separate storage, wherein pixels stored in the separate storage are configured to be transmitted to the remote location at a time when there are no selected particular portions to be transmitted. For example, FIG. 9, e.g., FIG. 9D, shows scene pixel subset storing in separate storage for separate transmission at off-peak time module 936 storing pixels from the scene (e.g., a waterfall scene) that are not part of the selected particular portion of the scene (e.g., parts that are not the selected animals drinking at the bottom of the waterfall) in a separate storage (e.g., a local memory, e.g., a solid state memory that is local to the array of image sensors), wherein pixels stored in the separate storage (e.g., the solid state memory) are configured to be transmitted to the remote location (e.g., a remote server, which will determine if the pixels have use for training pattern detection algorithms or using as caching copies, or determining hue and saturation values for various parts of the scene) at a time when there are no selected particular portions to be transmitted.

Referring again to FIG. 14D, operation 1434 may include operation 1438 depicting storing pixels from the scene that are not part of the selected particular portion of the scene in a separate storage, wherein pixels stored in the separate storage are configured to be separately transmitted to the remote location based on assigning a lower priority to the stored pixels. For example, FIG. 9, e.g., FIG. 9D, shows scene pixel subset storing in separate storage for separate transmission as lower-priority data module 938 storing (e.g., in a separate storage, e.g., in a local disk drive or memory that is local to the array of image sensors) pixels from the scene that are not part of the selected particular portion (e.g., not requested to be transmitted to an external location) of the scene in a separate storage (e.g., a local disk drive or other memory that is local to the array of image sensors), wherein pixels stored in the separate storage are configured to be separately transmitted to the remote location (e.g., to a server, which will analyze the content and determine if any of the content is useful for caching or image analysis, e.g., pattern recognition, training automated recognition algorithms, etc.) based on assigning a lower priority to the stored pixels (e.g., the stored pixels will be sent when there is available bandwidth to the remote location that is not being used to transmit requested portions, e.g., the particular portion).

It is noted that, in the foregoing examples, various concrete, real-world examples of terms that appear in the following claims are described. These examples are meant to be exemplary only and non-limiting. Moreover, any example of any term may be combined or added to any example of the same term in a different place, or a different term in a different place, unless context dictates otherwise.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.)

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in an embodiment," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. An image capture device that includes more than one image sensor, the image capture device comprising:
   circuitry configured to capture a scene through use of the more than one image sensor;
   circuitry configured to select a particular portion of the scene that is smaller than the scene based at least partly on a user request;
   circuitry configured to select an additional unrequested portion of the scene that is adjacent to the particular portion and determined to correspond to a likely subsequent user request; and
   circuitry configured to transmit the particular portion of the scene at a first resolution in combination with the additional unrequested portion of the scene at a second resolution that is lower than the first resolution to reduce latency of image loading of the additional unrequested portion of the scene in an event the additional unrequested portion of the scene is a subject of a subsequent user request.

2. The image capture device of claim 1, wherein said circuitry configured to capture a scene through use of the more than one image sensor comprises:
   circuitry configured to capture a scene through use of the more than one image sensor aligned in a grid pattern.

3. The image capture device of claim 1, wherein said circuitry configured to capture a scene through use of the more than one image sensor comprises:
   circuitry configured to capture a scene through use of the more than one image sensor, wherein the scene is larger than a bandwidth capacity for transmission to a remote location.

4. The image capture device of claim 1, further comprising:
   circuitry configured to receive the user request for a particular image.

5. The image capture device of claim 1, wherein said circuitry configured to select a particular portion of the scene that is smaller than the scene based at least partly on a user request comprises:
   circuitry configured to select a particular portion of the scene that contains a particular object and that is smaller than the scene based at least partly on a user request.

6. The image capture device of claim 1, wherein said circuitry configured to select a particular portion of the scene that is smaller than the scene based at least partly on a user request comprises:
   circuitry configured to select a particular portion of the scene that is smaller than the scene based at least partly on a user request, wherein a resolution of the particular portion of the scene is at least partly based on a characteristic of a requesting device.

7. The image capture device of claim 1, wherein said circuitry configured to select a particular portion of the scene that is smaller than the scene based at least partly on a user request comprises:
   circuitry configured to select a particular portion of the scene that is smaller than the scene based at least partly on a user request, wherein a resolution of the particular portion of the scene is at least partly based on a screen resolution of a requesting device.

8. The image capture device of claim 1, wherein said circuitry configured to select an additional unrequested portion of the scene that is adjacent to the particular portion and determined to correspond to a likely subsequent user request comprises:
   circuitry configured to select an additional unrequested portion of the scene that surrounds the particular portion and is determined to correspond to a likely subsequent user request.

9. The image capture device of claim 1, wherein said circuitry configured to select an additional unrequested portion of the scene that is adjacent to the particular portion and determined to correspond to a likely subsequent user request comprises:
   circuitry configured to select an additional unrequested portion of the scene that is adjacent to the particular portion and determined to correspond to a likely subsequent user request based at least partly on content of the particular portion.

10. The image capture device of claim 1, wherein said circuitry configured to select an additional unrequested portion of the scene that is adjacent to the particular portion and determined to correspond to a likely subsequent user request comprises:
    circuitry configured to select an additional unrequested portion of the scene that is adjacent to the particular portion and determined to correspond to a likely subsequent user request due at least in part to containing an item of interest.

11. The image capture device of claim 1, wherein said circuitry configured to select an additional unrequested portion of the scene that is adjacent to the particular portion and determined to correspond to a likely subsequent user request comprises:
    circuitry configured to select an additional unrequested portion of the scene that is adjacent to the particular portion and determined to correspond to a likely subsequent user request due at least in part to containing an identified object of interest.

12. The image capture device of claim 1, wherein said circuitry configured to transmit the particular portion of the scene at a first resolution in combination with the additional unrequested portion of the scene at a second resolution that is lower than the first resolution to reduce latency of image loading of the additional unrequested portion of the scene in an event the additional unrequested portion of the scene is a subject of a subsequent user request comprises:
    circuitry configured to transmit to a device associated with the user request the particular portion of the scene at a first resolution in combination with the additional unrequested portion of the scene at a second resolution that is lower than the first resolution to reduce latency of image loading of the additional unrequested portion of the scene in an event the additional unrequested portion of the scene is a subject of a subsequent user request.

13. The image capture device of claim 1, further comprising:
    circuitry configured to delete at least some pixels from the scene that are not part of the particular portion of the scene.

14. The image capture device of claim 1, further comprising:
    circuitry configured to remove at least some pixels from the scene that are not part of the particular portion of the scene.

15. The image capture device of claim 1, further comprising:
    circuitry configured to append data to indicate that at least some pixels were removed from the scene.

16. The image capture device of claim 1, further comprising:
    circuitry configured to retain a sampling of pixels from the scene that are not part of the particular portion of the scene.

17. The image capture device of claim 16, wherein said circuitry configured to retain a sampling of pixels from the scene that are not part of the particular portion of the scene comprises:
    circuitry configured to retain a sampling of pixels from the scene that are not part of the particular portion of the scene and that are associated with a target object.

18. The image capture device of claim 16, wherein said circuitry configured to retain a sampling of pixels from the scene that are not part of the particular portion of the scene comprises:
    circuitry configured to retain a sampling of pixels from the scene that are not part of the particular portion of the scene and that are identified through automated pattern recognition.

19. The image capture device of claim 1, further comprising:
    circuitry configured to store one or more pixels from the scene that are not part of the particular portion of the scene.

20. The image capture device of claim 19, further comprising:
    circuitry configured to transmit the one or more pixels from the scene that are not part of the particular portion of the scene to a remote location for storage at one or more times when no user requested portions of the scene are being transmitted.

21. The image capture device of claim 1, further comprising:
    circuitry configured to remove one or more pixels from the particular portion of the scene that correspond to one or more objects that have not changed in appearance since a previous transmission.

22. The image capture device of claim 1, further comprising:
    circuitry configured to transmit one or more portions of the scene corresponding to one or more static objects at one or more times when no user requested portions of the scene are being transmitted to enable omission of the one or more portions of the scene corresponding to the one or more static objects in one or more subsequent transmissions.

23. The image capture device of claim 1, further comprising:
    circuitry configured to change a pixel retention amount for the particular portion of the scene to maintain a constant resolution that is independent of a dimension of the particular portion of the scene.

24. The image capture device of claim 1, further comprising:
    circuitry configured to delete from memory local to the image capture device one or more portions of the scene as they are captured unless the one or more portions of the scene are subject to one or more user requests.

25. The image capture device of claim 1, further comprising:
    at least one wireless communication unit that has a bandwidth that is less than image data of the scene captured in a moment by at least a factor of ten.

26. The image capture device of claim 1, wherein the more than one image sensor comprises twelve image sensors in radial alignment to capture the scene including a three hundred and sixty degree field of view.

27. The image capture device of claim 1, wherein the circuitry configured to capture a scene through use of the more than one image sensor comprises:
    circuitry configured to capture a video of a scene through use of the more than one image sensor.

28. The image capture device of claim 1, further comprising:
    circuitry configured to remove one or more areas from the particular portion of the scene that overlap with another particular portion selected based at least partly on another user request, such that the one or more areas are transmitted only once.

29. The image capture device of claim 1, further comprising:
    circuitry configured to insert context-based information into the particular portion of the scene for transmission to a user device based at least partly on image analysis performed with respect to the particular portion of the scene.

30. The image capture device of claim 1, wherein the circuitry configured to capture a scene through use of the more than one image sensor comprises:
    circuitry configured to capture at least one of the following types of scenes through use of the more than one image sensor: tourist destination, highway, or home.

31. The image capture device of claim 1, further comprising:
    circuitry configured to receive multiple requests from multiple discrete users for multiple particular images from the scene.

32. The image capture device of claim 1, further comprising:
    circuitry configured to deemphasize one or more pixels from the scene that are not part of the particular portion with exception of one or more pixels identified as being associated with a target object.

33. An image capture device that includes more than one image sensor, the image capture device comprising:
    circuitry configured to capture a scene through use of the more than one image sensor;
    circuitry configured to select a particular portion of the scene that is smaller than the scene based at least partly on a user request;
    circuitry configured to select an additional unrequested portion of the scene that contains an object of interest likely to be a subject of a subsequent user request; and
    circuitry configured to transmit the particular portion of the scene at a first resolution in combination with the additional unrequested portion of the scene at a second resolution that is lower than the first resolution to reduce latency of image loading of the additional unrequested portion of the scene in an event the additional unrequested portion of the scene is the subject of the subsequent user request.

34. An image capture device comprising:
more than one image sensor;
at least one communication interface; and
at least one computer processor configured to execute operations including at least:
  capturing a scene through use of the more than one image sensor;
  selecting a particular portion of the scene that is smaller than the scene based at least partly on a user request received via the at least one communication interface;
  selecting an additional unrequested portion of the scene that is adjacent to the particular portion and determined to correspond to a likely subsequent user request; and
  transmitting via the at least one communication interface the particular portion of the scene at a first resolution in combination with the additional unrequested portion of the scene at a second resolution that is lower than the first resolution to reduce latency of image loading of the additional unrequested portion of the scene in an event the additional unrequested portion of the scene is a subject of a subsequent user request.

* * * * *